(12) United States Patent
Fujita et al.

(10) Patent No.: US 11,513,751 B2
(45) Date of Patent: Nov. 29, 2022

(54) PRINTING SYSTEM, PRODUCTION SYSTEM, AND METHOD OF CONTROLLING PRODUCTION SYSTEM

(71) Applicant: CANON KABUSHIKI KAISHA, Tokyo (JP)

(72) Inventors: Ryo Fujita, Tokyo (JP); Yuuki Maeda, Chiba (JP); Satoshi Yoshida, Kanagawa (JP); Hirotomo Tanaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/178,478

(22) Filed: Feb. 18, 2021

(65) Prior Publication Data

US 2021/0294552 A1 Sep. 23, 2021

(30) Foreign Application Priority Data

Mar. 19, 2020 (JP) .............................. JP2020-049938

(51) Int. Cl.
*G06F 3/12* (2006.01)

(52) U.S. Cl.
CPC .......... *G06F 3/1285* (2013.01); *G06F 3/1208* (2013.01); *G06F 3/1258* (2013.01)

(58) Field of Classification Search
CPC combination set(s) only.
See application file for complete search history.

(56) References Cited

U.S. PATENT DOCUMENTS

| | | | |
|---|---|---|---|
| 9,332,139 B2 | 5/2016 | Hayashi | |
| 10,042,592 B1 | 8/2018 | Soriano et al. | |
| 2004/0046970 A1 | 3/2004 | Miyachi | |
| 2005/0243365 A1* | 11/2005 | Noda | G06F 3/1288 358/1.15 |
| 2008/0144080 A1* | 6/2008 | Randt | G06F 3/126 358/1.15 |
| 2011/0205586 A1* | 8/2011 | Takahashi | G06F 9/5027 358/1.15 |
| 2014/0368843 A1* | 12/2014 | Hayashi | G06F 3/1244 358/1.9 |
| 2018/0367703 A1* | 12/2018 | Wagatsuma | G06F 3/1208 |
| 2019/0095147 A1* | 3/2019 | Yano | G06F 3/1234 |

(Continued)

FOREIGN PATENT DOCUMENTS

| | | |
|---|---|---|
| JP | 2013120367 A | 6/2013 |
| JP | 2015001833 A | 1/2015 |

OTHER PUBLICATIONS

European Search Report dated Jul. 22, 2021, in related European Patent Application No. 21156192.3.

*Primary Examiner* — Helen Zong
(74) *Attorney, Agent, or Firm* — Venable LLP

(57) ABSTRACT

A production system includes a memory containing instructions, and a processor that executes the instructions to execute a quality verification process corresponding to identification information assigned to a print job, determine whether or not a condition corresponding to the identification information assigned to the print job is met, in a case it is determined that the condition is not met, execute an adjustment process for meeting the condition, and execute the print job in a case the adjustment process has been completed or in a case it is determined that the condition is met.

7 Claims, 41 Drawing Sheets

(56) References Cited

U.S. PATENT DOCUMENTS

2019/0260910 A1    8/2019  Maeda
2019/0377529 A1*  12/2019  Ohkawa ................ G06F 3/1263
2020/0285424 A1*  9/2020  Matsuzaka ............ G06F 3/1204

* cited by examiner

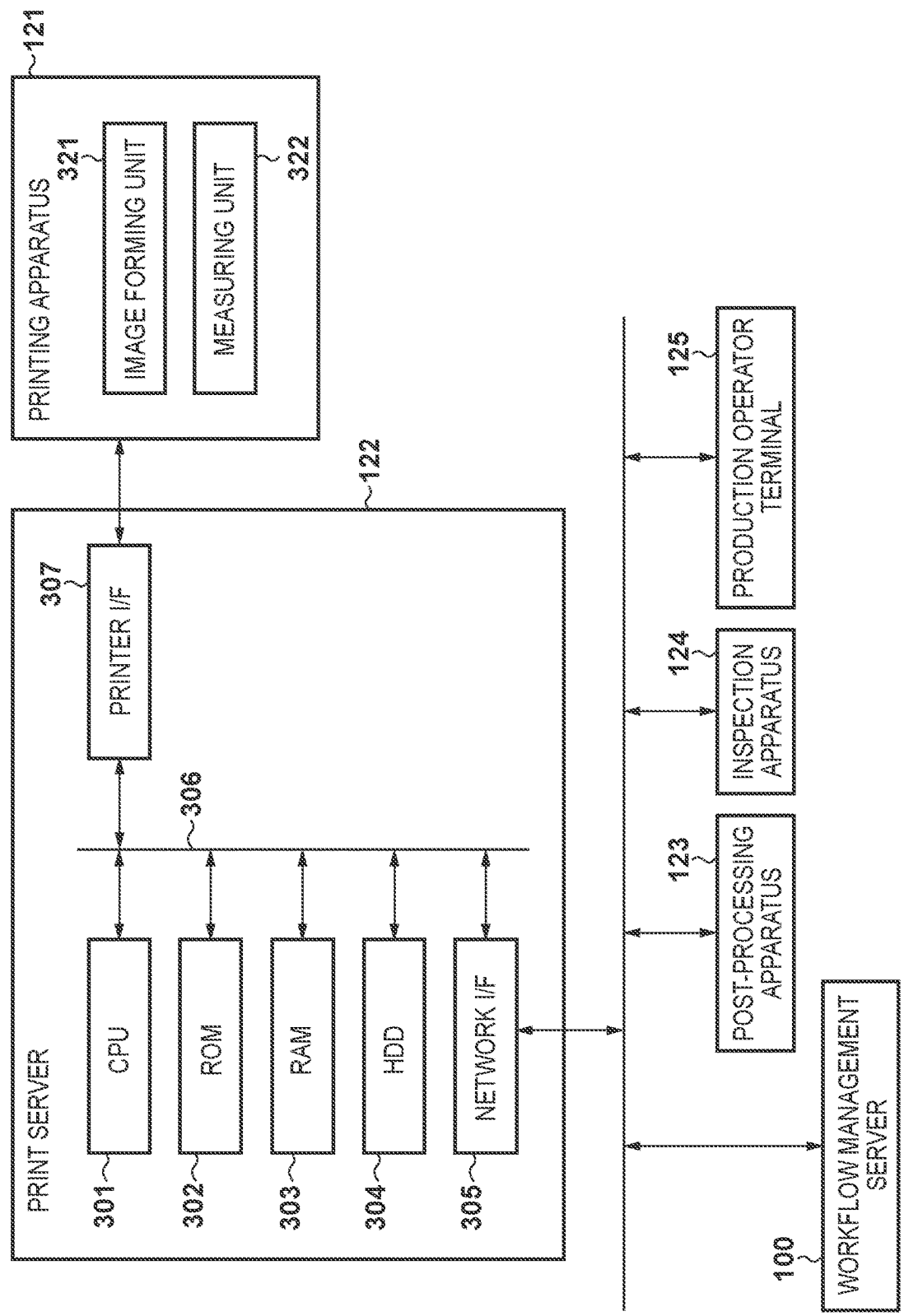

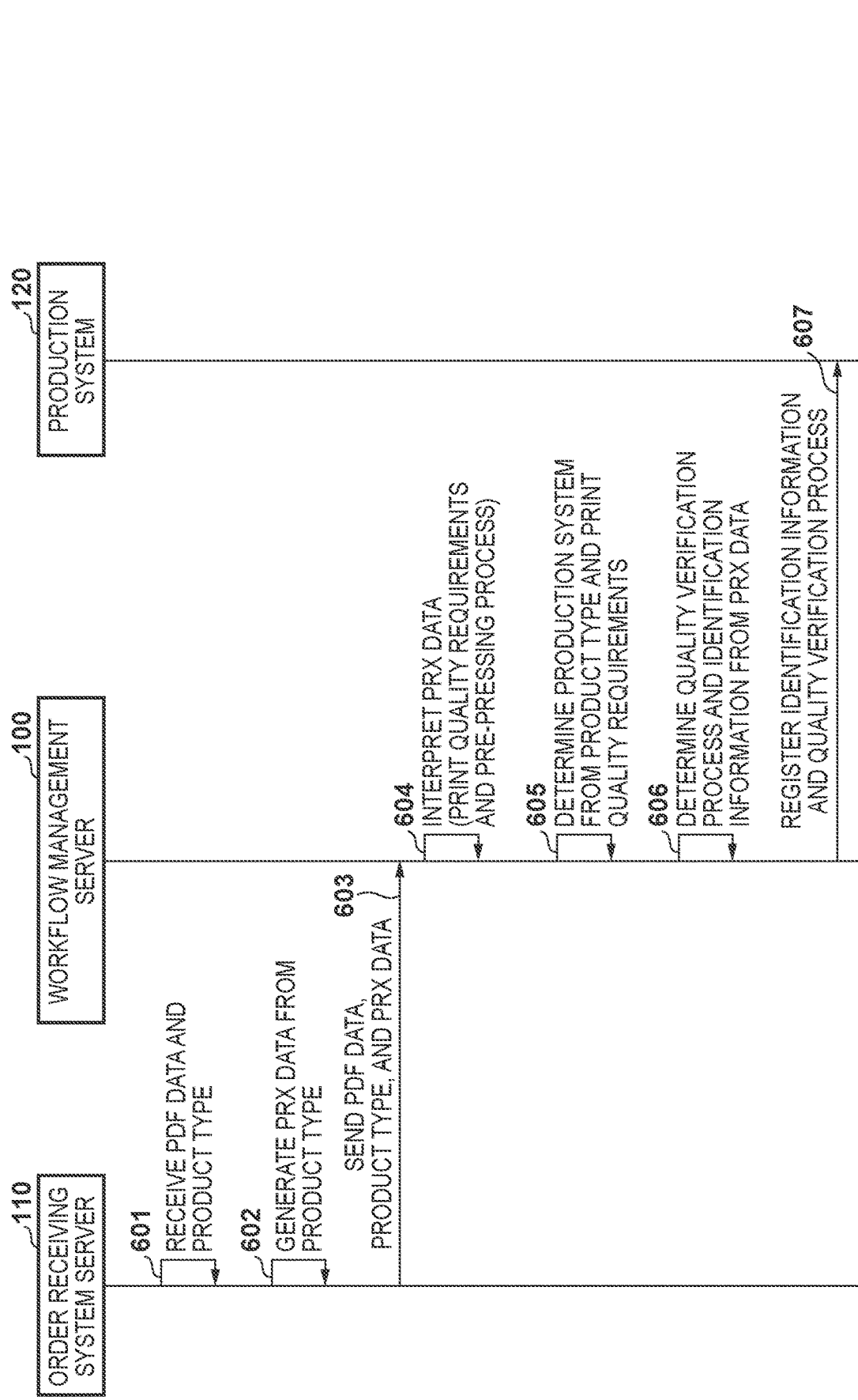

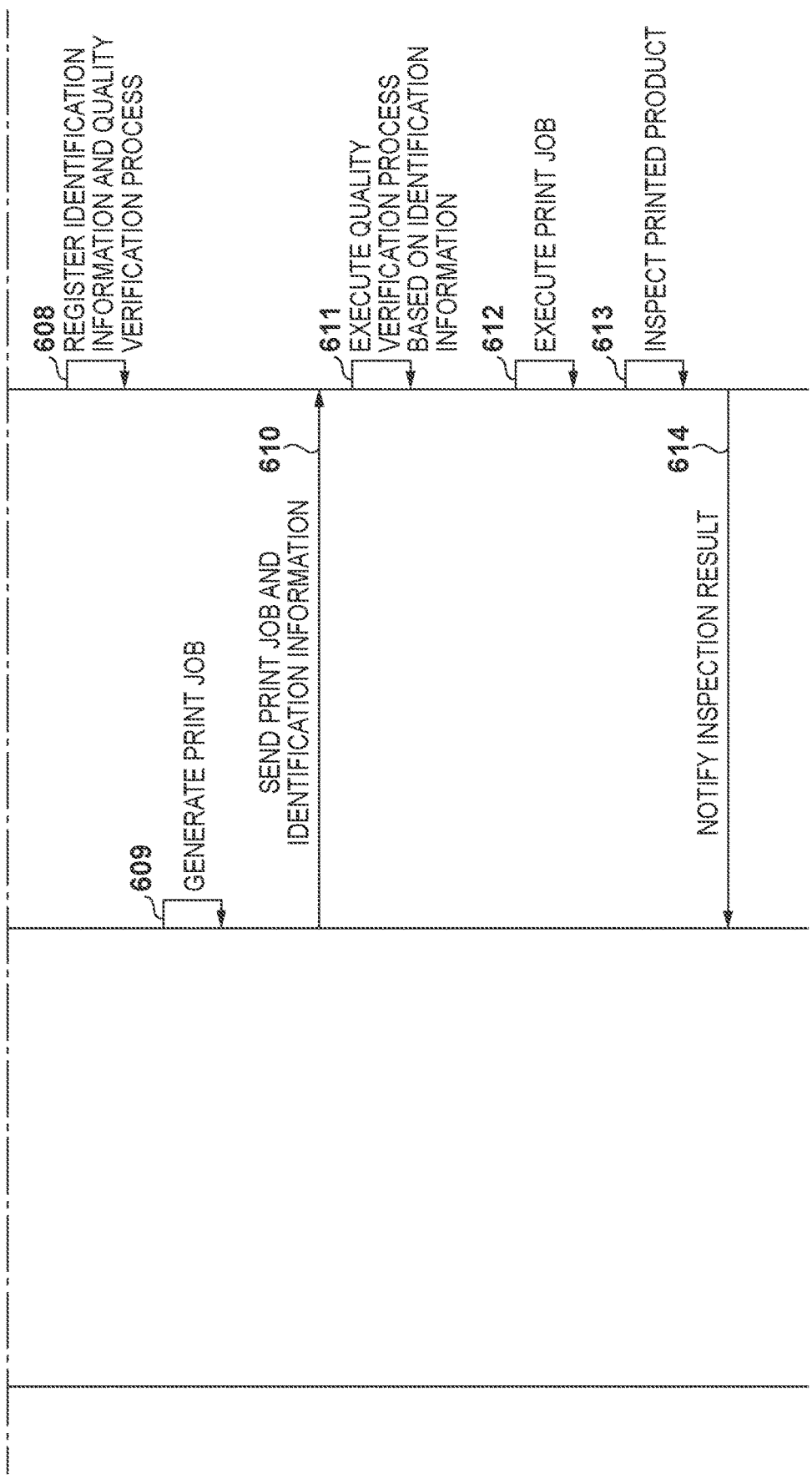

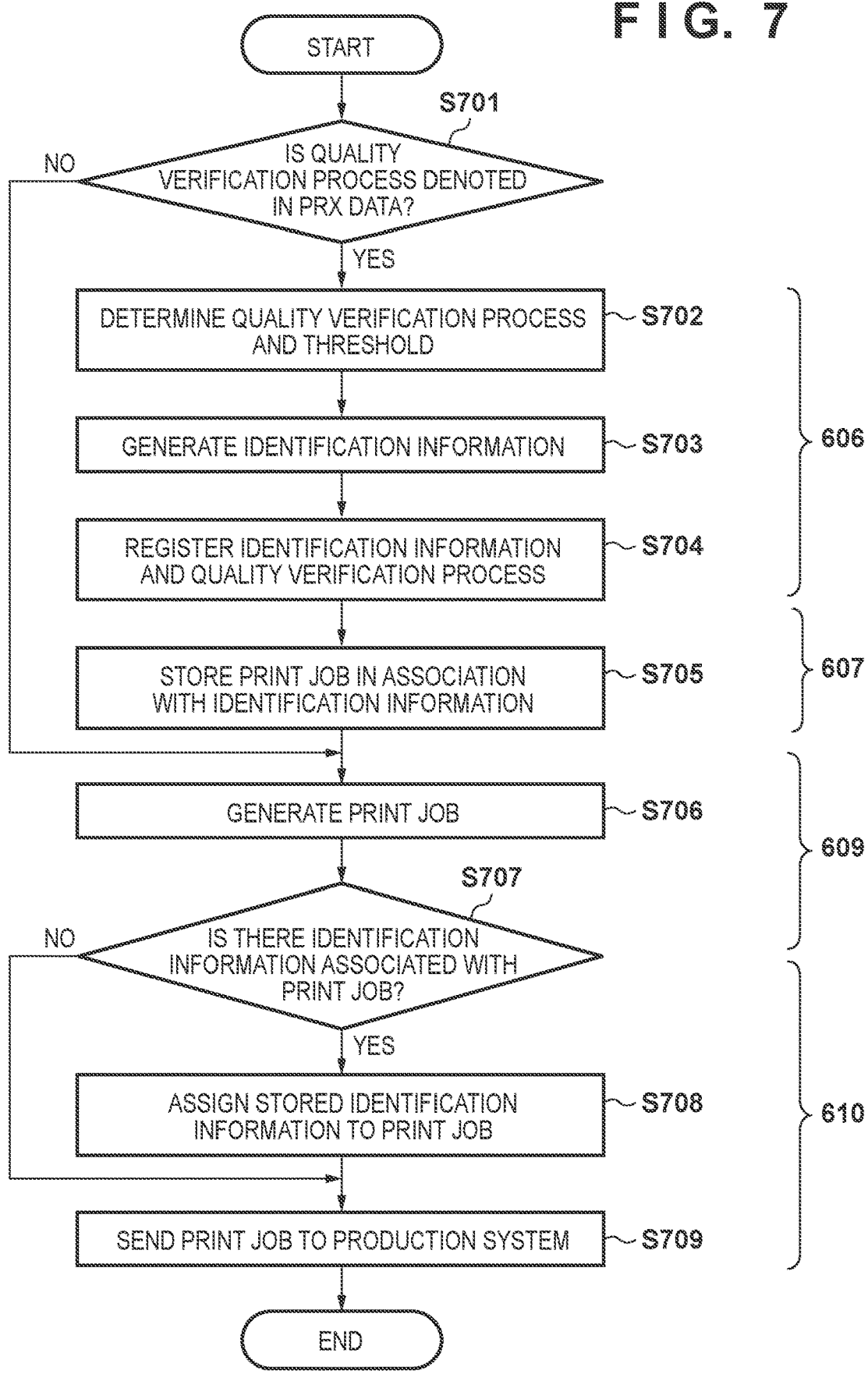

F I G. 9

```xml
<PRX>
    <QualitySpecification>
        <QualityGoals>
            <Color>
                <ComplianceGoal>JapanColor dE (CIE DE2000)</ComplianceGoal>
                <ColorScore>
                    <ScoringInfo>
                        <MinimumAcceptableRank>5</MinimumAcceptableRank>
                        <DesiredRank>6</DesiredRank>
                    </ScoringInfo>
                    <ColorScoringScale>
                        <ParameterScore Rank="7">
                            <ValueRange> dE <= 2 </ValueRange>
                        </ParameterScore>
                        <ParameterScore Rank="6">
                            <ValueRange> 2 < dE <= 3 </ValueRange>
                        </ParameterScore>
                        <ParameterScore Rank="5">
                            <ValueRange> 3 < dE <= 5 </ValueRange>
                        </ParameterScore>
                    </ColorScoringScale>
                </ColorScore>
            </Color>
            <Registration>
                <ComplianceGoal>FrontAndBackRegistration</ComplianceGoal>
                <RegistrationScore>
                    <ScoringInfo>
                        <MinimumAcceptableRank>6</MinimumAcceptableRank>
                        <DesiredRank>7</DesiredRank>
                    </ScoringInfo>
                    <RegistrationScoringScale>
                        <ParameterScore Rank="8">
                            <ValueRange> diff <= 1mm </ValueRange>
                        </ParameterScore>
                        <ParameterScore Rank="7">
                            <ValueRange> 1mm < diff <= 2mm </ValueRange>
                        </ParameterScore>
                        <ParameterScore Rank="6">
                            <ValueRange> 2mm < diff <= 4mm </ValueRange>
                        </ParameterScore>
                    </RegistrationScoringScale>
                </RegistrationScore>
            </Registration>
        </QualityGoals>
    </QualitySpecification>
</PRX>
```

FIG. 10A

ADJUSTMENT TABLE 1000

| IDENTIFICATION INFORMATION 1001 | QUALITY VERIFICATION PROCESS 1002 | THRESHOLD 1003 | ADJUSTMENT PROCESS IN EVENT OF FAILURE 1004 |
|---|---|---|---|
| ADJUSTMENT SET A | JapanColorVerification | dE 5 OR LESS | JapanColorCalibration |
| JOB 2 | FRONT/BACK REGISTRATION Verification | MISALIGNMENT AMOUNT 4mm OR LESS | FRONT/BACK REGISTRATION FULL AUTO ADJUSTMENT |
|  | JapanColorVerification | dE <=3 | JapanColorCalibration |
|  | FRONT/BACK REGISTRATION Verification | MISALIGNMENT AMOUNT 2mm OR LESS | FRONT/BACK REGISTRATION REAL TIME ADJUSTMENT |
| ADJUSTMENT SET C | ... | ... | ... |

ADJUSTMENT TABLE 1000

| IDENTIFICATION INFORMATION 1001 | QUALITY VERIFICATION PROCESS 1002 | THRESHOLD 1003 | ADJUSTMENT PROCESS IN EVENT OF FAILURE 1004 |
|---|---|---|---|
| ADJUSTMENT SET A | JapanColorVerification | dE 5 OR LESS | JapanColorCalibration |
| JOB 2 | FRONT/BACK REGISTRATION Verification | MISALIGNMENT AMOUNT 4mm OR LESS | FRONT/BACK REGISTRATION MANUAL ADJUSTMENT |
|  | JapanColorVerification | dE <=3 | JapanColorCalibration |
|  | FRONT/BACK REGISTRATION Verification | MISALIGNMENT AMOUNT 2mm OR LESS | FRONT/BACK REGISTRATION REAL TIME ADJUSTMENT |
| ADJUSTMENT SET C | ... | ... | ... |

ADJUSTMENT EXECUTION TABLE 1100

| IDENTIFICATION INFORMATION 1001 | QUALITY VERIFICATION PROCESS 1002 | THRESHOLD 1003 | ADJUSTMENT PROCESS IN EVENT OF FAILURE 1004 | EXECUTION DEVICE 1101 |
|---|---|---|---|---|
| ADJUSTMENT SET A 1005 | JapanColorVerification | dE 5 OR LESS | JapanColorCalibration | PRINT SERVER |
|  | FRONT/BACK REGISTRATION Verification | MISALIGNMENT AMOUNT 4mm OR LESS | FRONT/BACK REGISTRATION FULL AUTO ADJUSTMENT | PRINTING APPARATUS |
| ADJUSTMENT SET C | ... | ... | ... | ... |

FIG. 11B

PRX-ADJUSTMENT PROCESS CORRESPONDENCE TABLE 1110

| PRX PARAMETER 1111 | PARAMETER VALUE 1112 | QUALITY VERIFICATION PROCESS 1113 | ADJUSTMENT PROCESS IN EVENT OF FAILURE 1114 |
|---|---|---|---|
| ComplianceGoal | JapanColor dE(CIE DE2000) | JapanColorVerification | JapanColorCalibration 1115 |
| ComplianceGoal | FrontAndBackRegistration | FRONT/BACK REGISTRATION Verification | FRONT/BACK REGISTRATION FULL AUTO ADJUSTMENT 1116 |
| ComplianceGoal | MediaCalibration(Coat) | COATED PAPER Verification | COATED PAPER Calibration |
| ComplianceGoal | MediaCalibration(UnCoat) | NON-COATED PAPER Verification | NON-COATED PAPER Calibration |
| ... | ... | ... | ... |

FIG. 11C

PRINT JOB -IDENTIFICATION INFORMATION CORRESPONDENCE TABLE

| PRINT JOB | IDENTIFICATION INFORMATION |
|---|---|
| JOB1 | ADJUSTMENT SET A |
| JOB2 | JOB 2 |
| JOB3 | ADJUSTMENT SET C |
| ... | ... |

FIG. 13

CAPABILITY TABLE

| APPARATUS NAME | QUALITY VERIFICATION PROCESS | ADJUSTMENT PROCESS IN EVENT OF FAILURE | AUTO-EXECUTION FLAG |
|---|---|---|---|
| PRINT SERVER | JapanColorVerification | JapanColorCalibration | Yes |
| PRINT SERVER | JapanColorVerification | JapanColor OUTPUT PROFILE RECREATION | No |
| PRINTING APPARATUS | FRONT/BACK REGISTRATION Verification | FRONT/BACK REGISTRATION FULL AUTO ADJUSTMENT | Yes |
| PRINTING APPARATUS | FRONT/BACK REGISTRATION Verification | FRONT/BACK REGISTRATION MANUAL ADJUSTMENT | No |

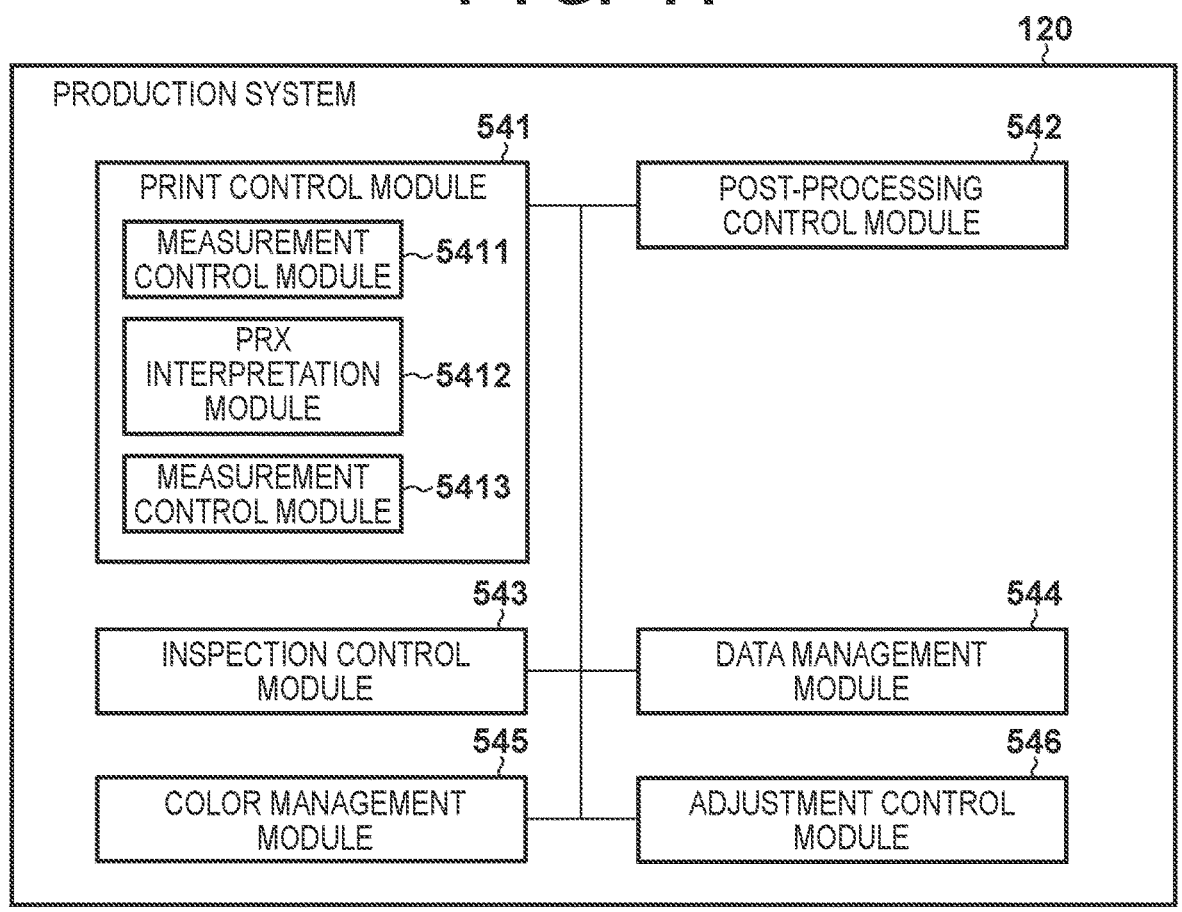

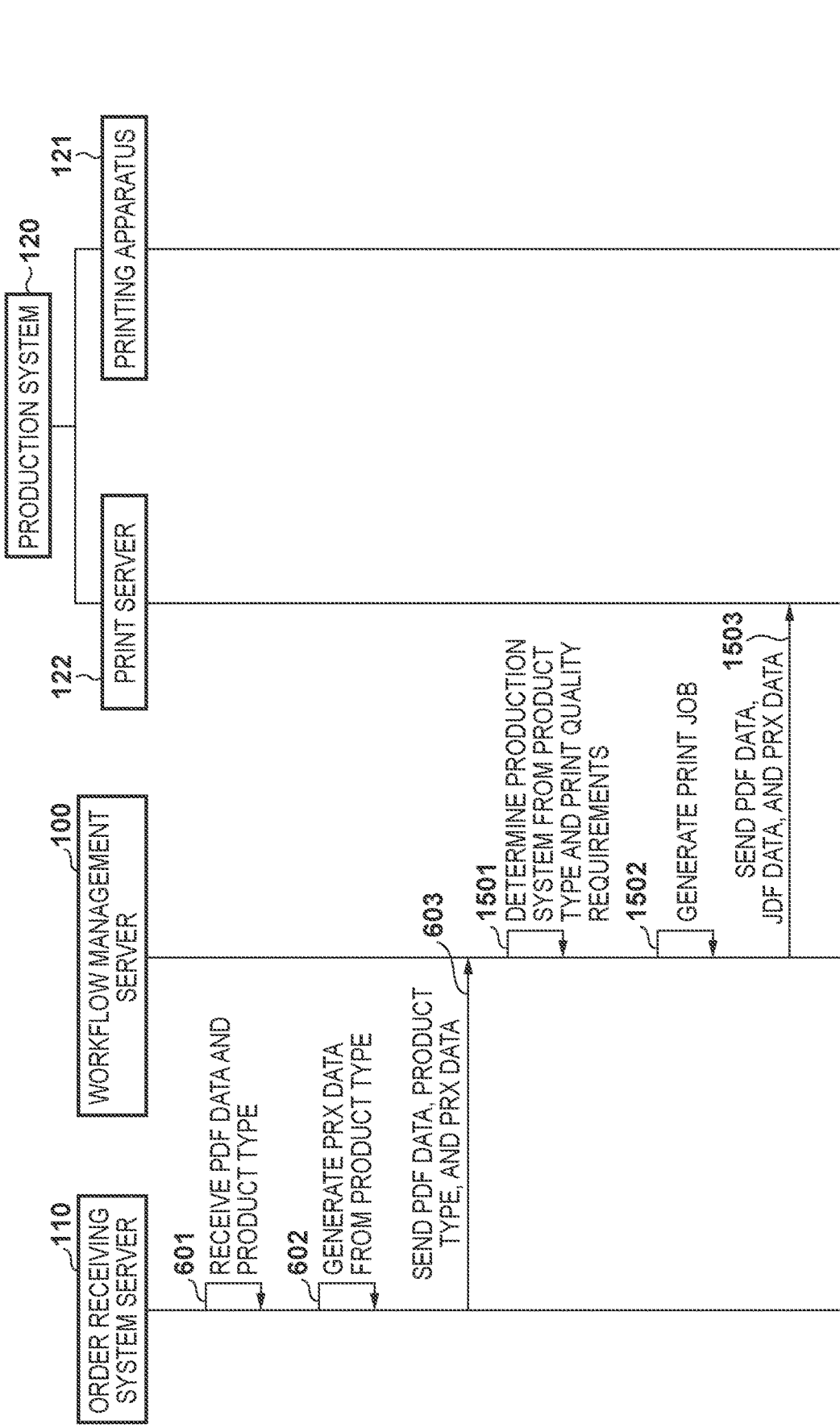

FIG. 18A

```xml
<PRX>
    <QualitySpecification>
        <Color>
            <ComplianceGoal>JapanColor dE (CIE DE2000)</ComplianceGoal>
            <ColorScore>
                <ScoringInfo>
                    <MinimumAcceptableRank>5</MinimumAcceptableRank>
                    <DesiredRank>6</DesiredRank>
                </ScoringInfo>
                <ColorScoringScale>
                    <ParameterScore Rank="7">
                        <ValueRange> dE <= 2 </ValueRange>
                    </ParameterScore>
                    <ParameterScore Rank="6">
                        <ValueRange> 2 < dE <= 3 </ValueRange>
                    </ParameterScore>
                    <ParameterScore Rank="5">
                        <ValueRange> 3 < dE <= 5 </ValueRange>
                    </ParameterScore>
                </ColorScoringScale>
            </ColorScore>
            <ColorParameter>
                <ParameterName>Patch A</ParameterName>
                <ParameterSetId>1</ParameterSetId>
                <PatchType>build</PatchType>
                <CxFReferrenceObjectIdLink>CxF001</CxFReferrenceObjectIdLink>
                <ScoreWeightingFactor>3</ScoreWeightingFactor>
                <CalculationVariable>ClassA</CalculationVariable>
            </ColorParameter>
            <ColorParameter>
                <ParameterName>Patch B</ParameterName>
                <ParameterSetId>1</ParameterSetId>
                <PatchType>build</PatchType>
                <CxFReferrenceObjectIdLink>CxF002</CxFReferrenceObjectIdLink>
                <ScoreWeightingFactor>3</ScoreWeightingFactor>
                <CalculationVariable>ClassB</CalculationVariable>
            </ColorParameter>
        </Color>
        <Registration>
            <ComplianceGoal>FrontAndBackRegistration</ComplianceGoal>
            <RegistrationScore>
                <ScoringInfo>
                    <MinimumAcceptableRank>6</MinimumAcceptableRank>
                    <DesiredRank>7</DesiredRank>
                </ScoringInfo>
                <RegistrationScoringScale>
```

FIG. 18B

```xml
                                        <ParameterScore Rank="8">
                                            <ValueRange> diff <= 1mm </ValueRange>
                                        </ParameterScore>
                                        <ParameterScore Rank="7">
                                            <ValueRange> 1mm < diff <= 2mm </ValueRange>
                                        </ParameterScore>
                                        <ParameterScore Rank="6">
                                            <ValueRange> 2mm < diff <= 4mm </ValueRange>
                                        </ParameterScore>
                                    </RegistrationScoringScale>
                                </RegistrationScore>
                            </Registration>
                        </QualityGoals>
                    </QualitySpecification>
                    <CxFReferenceData>
                        <CxF>
                            <Resources>
                                <ObjectCollection>
                                    <Object Name="1" Id="CxF001" ObjectType="Target">
                                        <CreationDate>2007-06-14T00:00:00-08:00</CreationDate>
                                        <ColorValues>
                                            <ColorCIELab ColorSpecification="CS1">
                                                <L>17.64167</L>
                                                <A>1.076669</A>
                                                <B>0.3338588</B>
                                            </ColorCIELab>
                                        </ColorValues>
                                    </Object>
                                    <Object Name="2" Id="CxF002" ObjectType="Target">
                                        <CreationDate>2007-06-14T00:00:00-08:00</cc:CreationDate>
                                        <ColorValues>
                                            <ColorCIELab ColorSpecification="CS1">
                                                <L>47.83558</L>
                                                <A>63.29078</A>
                                                <B>36.27213</B>
                                            </ColorCIELab>
                                        </ColorValues>
                                    </Object>
                                </ObjectCollection>
                            </Resources>
                        </CxF>
                    </CxFReferenceData>
</PRX>
```

FIG. 19A

| IDENTIFICATION INFORMATION | QUALITY VERIFICATION PROCESS | THRESHOLD | ADJUSTMENT PROCESS IN EVENT OF FAILURE |
|---|---|---|---|
| JOB 1 ADJUSTMENT SET | JapanColorVerification | dE 5 OR LESS | AUTOMATIC TONE CORRECTION |
| | FRONT/BACK REGISTRATION Verification | MISALIGNMENT AMOUNT 4mm OR LESS | FRONT/BACK REGISTRATION FULL AUTO ADJUSTMENT |
| JOB 2 ADJUSTMENT SET | JapanColorVerification | dE <=3 | AUTOMATIC TONE CORRECTION |
| | FRONT/BACK REGISTRATION Verification | MISALIGNMENT AMOUNT 2mm OR LESS | FRONT/BACK REGISTRATION REAL TIME ADJUSTMENT |
| JOB 3 ADJUSTMENT SET | ... | ... | ... |

FIG. 19B

| PRX PARAMETER | PARAMETER VALUE | QUALITY VERIFICATION PROCESS | ADJUSTMENT PROCESS IN EVENT OF FAILURE |
|---|---|---|---|
| ComplianceGoal | JapanColor dE(CIE DE2000) | JapanColorVerification | AUTOMATIC TONE CORRECTION |
| ComplianceGoal | FrontAndBackRegistration | FRONT/BACK REGISTRATION Verification | FRONT/BACK REGISTRATION FULL AUTO ADJUSTMENT |
| ComplianceGoal | MediaCalibration(Coat) | COATED PAPER Verification | COATED PAPER Calibration |
| ComplianceGoal | MediaCalibration(UnCoat) | NON-COATED PAPER Verification | NON-COATED PAPER Calibration |
| ... | ... | ... | ... |

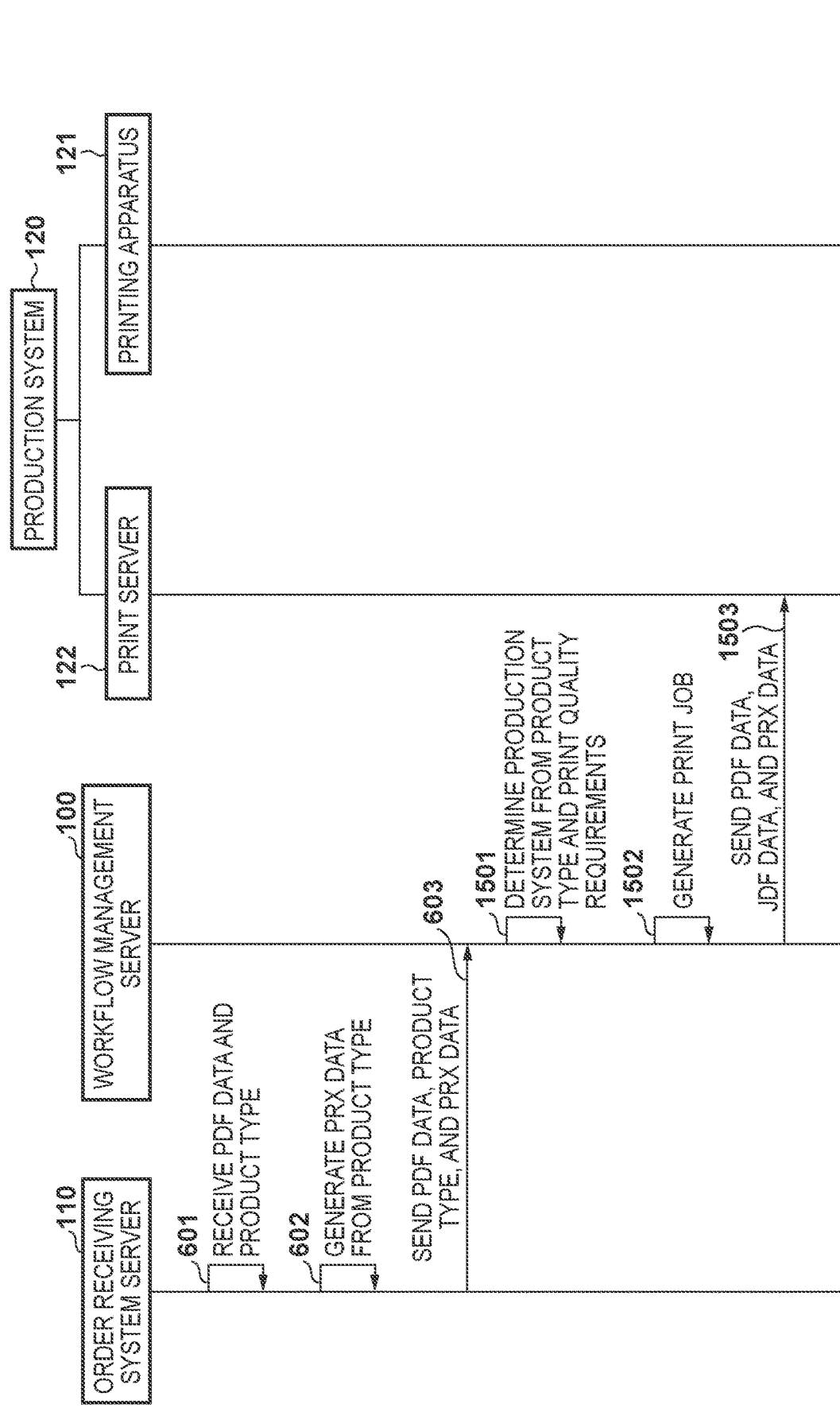

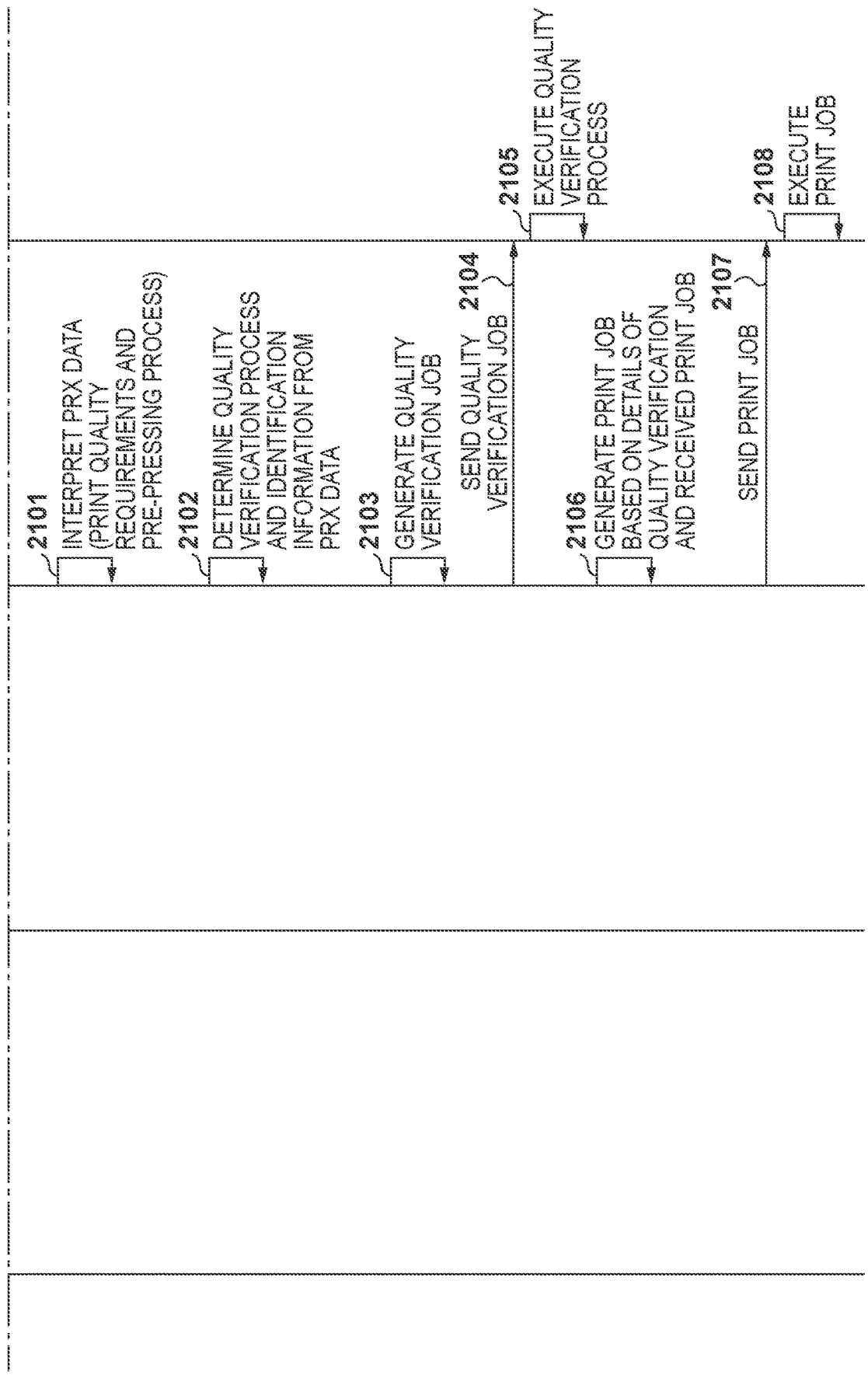

FIG. 24

```
<PRX>
  <QualitySpecification>
    <QualityGoals>
      <Color>
        <ComplianceGoal>Canon Red</ComplianceGoal>
        <ColorScore>
          <ScoringInfo>
            <MinimumAcceptableRank>5</MinimumAcceptableRank>
            <DesiredRank>6</DesiredRank>
          </ScoringInfo>
          <ColorScoringScale>
            <ParameterScore Rank="7">
              <ValueRange> dE <= 2 </ValueRange>
            </ParameterScore>
            <ParameterScore Rank="6">
              <ValueRange> 2 < dE <= 3 </ValueRange>
            </ParameterScore>
            <ParameterScore Rank="5">
              <ValueRange> 3 < dE <= 5 </ValueRange>
            </ParameterScore>
          </ColorScoringScale>
        </ColorScore>
      </Color>
    </QualityGoals>
  </QualitySpecification>
</PRX>
```

FIG. 25A

```xml
<PRX>
    <QualitySpecification>
        <QualityGoals>
            <Color>
                <ComplianceGoal>Ganon Red</ComplianceGoal>
                <ColorScore>
                    <ScoringInfo>
                        <MinimumAcceptableRank>7</MinimumAcceptableRank>
                        <DesiredRank>8</DesiredRank>
                    </ScoringInfo>
                    <ColorScoringScale>
                        <ParameterScore Rank="8">
                            <ValueRange> dE <= 1 </ValueRange>
                        </ParameterScore>
                        <ParameterScore Rank="7">
                            <ValueRange> 1 < dE <= 3 </ValueRange>
                        </ParameterScore>
                        <ParameterScore Rank="6">
                            <ValueRange> 3 < dE <= 5 </ValueRange>
                        </ParameterScore>
                    </ColorScoringScale>
                </ColorScore>
                <ColorParameter>
                    <ParameterName>Ganon Red</ParameterName>
                    <ParameterSetId>1</ParameterSetId>
                    <SamplingPosition>
                        <SamplingPositionMatrix>
                            <UoM>cm</UoM>
                            <Origin>TL</Origin>
                            <PositionDefinition>
                                <PositionLabel>Ganon Red</PositionLabel>
                                <XPosition>0</XPosition>
                                <YPosition>0</YPosition>
                            </PositionDefinition>
                        </SamplingPositionMatrix>
                    <SamplingPosition>
                    <PatchType>build</PatchType>
                    <CxFReferrenceObjectIdLink>CxF001</CxFReferrenceObjectIdLink>
                    <ScoreWeightingFactor>3</ScoreWeightingFactor>
                    <CalculationVariable>ClassA</CalculationVariable>
                </ColorParameter>
            </Color>
        </QualityGoals>
    </QualitySpecification>
```

FIG. 25B

```xml
<CxFReferenceData>
    <CxF>
        <FileInformation>
            <Creator>X-Rite, Inc.</cc:Creator>
            <CreationDate>2007-06-14T00:00:00-08:00</CreationDate>
            <Description>ColorPort Custom Target: correctionset1<Description>
            <Tag Value="CGATS.17" Name="28178_TargetType"/>
        </FileInformation>
        <Resources>
            <ObjectCollection>
                <Object Name="1" Id="CxF001" ObjectType="Target">
                    <CreationDate>2007-06-14T00:00:00-08:00</CreationDate>
                    <ColorValues>
                        <ColorCIELab ColorSpecification="CS1">
                            <L>17.64167</L>
                            <A>1.076669</A>
                            <B>0.3338588</B>
                        </ColorCIELab>
                        <ColorSRGB ColorSpecification="CS1">
                            <R>0</R>
                            <G>0</G>
                            <B>0</B>
                        </ColorSRGB>
                    </ColorValues>
                </Object>
                <Object Name="2" Id="CxF002" ObjectType="Target">
                    <CreationDate>2007-06-14T00:00:00-08:00</cc:CreationDate>
                    <ColorValues>
                        <ColorCIELab ColorSpecification="CS1">
                            <L>47.83558</L>
                            <A>63.29078</A>
                            <B>36.27213</B>
                        </ColorCIELab>
                        <ColorSRGB ColorSpecification="CS1">
                            <R>255</R>
                            <G>0</G>
                            <B>0</B>
                        </ColorSRGB>
                    </ColorValues>
                </Object>
            </ObjectCollection>
        </Resources>
    </CxF>
</CxFReferenceData>
</PRX>
```

FIG. 26A

QUALITY VERIFICATION PROCESS ADJUSTMENT TABLE

| IDENTIFICATION INFORMATION 2601 | PARAMETER VALUE 2602 | QUALITY VERIFICATION PROCESS 2603 | THRESHOLD 2604 | ADJUSTMENT PROCESS IN EVENT OF FAILURE 2605 | PATCH Y/N 2606 |
|---|---|---|---|---|---|
| JOB 1 | AutoAdjustGradiation | ToneVerification | dE5 OR LESS | ToneCalibration | ... |
| JOB 2 | SpotColorVerification | ColorVerification | dE3 OR LESS | ColorCalibration | 0xF001 |

FIG. 26B

JOB MANAGEMENT TABLE

| JOB NAME | QUALITY VERIFICATION PROCESS | THRESHOLD | ADJUSTMENT PROCESS IN EVENT OF FAILURE | PATCH Y/N |
|---|---|---|---|---|
| JOB 1 | ... | ... | ... | A4, PLAIN PAPER 1000pages |
| JOB 2 | ... | ... | ... | A4, PLAIN PAPER 100pages |

FIG. 26C

JOB MANAGEMENT TABLE

| JOB NAME | QUALITY VERIFICATION PROCESS | THRESHOLD | ADJUSTMENT PROCESS IN EVENT OF FAILURE | JOB SETTING |
|---|---|---|---|---|
| VERIFICATION JOB OF JOB 1 | ToneVerification | dE5 OR LESS | ToneCalibration | A4, PLAIN PAPER 1page |
| JOB 1 | ... | ... | ... | A4, PLAIN PAPER 1000pages |
| VERIFICATION JOB OF JOB 2 | ColoVerification | dE3 OR LESS | ColorCalibration | A4, PLAIN PAPER 1page |
| JOB 2 | ... | ... | ... | A4, PLAIN PAPER 100pages |

FIG. 26D

PRX-ADJUSTMENT PROCESS CORRESPONDENCE TABLE

| PRX PARAMETER | PARAMETER VALUE | QUALITY VERIFICATION PROCESS | ADJUSTMENT PROCESS IN EVENT OF FAILURE |
|---|---|---|---|
| ComplianceGoal | JapanColor dE(CIE DE2000) | JapanColorVerification | JapanColorCalibration |
| ComplianceGoal | FrontAndBackRegistration | FRONT/BACK REGISTRATION Verification | FRONT/BACK REGISTRATION FULL AUTO ADJUSTMENT |
| ComplianceGoal | MediaCalibration(Coat) | COATED PAPER Verification | COATED PAPER Calibration |
| ComplianceGoal | MediaCalibration(UnCoat) | NON-COATED PAPER Verification | NON-COATED PAPER Calibration |
| ComplianceGoal | AutoAdjustGradation | ToneVerification | ToneCalibration |
| ComplianceGoal | SpotColorVerifiaction | ColorVerification | ColorCalibration |

ADJUSTMENT EXECUTION TABLE

| JOB NAME | QUALITY VERIFICATION PROCESS | THRESHOLD | ADJUSTMENT PROCESS IN EVENT OF FAILURE | JOB SETTING |
|---|---|---|---|---|
| VERIFICATION JOB OF JOB 1 | ToneVerification | dE5 OR LESS | ToneCalibration | A4, PLAIN PAPER 1page |
| JOB 1 | ... | ... | ... | A4, PLAIN PAPER 1000pages |
| VERIFICATION JOB OF JOB 2 | ColoVerification | dE3 OR LESS | ColorCalibration | A4, PLAIN PAPER 1page |
| ... | ... | ... | ... | ... |

FIG. 29A

JOB MANAGEMENT TABLE

| JOB NAME | QUALITY VERIFICATION PROCESS | THRESHOLD | JOB SETTING | IDENTIFIER OF PRINT JOB |
|---|---|---|---|---|
| VERIFICATION JOB OF JOB 1 | ToneVerification | dE5 OR LESS | A4, PLAIN PAPER 1page | JOB 1 |
| ADJUSTMENT JOB OF JOB 1 | ToneCalibration | dE5 OR LESS | A4, PLAIN PAPER 1page | JOB 1 |
| JOB 1 | ⋮ | ⋮ | A4, PLAIN PAPER 1000pages | ⋮ |
| ⋮ | ⋮ | ⋮ | ⋮ | ⋮ |

FIG. 29B

JOB ADJUSTMENT EXECUTION TABLE

| JOB NAME | QUALITY VERIFICATION PROCESS | THRESHOLD | JOB SETTING | IDENTIFIER OF PRINT JOB |
|---|---|---|---|---|
| VERIFICATION JOB OF JOB 1 | ToneVerification | dE5 OR LESS | A4, PLAIN PAPER 1page | JOB 1 |
| ADJUSTMENT JOB OF JOB 1 | ToneCalibration | dE5 OR LESS | A4, PLAIN PAPER 1page | JOB 1 |
| JOB 1 | ⋮ | ⋮ | A4, PLAIN PAPER 1000pages | ⋮ |
| ⋮ | ⋮ | ⋮ | ⋮ | ⋮ |

F I G. 30A
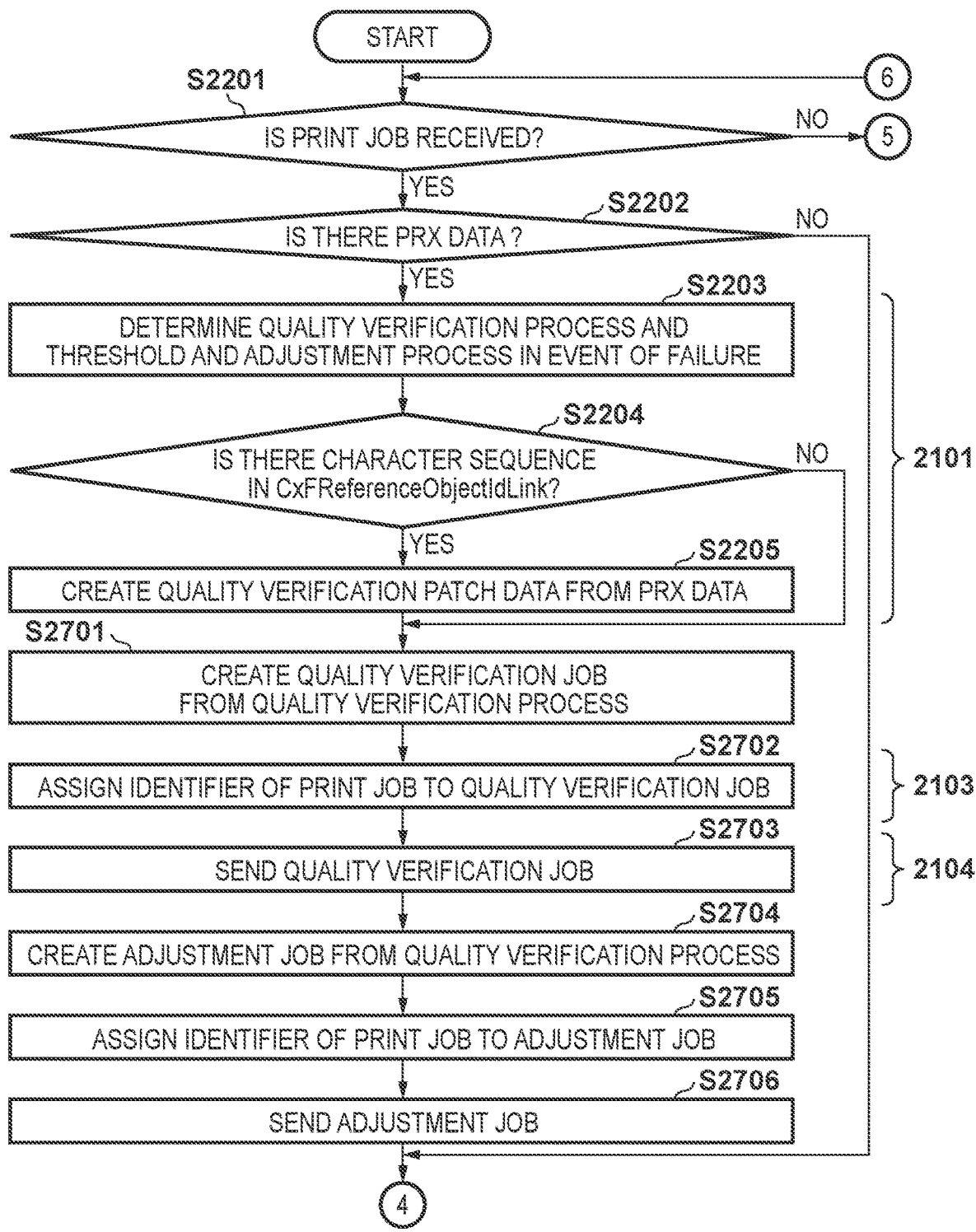

F I G. 32A

JOB MANAGEMENT TABLE

| JOB NAME | QUALITY VERIFICATION PROCESS | THRESHOLD | ADJUSTMENT PROCESS IN EVENT OF FAILURE | JOB SETTING | IDENTIFIER OF PRINT JOB | IDENTIFIER OF QUALITY VERIFICATION JOB |
|---|---|---|---|---|---|---|
| VERIFICATION JOB OF JOB 1 | ColorVerification | dE5 OR LESS | ToneCalibration | A4, STANDARD PAPER 1page | JOB 1 | |
| JOB 1 | ... | ... | ... | A4, STANDARD PAPER 1000pages | ... | JOB 1 VERIFICATION JOB JOB 1 ADJUSTMENT JOB |
| ADJUSTMENT JOB OF JOB 1 | ToneCalibration | dE5 OR LESS | | A4, STANDARD PAPER 1page | JOB 1 | |
| ... | | | | | | |

F I G. 32B

ADJUSTMENT EXECUTION TABLE

| IDENTIFICATION INFORMATION | QUALITY VERIFICATION PROCESS | THRESHOLD | ADJUSTMENT PROCESS IN EVENT OF FAILURE |
|---|---|---|---|
| ADJUSTMENT SET A | JapanColorVerification | dE 5 OR LESS | JapanColorCalibration |
| | FRONT/BACK REGISTRATION Verification | MISALIGNMENT AMOUNT 4mm OR LESS | FRONT/BACK REGISTRATION FULL AUTO ADJUSTMENT |
| JOB 2 | JapanColorVerification | dE <=3 | JapanColorCalibration |
| | FRONT/BACK REGISTRATION Verification | MISALIGNMENT AMOUNT 2mm OR LESS | FRONT/BACK REGISTRATION REAL TIME ADJUSTMENT |
| ADJUSTMENT SET C | ... | ... | ... |

3201

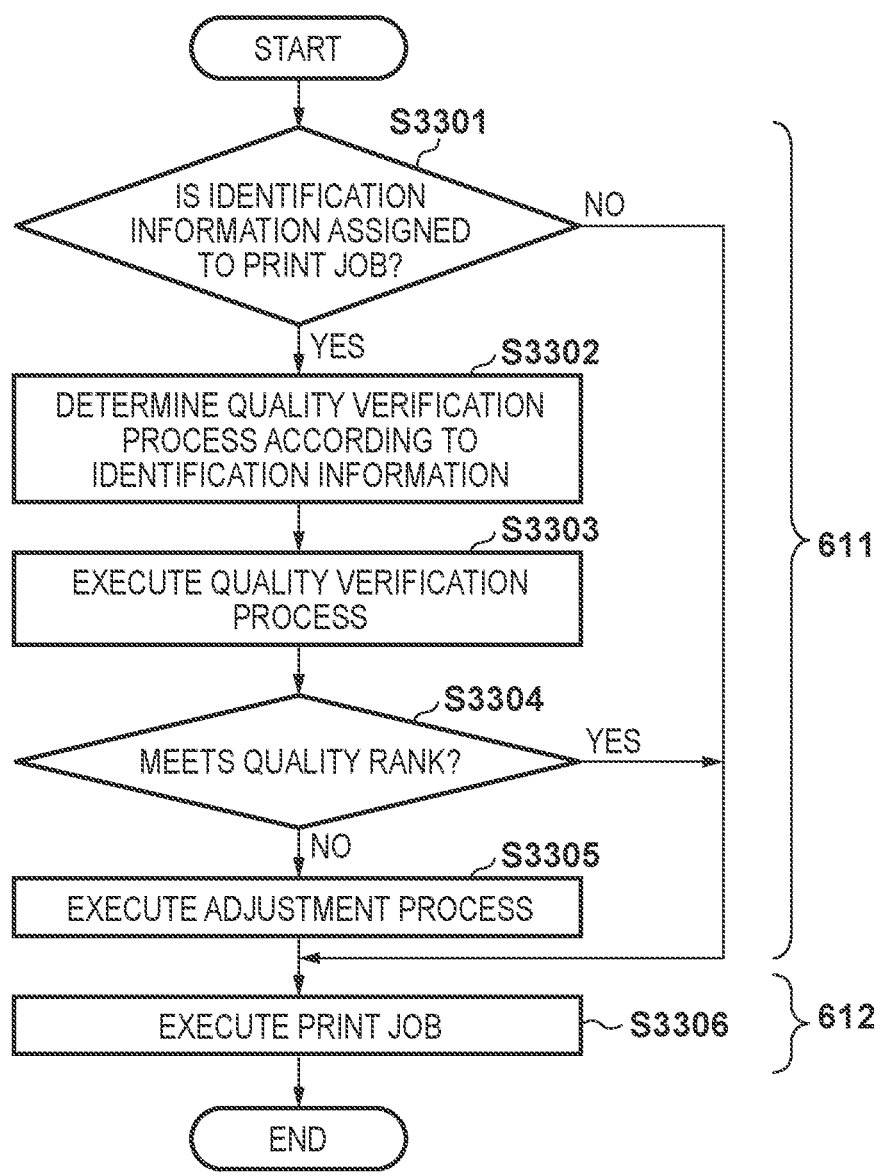

PRINTING SYSTEM, PRODUCTION SYSTEM, AND METHOD OF CONTROLLING PRODUCTION SYSTEM

BACKGROUND OF THE INVENTION

Field of the Invention

The present invention relates to a printing system, a production system, and a method of controlling a production system.

Description of the Related Art

There are types of printing services known as print on demand (POD), production printing, and commercial printing. In this type of service, there is a customer (also called an "end user") who orders and requests printing, and a printing company which provides the printed product. The customer orders the printed material by providing the printing company with specifications of the printed product to be requested and, if necessary, image data to be used for printing. The specifications of the printed product are factors that determine the details of the printed product, such as the type of paper to be used, finishing settings such as binding and stapling, the number of sheets and copies to be printed, and the like. The printing company uses the requested details and image data to create the printed product and deliver the printed product to the customer.

In such a commercial printing service, the printing company uses a variety of equipment and software to take orders and deliver printed products. These are, for example, printing apparatuses for printing onto paper, print controllers that generate image data to be printed by the printing apparatuses, finishers for binding and stapling, and inspection apparatuses for inspecting and checking printed materials. In addition, web servers are used for receiving orders for printed products from customers, and terminals and software are also used for managing the production of printed products. There are also multiple users of these devices and software. These include, for example, order receipt staff who manage order receipt items and communicate with customers, process designers who design work processes to complete the printed products, operators who operate the printing apparatuses and inspection apparatuses, and certifying staff who certify the quality of the final printed products. There are also printing companies that have multiple production bases, and in such cases, the printing company decides which production base to use to produce the printed product on the basis of the content of the order.

In commercial printing services, the printing company is often required by customers to specify quality requirements for the printed products. The quality requirements are different from the aforementioned specifications of the printed products, and refer to conditions related to the quality of the printed products, such as an amount of misalignment of images on the front and back of a sheet, the amount of variation in the color values of images among multiple copies or multiple pages, and the like. Printed products range from handouts such as flyers and pamphlets to photo albums, books, business cards, and exhibition panels, and the uses and prices thereof vary widely. As a result, the quality requirements and tolerance ranges are also diverse.

In order to meet these quality requirements, a printing company must have a quality verification process for work processes and printed products. The work process indicates adjustment processes in various types of apparatuses necessary for meeting the quality requirements. For example, based on the results of sample printing which a customer has accepted, a color adjustment process is required to match spot colors on specific paper of the printing apparatus. Or, if printing misalignment between the front and back of sheets in a printed product is required to be within a predetermined range, a printing position adjustment process must be carried out. A verification process, which is the process of checking the status of the apparatuses which have been adjusted by this adjustment process, is also included.

This adjustment process is performed with a variety of apparatuses used by the printing company. The adjustment processes are performed by individual apparatuses, e.g., the color adjustment process is performed by the print controller that generates the image data, and front-back printing misalignment adjustment is performed by the printing apparatus that handles paper transport and printing. Even among the same type of color adjustment processes, there are some adjustment processes that are performed on different devices, such as the adjustment of image data in the print controller and the correction of output images in the printing apparatus. Therefore, in order to ensure the quality of an ordered print job, it is necessary to decide which apparatus will perform which adjustment process, and then execute the adjustment process.

The quality verification process, on the other hand, is a process of checking whether the printed product which has been produced meets the quality requirements. For example, printed products that do not meet the quality requirements are determined to be defective and are excluded through a post-printing inspection process. The inspection process may be done by certifying staff themselves, or done automatically by an inspection apparatus. If necessary, a quality report indicating that the printed product meets the quality requirements is prepared for the customer.

Each of the above-mentioned processes is determined by the process designer according to the type of printed product, printing conditions, and the like. As mentioned earlier, commercial printing services handle a wide variety of types of printed products. Furthermore, a printing company often owns multiple types of apparatuses, and the process designer is also responsible for selecting the optimal apparatus and applying it in each process. As a result, process designers have been required to have a high level of skill and experience, and the workload has been heavy.

The information of quality requirements and quality verification result information required for the process design and quality report generation described above have not yet been defined in a unified data format. As a result, a printing company receiving an order receives quality requirements in different data formats from multiple customers, and it has therefore been necessary to make process decisions according to each data format when designing the work process. In addition, from the perspective of a customer who places an order, when placing an order for a printed product with multiple printing companies, there is the complicated process of delivering and receiving quality requirements and quality reports in different data formats.

Japanese Patent Laid-Open No. 2015-001833 describes a technique pertaining to the optimization of work processes based on individual print jobs. According to Japanese Patent Laid-Open No. 2015-001833, data that serves as target values for a color adjustment process is stored as calibration information the first time a print job is printed. Then, when the same job is re-ordered or the like and is to be reprinted, the color adjustment process is performed by referring to the calibration information registered the first time.

Japanese Patent Laid-Open No. 2013-120367 describes a technique pertaining to the optimization of quality verification processes on a print job-by-print job basis. According to Japanese Patent Laid-Open No. 2013-120367, whether or not to confirm the implementation or non-implementation of adjustments required for jobs can be set on a print job-by-print job basis. Furthermore, when printing the job, the confirmation of the implementation is displayed only if the confirmation interval is longer than a pre-registered interval.

As mentioned earlier, the quality requirements for printed products vary widely depending on the type of the product and the customer's specific requirements. That is, the process required for quality control varies depending on the print job for generating the printed product. It is therefore necessary to associate the various types of adjustment processes in the above-described work processes, the inspection process in the quality verification processes, and so on with the print job. However, the technique according to Japanese Patent Laid-Open No. 2015-001833 optimizes the work process only for print jobs that will be reprinted, and is therefore ineffective for print jobs that are ordered for the first time. In addition, the technique according to Japanese Patent Laid-Open No. 2013-120367 inquires with the operator as to whether or not the adjustment processes are necessary for each print job, which forces a certain amount of work time and workload onto the operator.

The standardization techniques make it possible to obtain quality requirements for each job. However, neither technique mentions how to control a production system based on the obtained quality requirements.

SUMMARY OF THE INVENTION

An aspect of the present invention is to eliminate the above-mentioned problem with conventional technology.

A feature of the present invention is to provide a technique for interpreting quality requirements for each of print jobs and executing a quality verification process at an appropriate timing in conjunction with the print job being executed.

According to a first aspect of the present invention, there is provided a printing system comprising an order receiving system, an information processing apparatus, and one or more production systems, wherein the order receiving system includes: an order receiving unit that receives print data; a generating unit that generates quality requirement data; and a sending unit that sends the print data and the quality requirement data to the information processing apparatus, the information processing apparatus includes: a deciding unit that decides a production system to be used on the basis of at least the quality requirement data received from the order receiving system; and a submitting unit that generates a print job to which is assigned identification information of a quality verification process for verifying, with the determined production system, whether or not a quality required by the quality requirement data is satisfied, and submits the print job to the determined production system, and the determined production system includes: a verification processing unit that executes the quality verification process corresponding to the identification information assigned to the submitted print job; a determining unit that determines whether or not a condition set by the quality verification process is met; an adjusting unit that, when the determining unit determines that the condition is not met, executes an adjustment process for meeting the condition; and an executing unit that executes the print job when the adjustment process has been completed by the adjusting unit or when the determining unit determines that the condition is met.

According to a second aspect of the present invention, there is provided a production system comprising: a verification processing unit that executes a quality verification process corresponding to identification information assigned to a print job; a determining unit that determines whether or not a condition set by the quality verification process is met; an adjusting unit that, in a case that the determining unit determines that the condition is not met, executes an adjustment process for meeting the condition; and an executing unit that executes the print job in a case that the adjustment process has been completed by the adjusting unit or in a case that the determining unit determines that the condition is met.

According to a third aspect of the present invention, there is provided a method of controlling a production system, the method comprising: executing a quality verification process corresponding to identification information assigned to a print job; determining whether or not a condition set by the quality verification process is met; in a case that it is determined in the determining that the condition is not met, executing an adjustment process for meeting the condition; and in a case that the adjustment process has been completed in the executing of the adjustment process, or in a case that it is determined in the determining that the condition is met, executing the print job.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram for describing the hardware configuration of a production system according to the first embodiment.

FIGS. 6A and 6B are sequence charts for describing a flow of processing in the printing system according to the first embodiment.

FIG. 7 is a flowchart for describing control processing performed by the workflow management server according to the first embodiment of the present invention.

FIG. 9 is a diagram illustrating an example of PRX data according to the first embodiment.

FIGS. 10A and 10B are diagrams for describing the data structures of adjustment tables according to embodiments.

FIG. 11A is a diagram for describing an example of the data structure of an adjustment execution table according to the first embodiment.

FIG. 11B is a diagram for describing a PRX-adjustment process correspondence table according to the first embodiment.

FIG. 11C is a diagram for describing an example of a print job-identification information correspondence table according to the first embodiment.

FIG. 13 is a diagram for describing an example of a capability table according to the first embodiment.

FIG. 14 is a diagram for describing the software configuration of a production system according to a fourth embodiment.

FIGS. 15A and 15B are sequence charts for describing a flow of processing in a printing system according to the fourth embodiment.

FIGS. 18A and 18B are diagrams illustrating an example of PRX data according to the fourth embodiment.

FIG. 19A is a diagram for describing a quality verification process table according to the fourth embodiment.

FIG. 19B is a diagram for describing a PRX-adjustment process correspondence table according to the fourth embodiment.

FIGS. 21A and 21B are sequence charts for describing a flow of processing in a printing system according to a fifth embodiment.

FIG. 24 is a diagram illustrating an example of PRX data that corrects print color fluctuation, according to the fifth embodiment.

FIGS. 25A and 25B are diagrams illustrating an example of PRX data that corrects print color fluctuation of a spot color, according to the fifth embodiment.

FIG. 26A is a diagram for describing an example of a quality verification process adjustment table according to the fifth embodiment.

FIGS. 26B and 26C are diagrams for describing an example of a job management table according to the fifth embodiment.

FIG. 26D is a diagram for describing an example of a PRX-adjustment process correspondence table according to the fifth embodiment.

FIG. 26E is a diagram for describing an example of an adjustment execution table according to the fifth embodiment.

FIG. 29A is a diagram for describing an example of a job management table that manages jobs, included in a data management module of the production system according to the sixth embodiment.

FIG. 29B is a diagram for describing an example of an adjustment execution table according to the sixth embodiment.

FIGS. 30A and 30B are flowcharts for describing control processing performed by a print server according to a seventh embodiment.

FIG. 32A is a diagram for describing an example of a job management table according to the seventh embodiment.

FIG. 32B is a diagram for describing an example of an adjustment execution table according to an eighth embodiment.

FIG. 33 is a flowchart for describing control processing performed by a print server of a production system according to the eighth embodiment of the present invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

First Embodiment

Figure 1:
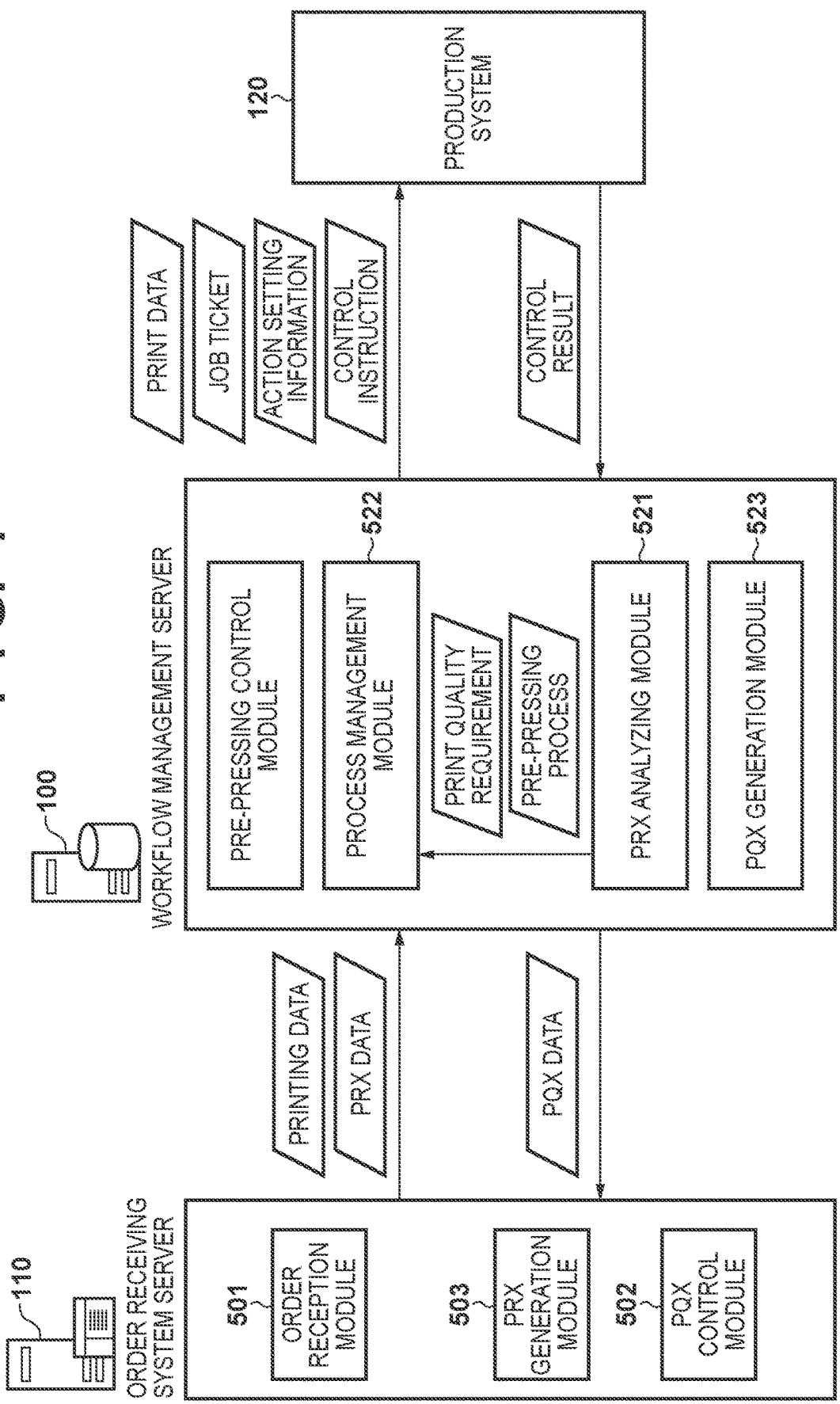
FIG. 1 is a general schematic diagram illustrating an overview of a printing system according to a first embodiment of the present invention.

FIG. 1 is a general schematic diagram for describing an overview of a printing system according to a first embodiment of the present invention. Note that the role of each apparatus and the details of operations of the printing system will be described later with reference to FIG. 2 and subsequent drawings.

In FIG. 1, items surrounded by non-rectangular parallelograms indicate data. PRX data (quality requirement data) generated by an order receiving system server 110 is analyzed by a PRX analyzing module 521 of a workflow management server 100, and print data, job tickets, action setting information, and control instructions based on results of the analysis are sent to a production system 120.

PRX is being considered as a means of unifying the data format for transmitting quality requirements and quality reports. "PRX" is an acronym of "Print Requirement eXchange" format, and refers to a standard data format for quality requirements for printing. By using PRX, quality requirements for different customers or different orders can be written in a uniform standard data format. Note that "PQX" is an acronym of "Print Quality eXchange" format, and refers to the standard data format for print quality reports. PQX makes it possible to transmit quality data for printed products in a standard data format. Using PRX and PQX in this manner makes it possible to transmit quality requirements and quality reports, which have not been unified in the past, in a unified data format.

Figure 2:
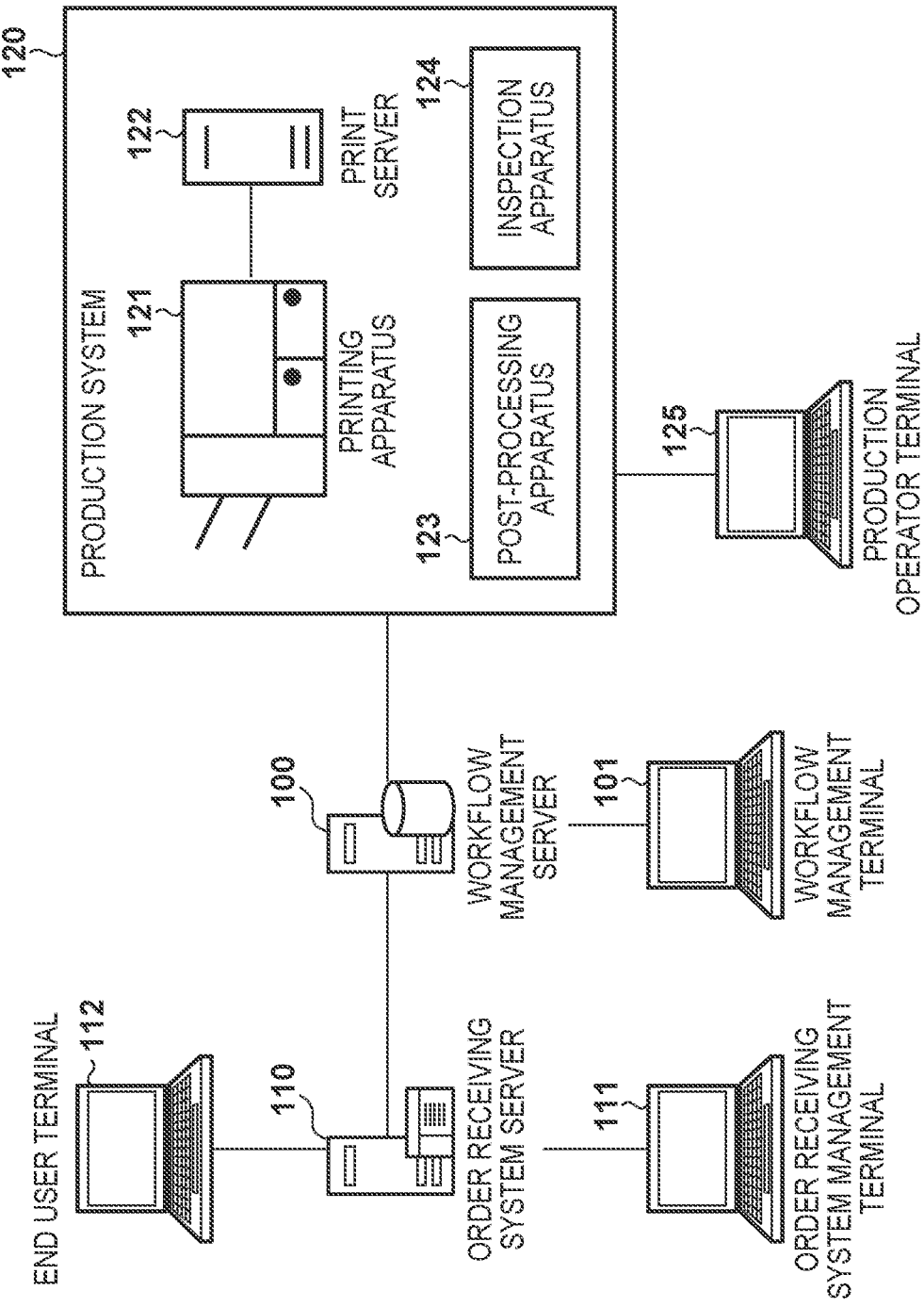
FIG. 2 is a diagram illustrating the configuration of a commercial printing system according to the first embodiment.

FIG. 2 is a diagram for describing the configuration of a commercial printing system according to the first embodiment.

The workflow management server 100 is an example of an information processing apparatus according to the present invention, and manages an overall workflow with respect to commercial printing products. The workflow management server 100 receives print data, PRX data serving as quality requirement information, and the like from the order receiving system server 110. The PRX data received from the order receiving system server 110 is interpreted, and the production system 120 is determined, a pre-pressing process of the print data is executed, and so on for each ordered job. The workflow management server 100 also generates data (the print data, job ticket, action setting information, and control instructions indicated in FIG. 1) to be processed by the production system 120, and sends the data to each device constituting the production system 120. The devices that constitute the production system 120 will be described below. Furthermore, the workflow management server 100 generates PQX data on the basis of information obtained from each device (the control result indicated in FIG. 1) and sends that data to the order receiving system server 110.

Although the first embodiment will describe the workflow management server 100 as an on-premises server installed at the site where the workflow management is performed, the workflow management server 100 is not limited thereto. As another embodiment, the workflow management server 100 can be constructed as a cloud server, and a workflow management terminal 101 (described later) can connect thereto over the Internet. The same applied to the order receiving system server 110, which will be described later.

The workflow management terminal 101 is a terminal which is operated by a workflow administrator, is connected to the workflow management server 100 over a network, and executes various types of functions. Specifically, the workflow management terminal 101 changes settings of workflow management functions, and confirms the statuses of devices in the production system 120, and the like.

The order receiving system server 110 manages a system for receiving orders from end users regarding commercial printing products. Printing data and PRX data are generated and sent to the workflow management server 100 in accordance with the product ordered and details of the order from the end user.

An order receiving system management terminal 111 is a terminal which is operated by an order receiving system administrator, is connected to the order receiving system server 110 over a network, and executes various types of functions. Specifically, the order receiving system management terminal 111 performs functions such as setting a required quality for each product, confirming a status of each ordered job, viewing quality information of products for each ordered job, and the like.

An end user terminal 112 is a terminal operated by an end user, and is connected to the order receiving system server 110 over a network. The end user terminal 112 accepts instructions from the end user for selecting products, sending document data, placing orders from a UI such as a web browser, and sending the instructions to the order receiving system server 110.

The production system 120 is a system for producing commercial printing products ordered by the end user. Specifically, the production system 120 includes apparatuses such as a printing apparatus 121, a print server 122 that controls the printing apparatus 121, a post-processing apparatus 123, an inspection apparatus 124, and the like. The printing apparatus 121 and the print server 122 are connected by a network or a dedicated interface.

The first embodiment describes the post-processing apparatus 123 and the inspection apparatus 124 as a near-line configuration connected to other devices by a network. However, the present invention is not limited thereto, and an off-line configuration that operates independently can be used. In the case of an off-line configuration, the apparatuses are connected to an operation terminal (not shown) that can be connected to the network, and is connected to the network via the operation terminal. In all cases, these apparatuses are connected to the workflow management server 100 over a network, and send and receive various types of information. The production system 120 may also be configured not to include any or all of the print server 122, the post-processing apparatus 123, and the inspection apparatus 124.

The printing apparatus 121 executes a printing process on the basis of the data and instructions from the workflow management server 100. The printing method is not particularly limited, and may be an electrophotographic method, an ink jet method, or another method. An administrator or operator of the production system 120 can instruct control pertaining to printing via a UI (user interface) of the printing apparatus 121.

The print server 122 is a server that controls the printing apparatus 121. As in a typical printing system, the administrator or operator of the production system 120 can instruct the control pertaining to printing through a UI of the print server 122.

Although the first embodiment will describe a color management module 545 (described later with reference to FIG. 5C) as being included in the print server 122, the configuration is not limited thereto. For example, a color management server (not shown) that can be connected to the print server 122 and the printing apparatus 121 over a network can be installed separately, and the color management server can perform processing related to color management.

The post-processing apparatus 123 applies post-processing to printed sheets and bundles of sheets. This post-processing is, for example, creasing and folding of sheets, or cutting of bundles of sheets, binding processes, and the like.

The inspection apparatus 124 detects defects in the final product or an intermediate product and performs processing such as notifying the user, removing the products from the production line, or the like.

A production operator terminal 125 is a terminal used by an operator to operate the various types of devices of the production system 120 described above. The production operator terminal 125 has functions such as checking operation statuses of devices, and checking error information when an abnormality occurs, and the like. Alternatively, a UI operation unit provided in each device in the production system 120 may be configured to handle these functions, rather than an external terminal.

The hardware configurations of the various apparatuses according to the first embodiment will be described next.

Figure 3:
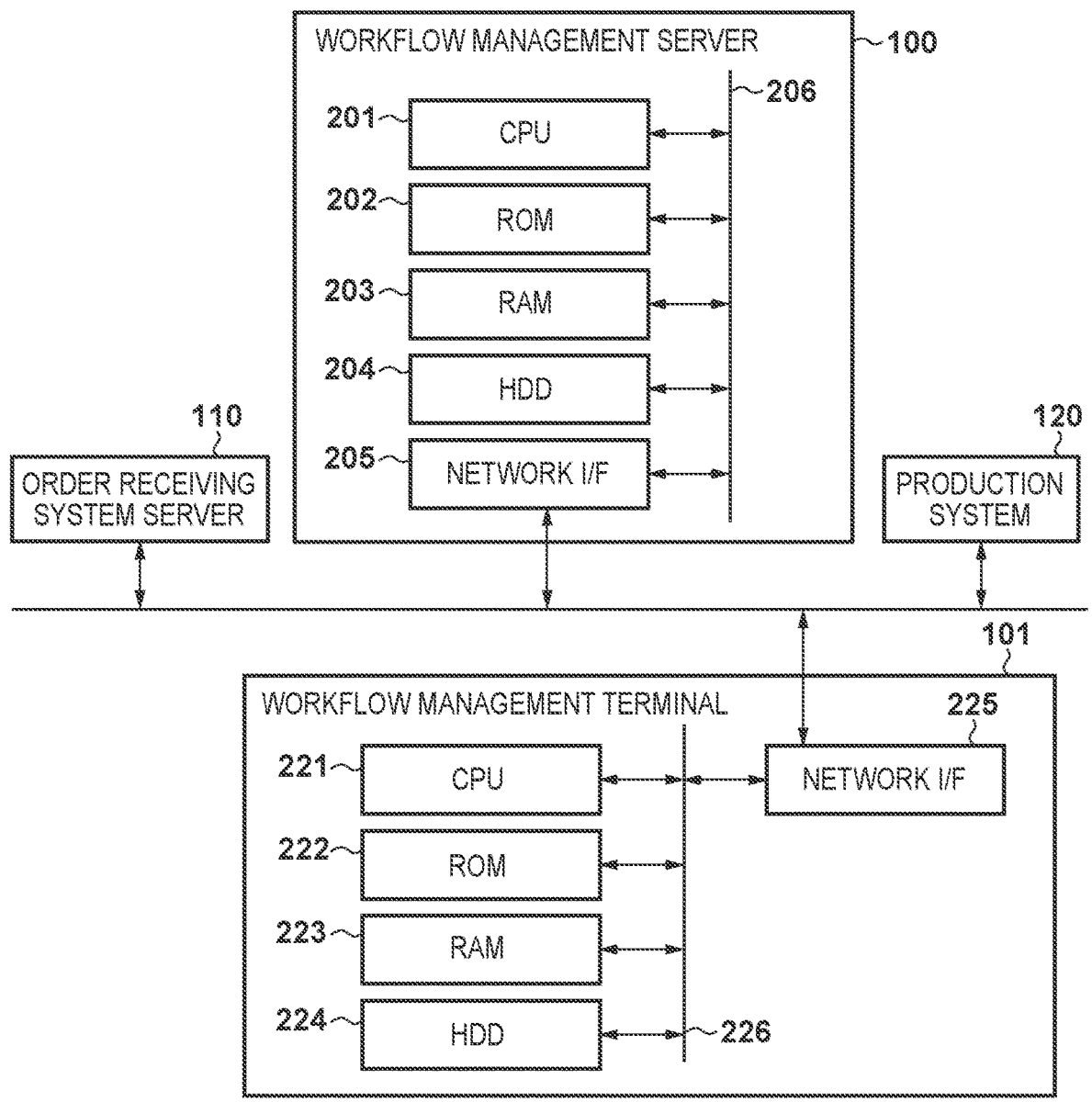
FIG. 3 is a block diagram for describing the hardware configuration of a workflow management system, including a workflow management server and a workflow management terminal, according to the first embodiment.

FIG. 3 is a block diagram for describing the hardware configuration of a workflow management system, including the workflow management server 100 and the workflow management terminal 101, according to the first embodiment.

The hardware configuration of the workflow management server 100 will be described first.

A CPU 201 deploys a control program stored in ROM 202 or a hard disk (HDD) 204 in RAM 203, executes the deployed program, and comprehensively controls access to various types of devices connected to a system bus 206. The ROM 202 stores the control program and the like which can be executed by the CPU 201. The RAM 203 functions mainly as main memory, a work area, and the like for the CPU 201, and is configured so that the memory capacity can be expanded using optional RAM connected to an expansion port (not shown). The hard disk (HDD) 204 stores a boot program, various types of applications, font data, user files, editing files, and the like. Although the HDD 204 is used in the first embodiment, an SD card, flash memory, and the like may be used as an external storage apparatus in addition to an HDD. This applies to the other apparatuses that have HDDs, described later. A network I/F 205 performs data communication with various types of apparatuses over a network. Note that the hardware configuration of the order receiving system server 110 is the same as that of the workflow management server 100 and will therefore not be described.

The hardware configuration of the workflow management terminal 101 will be described next.

A CPU 221 deploys a control program stored in ROM 222 or a hard disk (HDD) 224 in RAM 223, executes the deployed program, and comprehensively controls access to various types of devices connected to a system bus 226. The ROM 222 stores the control program and the like which can be executed by the CPU 221. The RAM 223 functions mainly as main memory, a work area, and the like for the CPU 221, and is configured so that the memory capacity can be expanded using optional RAM connected to an expansion port (not shown). The hard disk (HDD) 224 stores a boot program, various types of applications, font data, user files, editing files, and the like. A network I/F 225 performs data communication with other apparatuses over a network. Note that the hardware configurations of terminal apparatuses such as the order receiving system management terminal 111, the end user terminal 112, and production operator terminal 125 are the same as that of the workflow management terminal 101, and will therefore not be described.

FIG. 4 is a block diagram for describing the hardware configuration of the production system 120 according to the first embodiment.

A CPU 301 of the print server 122 deploys a control program stored in ROM 302 or a hard disk (HDD) 304 in RAM 303. The CPU 301 then executes the deployed program, and comprehensively controls access to various types of devices connected to a system bus 306. The ROM 302 stores the control program and the like which can be executed by the CPU 301. The RAM 303 functions mainly as main memory, a work area, and the like for the CPU 301, and is configured so that the memory capacity can be expanded using optional RAM connected to an expansion port (not shown). The hard disk (HDD) 304 stores a boot program, various types of applications, font data, user files, editing files, and the like. A network I/F 305 performs data communication with other apparatuses over a network. A printer I/F 307 controls the output of images to an image forming unit 321 of the printing apparatus 121. The printer I/F 307 controls a measuring unit 322 inside the printing apparatus 121 and receives corresponding measurement results.

The printing apparatus 121 includes the image forming unit 321, which handles at least printing operations, and the measuring unit 322, which will be described later. The configuration may be such that a paper feed apparatus, an in-line post-processing apparatus (not shown), or the like are also connected. The image forming unit 321 outputs (prints) printing data onto a sheet. The hardware configuration thereof is the same as that of a typical printing apparatus.

The measuring unit 322 measures the printed material produced by the image forming unit 321 according to instructions from the print server 122 or the printing apparatus 121. The measurement method is a known measurement method such as spectrophotometry, density measurement, CCS scanning, CIS scanning, or the like. Although the first embodiment describes the measuring unit 322 as being provided within the printing apparatus 121, the configuration is not limited thereto. For example, the configuration may be such that the measuring unit 322 is connected to the network by itself, independent of the printing apparatus 121. Alternatively, the measuring unit 322 may be connected to an operation terminal (not shown) that can be connected to the network, and then connect to the network via that operation terminal. In either case, the measuring unit 322 is connected to the workflow management server 100 over the network, and sends and receives various types of information.

The software configurations of the various apparatuses according to the first embodiment will be described next.

Figure 5A:
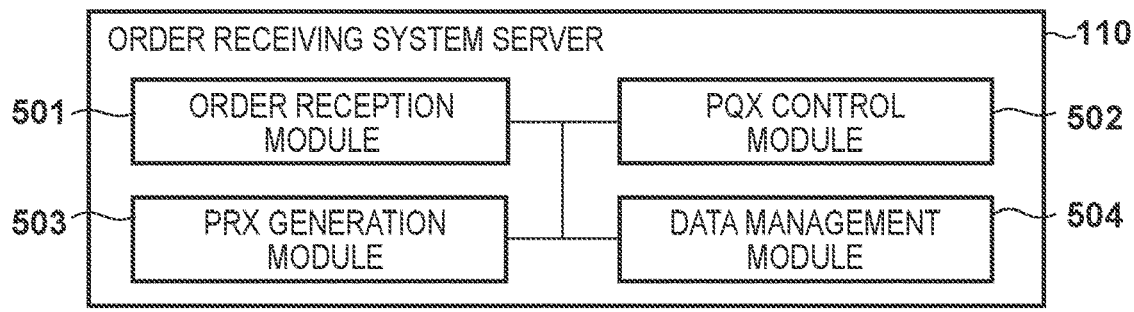
FIGS. 5A to 5C are diagrams for describing the software configurations of various apparatuses of the printing system according to the first embodiment.

FIG. 5A is a block diagram for describing the software configuration of the order receiving system server 110 according to the first embodiment. These software modules are stored as programs in an HDD (not shown) of the order receiving system server 110, and a CPU (not shown) of the order receiving system server 110 deploys the programs in RAM (not shown) and executes the programs.

An order reception module 501 receives order information of a product from the end user terminal 112 over the network. The order information includes information on a product type, image data which has been loaded, information of requirements pertaining to quality, and the like. Although the first embodiment will described PDF (portable document format) data as the loaded data, the data is not limited thereto. The data can also be in any other common image data format that the production system 120 can interpret.

A PQX control module 502 receives PQX data from the workflow management server 100 and performs predetermined control. This includes, for example, recording into a database, processing for converting into information to be presented to the end user, and so on. A PRX generation module 503 analyzes the order information received from the order reception module 501 and generates PRX data. The generated PRX data is sent to the workflow management server 100.

A data management module 504 stores information such as the order information, the PRX data, the PQX data, and the like. The data management module 504 also sends the loaded image data, product type information, and PRX data to the workflow management server 100. Furthermore, the data management module 504 exchanges other data with various types of apparatuses.

Figure 5B:
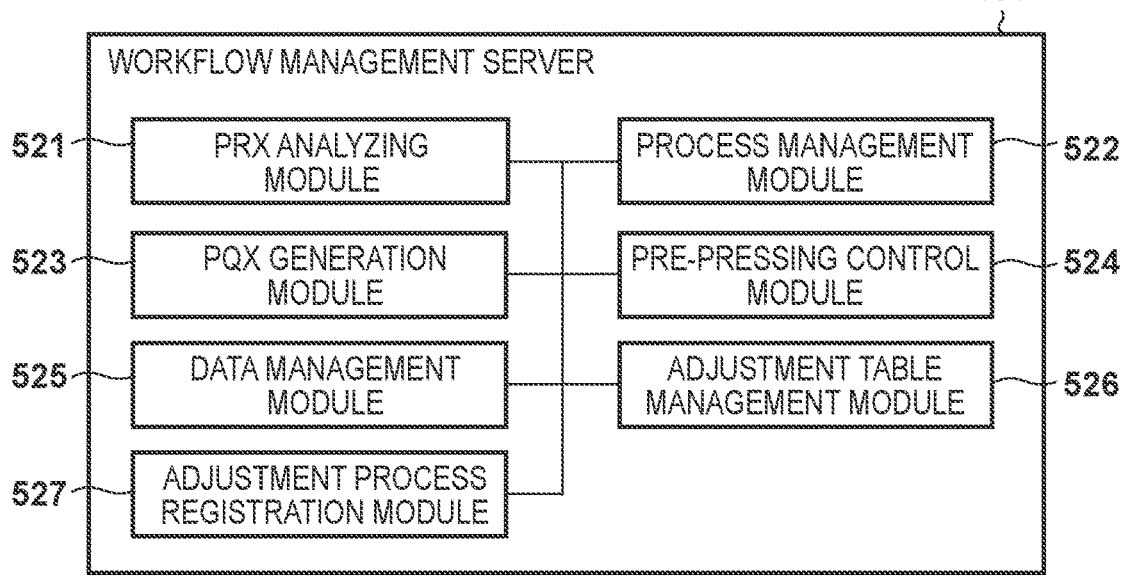

FIG. 5B is a block diagram for describing the software configuration of the workflow management server 100 according to the first embodiment. These software modules are stored as programs in the HDD 204 of the workflow management server 100, and are implemented by the CPU 201, which deploys the programs in the RAM 203 and executes the programs.

The PRX analyzing module 521 analyzes the PRX data received from the order receiving system server 110 and specifies print quality requirements and some ef required pre-pressing processes. The "print quality requirements" are, for example, that an average color difference obtained from the measurement results of predetermined color patches is within a specific standard. The pre-pressing process includes, for example, adding, to a margin of the image data, images of the color patches to be measured in a color quality verification process, and the like.

A process management module 522 uses the product type information received from the order receiving system server 110 and the information indicating an analysis result from the PRX analyzing module 521 to determine the production system 120, execute commands for a pre-pressing control module 524, and the like. Depending on the product type, a product may be constituted by a plurality of types of parts. In this case, it is necessary for the process management module 522 to generate jobs part-by-part from a single order. The process management module 522 also generates job ticket data that is referenced by each device in the production system 120. Although the known JDF (job definition format) data is used as the job ticket data in the first embodiment, the job ticket data is not limited thereto. The configuration may be such that another known job ticket data format which can be interpreted by the production system 120 is used. The process management module 522 also refers to the information on the print quality requirements and generates the action setting information for the post-processing apparatus 123, the inspection apparatus 124, and the like. Furthermore, the process management module 522 sends the PDF data, the JDF data, and the action setting information of each device after the pre-pressing process (described later) to the production system 120.

A PQX generation module 523 refers to the various types of information received from the production system 120, generates the PQX data, and sends the PQX data to the order receiving system server 110. This will be described in detail later.

The pre-pressing control module 524 executes a pre-pressing process on the loaded image data on the basis of instructions from the process management module 522, and sends the processed PDF data to the process management module 522.

A data management module 525 sends the PQX data to the order receiving system server 110. The data management module 525 also sends, to the production system 120, the PDF data, the JDF data, and instruction information for the various types of apparatuses constituting the production system 120. Furthermore, the data management module 525 exchanges other data with various types of apparatuses.

An adjustment table management module 526, an adjustment process registration module 527, and an adjustment control module 546 provided in the production system 120 (described later), handle a quality verification process related to the print quality requirements, as well as corresponding adjustment processes, which can be executed by the production system 120. An example of the adjustment processing pertaining to print quality requirements is front/back registration adjustment processing, which is used to adjust the positions of printed images on the front and back of a sheet to appropriate positions. There is also calibration processing for ensuring the accuracy of color in a print result, reducing variation in print colors when printing a large number of pages, and ensuring stability. Adjustment functions according to the embodiment may be functions that allow the end user to make execution instructions or set execution schedules, execution conditions, and the like in advance, or may be functions that do not require the end user to decide whether or not to execute the function, such as an internal equipment cleaning process. Such adjustment processing is performed for the purpose of improving the quality of the printed products.

The adjustment table management module 526 is responsible for managing an adjustment table. The adjustment table records identification information, the quality verification process, condition to be met after the quality verification process (described as a "threshold" in the embodiment), and, if there is another adjustment process to be performed when the threshold is not met, the name of that other adjustment process (described as an "adjustment process in the event of failure" in the embodiment).

The adjustment process registration module 527 handles processing for determining a series of quality verification processes to be performed by the production system 120 on the basis of the PRX data analyzed by the PRX analyzing module 521. The adjustment process registration module 527 also registers the details of the determined series of quality verification processes along with the identification information in the production system 120.

Figure 5C:
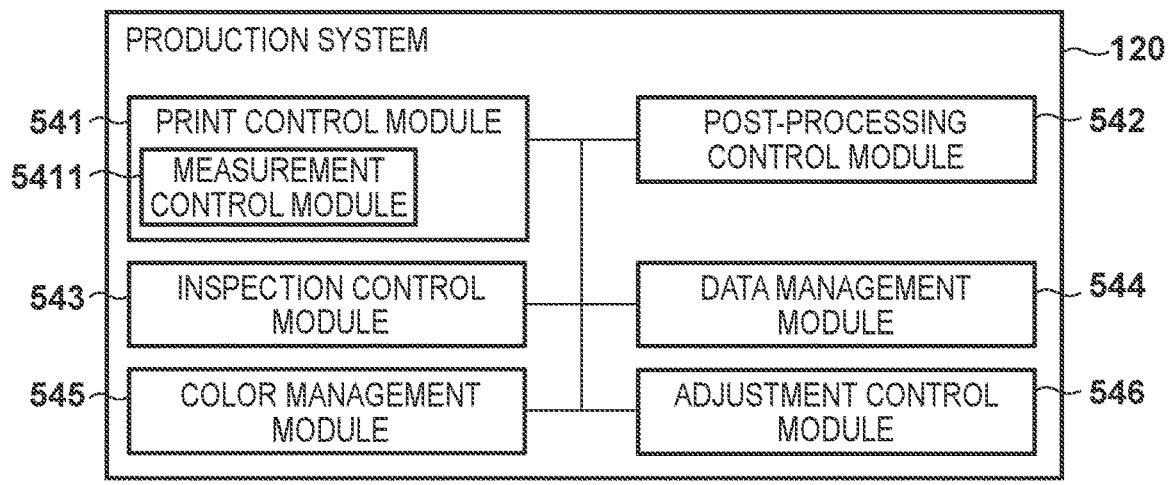

FIG. 5C is a block diagram for describing the software configuration of the production system 120 according to the first embodiment. These software modules are stored as programs in the HDD 304 of the print server 122 in the various types of devices constituting the production system 120, and are implemented by the CPU 301 deploying the programs in the RAM 303 and executing the programs. Although the production system 120 includes the printing apparatus 121, the print server 122, the post-processing apparatus 123, and the inspection apparatus 124, it should be noted that in the first embodiment, these four pieces of hardware will be described as a single piece of hardware called the "production system 120".

A print control module 541 executes print control using the information received from the workflow management server 100 (PDF data and JDF data). The print control module 541 also has an adjustment function for adjusting the print quality, and executes the adjustment function in response to a control instruction received from the workflow management server 100, the print server 122, or the production operator terminal 125. The print control module 541 includes a measurement control module 5411. The measurement control module 5411 executes measurement control using the measuring unit 322 in response to a control instruction received from the workflow management server 100, the print server 122, or an operator terminal.

A post-processing control module 542 executes post-processing control in response to a control instruction received from the workflow management server 100.

An inspection control module 543 executes inspection control using the inspection apparatus 124 in response to a control instruction received from the workflow management server 100. The inspection control module 543 compares image data read by a sensor in the inspection apparatus 124 with image data serving as a reference. If, as a result of the comparison, a difference exceeding a predetermined tolerance range is detected, the inspected product is identified as defective, and predetermined control, such as notifying a user, is performed.

A data management module 544 sends, to the workflow management server 100, information such as control results of the various types of devices of the production system 120. Furthermore, the data management module 544 exchanges other data with various types of apparatuses. Note that the data management module 544 may be provided individually for each device.

The color management module 545 manages color quality of the output from the printing apparatus 121 and the print server 122. Specifically, the color management module 545 controls known color adjustment processing, color quality verification processing, and the like.

The adjustment control module 546 registers, in the production system 120, the details of the quality verification process of the production system 120 pertaining to the print quality requirements, communicated along with the identification information from the adjustment process registration module 527 included in the workflow management server 100. Additionally, when the identification information is received along with a print job from the workflow management server 100, the adjustment control module 546 handles control for calling and executing a pre-registered series of quality verification processes corresponding to that identification information.

FIGS. 6A and 6B are sequence charts for describing a flow of processing in the printing system according to the first embodiment.

At reference numeral 601, the order reception module 501 of the order receiving system server 110 receives an order from an end user. The content of the order includes PDF data as print data and a product type pertaining to the product. The product type is information expressing the type of the product defined in advance by the order receiving system server 110. For example, assume that the order receiving system server 110 defines two product types, "photobook" and "business card". The product type of "photobook" expresses a type of the product in which a finished size is "A5", a binding type is "perfect binding", a body paper type is "glossy paper", and a text finish is "laminated". The product type of "business card" expresses a type of product in which the finished size is "business card", the binding type is "none", and the paper type is "fine quality paper". The types of products to be produced by the order receiving system, the workflow management server 100, and the production system 120 are defined by providing these product types. The first embodiment will be described assuming the end user has selected "photobook". Additionally, although the first embodiment will describe a configuration in which the order receiving system server 110 defines the product type, the configuration is not limited thereto, and the configuration may be such that an order from an end user is manually entered by sales staff.

Next, at reference numeral 602, the PRX generation module 503 of the order receiving system server 110 generates PRX data from the product type received from the order reception module 501 at reference numeral 601. An overview of the PRX data generated in this process will be described first.

FIG. 9 is a diagram illustrating an example of the PRX data according to the first embodiment.

As illustrated in FIG. 9, the PRX data includes requirements for quality, such as "QualitySpecification". "QualityGoals" has fields that contain quality specifications and evaluation standards, such as color, registration, barcode, and the like. "Color" indicates a color score calculation method, a score standard, and the like. "Registration" indicates a registration score calculation method, a score standard, and the like. "ScoringInfo" indicates information of a formula specified by a buyer for specifying a print quality score, grade, or the like. "MinimumAcceptableRank" indicates the minimum acceptable quality rank. Although the first embodiment describes a configuration that uses some of the "QualityGoals", the configuration is not limited thereto, and the configuration may be such that other fields of the PRX data are used. Color fluctuation inspection by the print control module 541 is an example of first "QualityGoals". As described with reference to FIG. 5C, the print control module 541 includes the measurement control module 5411, and can monitor color fluctuation in the production system 120 during production. JapanColor is an example of a print color standard. The production system 120 which meets this standard can guarantee that the quality of printed material will meet or exceed a certain level.

In the first embodiment, color fluctuation is inspected by confirming that each job meets an equivalent of the JapanColor standard. The color fluctuation is inspected using an average value of color differences ΔE00 (CIE DE2000) between a colorimetric value of printed material produced by the production system 120 and a JapanColor control value. An example of the "Color" parameter description in this case will be described below. A score calculation formula "JapanColor dE (CIE DE2000)" is denoted in "ComplianceGoal". The minimum acceptable quality rank and a target quality rank are denoted in "ScoringInfo". The minimum acceptable quality rank is denoted in "MinimumAcceptableRank". In the example illustrated here, "5" is defined as the minimum quality rank. The target quality rank is denoted in "DesiredRank". In the example illustrated here, "6" is defined as the target quality rank. The quality rank in the PRX data, of the score calculated using the score formula, is denoted in "ColorScoringScale". In the quality rank in the PRX data, a higher number indicates a higher quality. In the example illustrated here, a case where a calculation result of dE (CIE DE2000) is "2 or less" is defined as rank "7". A case where the calculation result is "greater than 2 and 3 or less" is defined as rank "6". A case where the calculation result is "greater than 3 and 5 or less" is defined as rank "5".

Front/back registration misalignment inspection by the print control module 541 is an example of second "QualityGoals". The print control module 541 includes the measurement control module 5411, and can monitor front/back registration misalignment fluctuation in the production system 120 during production. An example of the "Registration" parameter description in this case will be described below. "ScoringInfo", "MinimumAcceptableRank", and "DesiredRank" have the same meaning as in the description of "Color". In the example illustrated here, "6" is defined as the minimum quality rank level, and "7" is defined as the target quality rank. The quality rank in the PRX data, of the score calculated using the score formula, is denoted in "ColorScoringScale". In the quality rank in the PRX data, a higher number indicates a higher quality. In the example illustrated here, a case where the amount of misalignment in the front/back registration is "1 mm or less" is defined as rank "8". A case where the amount of misalignment is "greater than 1 mm and 2 mm or less" is defined as rank "7". A case where the amount of misalignment is "greater than 2 mm and 4 mm or less" is defined as rank "6".

The descriptions will assume that the PRX data expressing the quality standards described thus far is held by the PRX generation module 503 as fixed reference values. The PRX generation module 503 generates PRX data from the product type received at reference numeral 601. In the first embodiment, the PRX generation module 503 determines the MinimumAcceptableRank on the basis of the product type. For example, with the product type of "photobook", the "MinimumAcceptableRank" of "Color" is set to "5" and the "MinimumAcceptableRank" of "Registration" is set to "6". By doing so, each module that receives the PRX data can interpret the print quality requirements and perform processing according to the quality requirements.

Next, at reference numeral 603, the data management module 504 of the order receiving system server 110 sends the PDF data and product type ordered by the end user and the PRX data generated by the PRX generation module 503 to the data management module 504 of the workflow management server 100.

Through this, at reference numeral 604, the PRX analyzing module 521 of the workflow management server 100 determines the details of the print quality requirements and pre-pressing process on the basis of the PRX data received by the data management module 525. Print quality requirements indicating "perform ΔE00 inspection using print control module 541; minimum quality rank is ΔE00 of 5 or less" are analyzed on the basis of the "Color" information. Additionally, print quality requirements indicating "perform front/back registration misalignment inspection using print control module 541; minimum quality rank is misalignment amount of 4 mm or less" are analyzed on the basis of the "Registration" information. Furthermore, the PRX analyzing module 521 determines whether or not the pre-pressing process is required in accordance with the print quality requirements. In order to implement the aforementioned print quality requirements of "perform ΔE00 inspection using the print control module 541; minimum quality rank is ΔE00 of 5 or less", it is necessary for the production system 120 to print a designated chart and measure the color of the chart.

In the first embodiment, patches are printed on an edge of a sheet, and color fluctuation is inspected by measuring the colors of the patches using the measurement control module 5411 provided in the production system 120. Specifically, a process of embedding a JapanColor certification chart (e.g., 54 patches) in the PDF data is necessary. Therefore, the PRX analyzing module 521 retains the details of this patch embedding process as an additional process that is required when executing the pre-pressing process. Although the first embodiment describes a case where the process of inserting patches is necessary as an example, the configuration is not limited thereto, and may be such that a patch chart in which only patches are arranged is generated and the colors are measured. In this case, the configuration need not be such that the processing is additionally executed when the pre-pressing process is executed, and may instead involve the color management module provided in the production system generating a patch chart and reading the patches. At this time, the PRX analyzing module 521 stores the details of instructions to the process management module 522 so that the instructions can be issued to the process management module 522 to have the patch chart generated and read on the production system side.

Next, at reference numeral 605, the process management module 522 of the workflow management server 100 determines the production system 120 that will actually perform the production from among a plurality of production systems 120 connected to the workflow management server 100. Here, the process management module 522 of the workflow management server 100 makes the determination on the basis of the product type received at reference numeral 603 and the print quality requirements determined at reference numeral 604. For example, in the case of a photobook, after the printing and binding is performed by the production system 120, the edges aside from the bound edge are cut. In the case of photobooks subject to perfect binding, it is necessary for the size of the sheet for the front cover to be twice as large as the sheet for the body. Therefore, in the case of a photobook where A5 is specified as the finished size and glossy paper as the paper type for the body, it is necessary to take into account the cutting after printing and printing onto A4-size paper for the front cover. At this time, a production system 120 that can handle printing onto glossy paper having a size of A4 or larger is selected by the process management module 522. In addition, there are cases where a hard cover is set as the front cover of the photobook, which therefore cannot be printed by the production system 120 selected as described earlier. In that case, the PDF data can be divided into the front cover and the body, and a job for the front cover and a job for the body can be printed by a plurality of production systems 120.

It is assumed that printing capabilities of the production system 120 under the management of the workflow management server 100 are held by the data management module 525, and the process management module 522 can obtain the printing capabilities from the data management module 525 as necessary. In the first embodiment, the production system is determined from the perspective of what paper can be used and whether or not the quality requirements can be met, but the present invention is not limited thereto. For example, the configuration may be such that the production system is determined according to the number of sheets (number of copies) output in the print job and the productivity of the production system.

The subsequent reference numerals 607 to 610 will be described using a flowchart for the workflow management server 100, illustrated in FIG. 7, after describing a sequence of the workflow management server 100 and the production system 120 with reference to FIGS. 6A and 6B.

At reference numeral 606, the adjustment table management module 526 of the workflow management server 100 determines the quality verification process and identification information from the PRX data. A method for determining the quality verification process and the identification information will be described later with reference to FIG. 7. The quality verification process and identification information are managed in an adjustment table 1000 illustrated in FIG. 10A.

FIGS. 10A and 10B are diagrams illustrating the data structures of adjustment tables according to the embodiment. In the first embodiment, only the adjustment table illustrated in FIG. 10A is used. FIG. 10B will be used in another embodiment.

In FIG. 10A, identification information 1001 is information generated to be unique in the adjustment table so that the information can be distinguished on a job-by-job basis. An adjustment name of an adjustment process set (Adjustment Set A) and a job name (job 2) that performs the adjustment process set (described later) are used as examples of the identification information. Quality verification process 1002 indicates the name of the quality verification process performed by the production system 120. In the example in FIG. 10A, "JapanColorVerification" and "Front/Back Registration Verification" are performed in "Adjustment Set A". Threshold 1003 indicates an allowable amount (a threshold) and a result of the quality verification process executed in accordance with the quality verification process 1002. In the example of "Adjustment Set A" in FIG. 10A, "JapanColorVerification" indicates that "dE 5 or less" is the allowable amount. Additionally, "Front/Back Registration Verification" indicates that "an amount of misalignment of 4 mm or less" is the allowable amount. Adjustment process in event of failure 1004 indicates the name of an adjustment process executed by the production system 120 when a result of performing the quality verification process denoted in quality verification process 1002 does not meet the threshold 1003. In the example of "Adjustment Set A" in FIG. 10A, if "dE 5 or less" is not met in "JapanColorVerification", "JapanColorCalibration" is executed. If the "Front/Back Registration Verification" does not meet the "misalignment amount of 4 mm or less", "front/back registration full auto adjustment" is executed.

Next, in reference numeral 607, the adjustment process registration module 527 of the workflow management server 100 registers, in the production system 120, the identification information and quality verification process created by the adjustment table management module 526 at reference numeral 606.

Then, at reference numeral 608, the adjustment control module 546 of the production system 120 registers the identification information and quality verification process received from the workflow management server 100 in an adjustment execution table 1100 (FIG. 11A). This adjustment execution table is held by the production system 120, and includes quality verification information registered by the workflow management server 100 and an execution device 1101 of the production system 120. The adjustment execution table will be described with reference to FIG. 11A.

FIG. 11A is a diagram illustrating an example of the data structure of the adjustment execution table 1100 according to the first embodiment.

At reference numeral 608, the identification information and the quality verification process received from the workflow management server 100 are managed. The identification information 1001, the quality verification process 1002, the threshold 1003, and the adjustment process in event of failure 1004 in the drawing are the same information as in FIG. 10A, and will therefore not be described. Execution device 1101 is data that indicates which apparatus will execute the quality verification process 1002. The drawing here indicates that "JapanColorVerification" is performed by the print server 122, whereas "Front/Back Registration Verification" is performed by the printing apparatus 121. The adjustment control module 546 determines the execution device 1101 by referring to a capability table 1300 illustrated in FIG. 13. FIG. 13 will therefore be described first.

FIG. 13 is a diagram illustrating an example of the capability table 1300 according to the first embodiment.

This capability table 1300 is a table that indicates what kind of quality verification process 1002 and adjustment process in event of failure 1004 are provided by each apparatus included in the production system 120. Apparatus name 1301 indicates a name of the apparatus that can perform each process. Auto-execution flag 1302 is a flag indicating whether or not the apparatus indicated by the apparatus name 1301 is capable of automatically executing both the quality verification process 1002 and the adjustment process in event of failure 1004. Here, automatic execution means that there is no need for the end user to perform any work from the start of the execution of the quality verification process 1002, the adjustment process in event of failure 1004, and so on. For example, in front/back registration adjustment, if the printing apparatus 121 prints a test chart to confirm the amount of misalignment and an image reading sensor provided in the apparatus reads the printed test chart, this corresponds to automatic execution, and the auto-execution flag is set to "Yes". On the other hand, even if the adjustment process is used for the same type of purpose, the end user may place the printed test chart on an image reading sensor, e.g., a scanner (not shown). In such a case, instead of automatic execution, work is required of the end user in order to implement the adjustment process, and thus the auto-execution flag is set to "No".

Also, as illustrated in FIG. 13, even if the quality verification process is the same, there may be a plurality of instances of the adjustment process in the event of failure. For example, FIG. 13 indicates two instances of the adjustment process in the event of failure, for "JapanColorVerification". "JapanColorCalibration" is an apparatus-internal color adjustment pertaining to a JapanColor output profile provided in the print server. On the other hand, "JapanColor output profile recreation" indicates that the output profile itself will be recreated. If the status of the print server or the printing apparatus changes significantly, it may be necessary to use such a measure for the adjustment process. Creating the output profile may involve color measurement work by the end user, and in that case, the auto-execution flag is set to "No" as indicated in FIG. 13. In general, adjustment processes that can be executed automatically are short or small-scale adjustments, while adjustment processes that cannot be executed automatically are often highly-precise adjustments that take a long time. This completes the descriptions with reference to FIG. 13, and the descriptions will therefore return to FIG. 11A.

Referring to FIG. 13, the adjustment control module 546 extracts the apparatus name 1301 corresponding to the quality verification process 1002 and the adjustment process in event of failure 1004, and writes those items into execution device 1101 of the adjustment execution table 1100.

Next, moving to reference numeral 609, the process management module 522 of the workflow management server 100 generates a print job including print data, JDF data, and the like using the print quality requirements and pre-pressing process determined at reference numeral 604.

Then, at reference numeral 610, the process management module 522 of the workflow management server 100 submits the print job and the identification information to the production system 120. Here, "print job" includes print data created from the print quality requirements and the pre-pressing process determined at reference numeral 604. "Identification information" refers to the identification information created by the adjustment table management module 526 at reference numeral 606 and stored in the adjustment table 1000.

Next, at reference numeral 611, the adjustment control module 546 of the production system 120 refers to the adjustment execution table 1100, and determines the quality verification process to be executed on the basis of the identification information received from the workflow management server 100 at reference numeral 610. The adjustment control module 546 then executes the determined quality verification process. The adjustment control module 546 refers to the execution device 1101 in the adjustment execution table 1100 and issues a command to execute the quality verification process to the indicated apparatus.

Then, at reference numeral 612, the print control module 541 of the production system 120 executes the print job received from the workflow management server 100 at reference numeral 610. Here, printing onto paper, post-processing, and the like are executed according to the received print data, JDF data, and the like. The subsequent reference numerals 613 and 614 will not be described in the first embodiment, but will be used in other embodiments.

FIG. 7 is a flowchart for describing control processing performed by the workflow management server 100 according to the first embodiment of the present invention. This flowchart is called after the workflow management server 100 has determined the production system to be used (reference numeral 605). Note that the programs that execute these processes are read out from the ROM 202 and deployed in the RAM 203, and the processing indicated in this flowchart is executed by the CPU 201 executing those control programs. The reference numerals 606, 607, 609, and 610 in FIG. 7 indicate processes corresponding to the sequence charts in FIGS. 6A and 6B.

First, in step S701, functioning as the adjustment table management module 526, the CPU 201 determines whether or not the quality verification process is denoted in the PRX data. The data management module 525 holds, for example, a PRX-adjustment process correspondence table 1110 illustrated in FIG. 11B as a table for verification.

FIG. 11B is a diagram illustrating the PRX-adjustment process correspondence table according to the first embodiment.

PRX parameter 1111 indicates a parameter (element) included in the PRX data to be analyzed at reference numeral 604 in FIGS. 6A and 6B. Parameter value 1112 indicates a value denoted in PRX parameter 1111. Although only "ComplianceGoal" is denoted in PRX parameter 1111, any parameter may be used as long as it is compliant with PRX data.

Quality verification process 1113 indicates the name of the quality verification process executed by the production system 120 when the value of PRX parameter 1111 is parameter value 1112. Adjustment process in event of failure 1114 indicates the name of the adjustment process to be executed when the production system 120 executes the quality verification process 1113 and the result of the execution does not exceed the threshold (the minimum quality rank). For example, the correspondence indicated in a first line 1115 of the PRX-adjustment process correspondence table 1110 in FIG. 11B will be described. If the "ComplianceGoal" of the PRX data is "JapanColor dE (CIE DE2000)", "JapanColorVerification" is performed. If the quality of "JapanColorVerification" does not exceed the threshold (minimum quality rank), "JapanColorCalibration" is performed. The descriptions will return to the process of step S701.

In step S701, the adjustment table management module 526 verifies a result of analyzing the PRX data illustrated in FIG. 9 against the PRX-adjustment process correspondence table 1110 in FIG. 11B. It can be seen that "ComplianceGoal" includes "JapanColor dE (CIE DE2000)" and "FrontAndBackRegistration". In this case, it is determined that the quality verification process is denoted in the PRX data, and the processing advances to step S702. On the other hand, if there is no matching parameter when the result of analyzing the PRX data (not shown) is verified against the PRX-adjustment process correspondence table, the processing advances to step S706.

In step S702, functioning as the adjustment table management module 526, the CPU 201 determines the quality verification process to be executed by the production system 120, and the threshold thereof, on the basis of the result of the verification in step S701. In the PRX data illustrated in FIG. 9, "ComplianceGoal" includes "JapanColor dE (CIE DE2000)" and "FrontAndBackRegistration". When this parameter value is verified against the PRX-adjustment process correspondence table 1110, line 1115 and line 1116 match. Therefore, "JapanColorVerification" is executed in the production system 120, and if the threshold is not met, "JapanColorCalibration" is executed. "Front/Back Registration Verification" is also executed, and if the threshold is not met, "front/back registration full auto correction" is executed.

Note that in the PRX data illustrated in FIG. 9, the "MinimumAcceptableRank" of "JapanColor dE (CIE DE2000)" is "5". Based on a parameter value of "ParameterScore Rank="5", this rank "5" is a quality rank in which dE is "greater than 3 and 5 or less". The threshold value can therefore be determined as "dE 5 or less". In the same manner, the threshold for "FrontAndBackRegistration" can be determined to be "misalignment amount of 4 mm or less". To summarize the information determined in this manner, the production system 120 executes "JapanColorVerification", and if the threshold of "dE 5 or less" is not met, executes "JapanColorCalibration". "Front/Back Registration Verification" is also executed, and if the threshold of "misalignment amount of 4 mm or less" is not met, "front/back registration full auto correction" is executed.

The processing then advances to step S703, where functioning as the adjustment table management module 526, the CPU 201 generates identification information for the quality verification process determined in step S702 and adds the identification information to the adjustment table 1000 in FIG. 10A. Identification information of "Adjustment Set A" is generated for the aforementioned "JapanColorVerification" and "FrontAndBackRegistration", and is added to the adjustment table 1000, as indicated by line 1005.

The processing then advances to step S704, where functioning as the adjustment process registration module 527, the CPU 201 registers the identification information and the quality verification process created by the adjustment table management module 526 in step S703 in the production system 120 determined at 605. Processing performed by the production system 120 at the time of this registration will be described later with reference to FIGS. 8A and 8B.

The processing then advances to step S705, where functioning as the adjustment table management module 526, the CPU 201 stores the print job and the identification information generated in step S703 in association with each other. A print job-identification information correspondence table 1120, such as that illustrated in FIG. 11C, is created here.

FIG. 11C is a diagram illustrating an example of the print job-identification information correspondence table 1120 according to the first embodiment.

This table 1120 stores a print job name 1121 and identification information 1122 in association with each other. When associating the aforementioned "Adjustment Set A" with a print job called "job 1", the information is added as indicated in line 1123.

Next, the processing advances to step S706, where the CPU 201 generates a print job including print data, JDF data, and the like using details of the pre-pressing process and the like analyzed by the PRX analyzing module 521 at reference numeral 604. This print job is a print job for a production system, sent to the production system 120 by the workflow management server 100. The print data, the JDF data, and the like in the print job for the production system 120 are based on the print data, the JDF data, and the like included in the job sent from the order receiving system server 110 to the workflow management server 100 at reference numeral 603 of the sequence chart in FIG. 6A.

The processing then advances to step S707, where functioning as the adjustment table management module 526, the CPU 201 refers to the print job-identification information correspondence table 1120 and determines whether or not there is identification information associated with the print job generated in step S706. In the example in FIG. 11C, line 1123 corresponds to "job 1", and it can therefore be determined that there is identification information. If there is identification information associated with the print job, the processing advances to step S708. On the other hand, if there is no identification information associated with the print job, the processing advances to step S709, and only the print job is sent to the production system 120.

In step S708, functioning as the adjustment table management module 526, the CPU 201 assigns identification information to the print job. In line 1123 of the print job-identification information correspondence table 1120 in FIG. 11C, the identification information "Adjustment Set A" is associated with the print job "job 1". Therefore, the adjustment table management module 526 takes the name of the print job as "job 1" and assigns the identification information "Adjustment Set A". This identification information is included in the print job for the production system and is communicated to the production system 120.

Finally, in step S709, functioning as the process management module 522, the CPU 201 sends the print job to the production system 120 determined at reference numeral 605. At this time, if identification information has been assigned to the print job in step S708, that identification information is also sent at the same time.

Figure 8B:
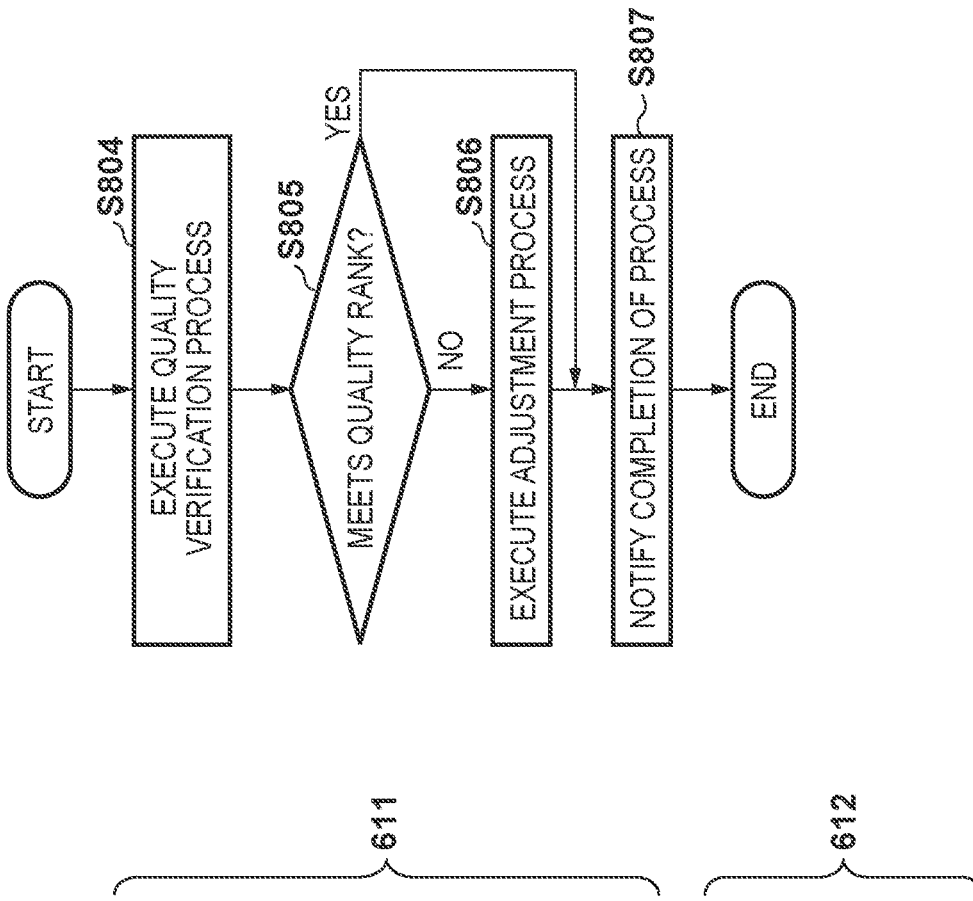
FIGS. 8A and 8B are flowcharts for describing control processing by the production system according to the first embodiment.
Figure 8A:
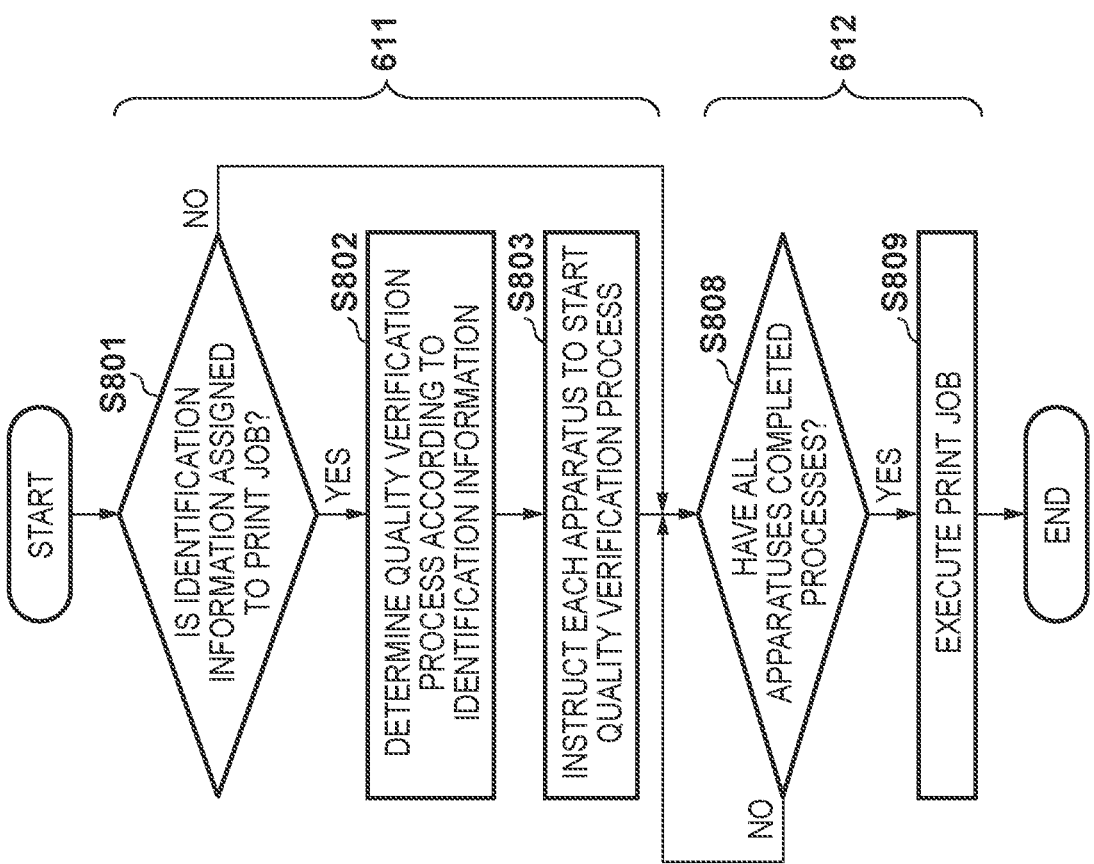

FIGS. 8A and 8B are flowcharts for escribing control processing by the production system 120 according to the first embodiment. This flowchart is called after the workflow management server 100 sends the print job to the production system 120 at reference numeral 610 and in step S709. Note that the programs that execute these processes are deployed in the RAM 303, for example, and the processes indicated in this flowchart are executed by the CPU 301 executing the control program. The reference numerals 611 and 612 in FIG. 8A indicate processes corresponding to the sequence chart in FIG. 6B.

FIG. 8A is a flowchart for describing the overall processing executed by the adjustment control module 546 of the production system 120, and FIG. 8B is a flowchart for describing the processing executed by each apparatus in the production system 120 in response to the processing of FIG. 8A.

In step S801, functioning as the adjustment control module 546, the CPU 301 determines whether or not identification information is assigned to the print job received from the workflow management server 100. If it is determined that identification information is assigned, the processing advances to step S802. However, if it is determined that identification information is not assigned, the processing advances to step S808.

In step S802, functioning as the adjustment control module 546, the CPU 301 verifies the identification information assigned to the print job against the adjustment execution table 1100 and determines the quality verification process, corresponding to the identification information, that is to be executed. Here, for example, when the print job "job 1" and the identification information "Adjustment Set A" have been received from the workflow management server 100, line 1005 (FIG. 11A) of the adjustment execution table 1100 is referenced, and a determination is made to execute "Adjustment Set A" before executing "job 1". As described above, the adjustment control module 546 creates the adjustment execution table 1100 at reference numeral 608 of FIG. 6B. Therefore, when step S802 is executed, the execution device is assigned to each quality verification process.

The processing then advances to step S803, where functioning as the adjustment control module 546, the CPU 301 instructs each apparatus to execute the quality verification process determined in step S802. "Each apparatus" refers to apparatuses denoted in execution device 1101 described in the adjustment execution table 1100.

The flowchart of FIG. 8B will be described next. The processing described in FIG. 8B may be performed in parallel by each apparatus included in the production system 120. As such, this flowchart is shown separately from FIG. 8A.

In step S804, the adjustment control module 546 included in each apparatus executes the quality verification process determined in step S802. One or more quality verification process may be executed. In the example of "Adjustment Set A" in the adjustment execution table 1100 of FIG. 11A, "JapanColorVerification" and "Front/Back Registration Verification" are registered, and thus those two quality verifications are executed. Each quality verification process is performed by the execution device denoted in the adjustment execution table 1100. It is assumed here that "JapanColorVerification" is executed by the print server 122 and "Front/Back Registration Verification" is executed by the printing apparatus 121, as indicated in FIG. 11A.

The processing then advances to step S805, where functioning as the adjustment control module 546, the CPU of each apparatus determines whether or not a result of the quality verification process executed in step S803 meets the minimum quality rank (threshold). In the example of "Adjustment Set A" in the adjustment execution table 1100, it is determined whether or not the result of "JapanColorVerification" meets the minimum quality rank "dE 5 or less". Likewise, it is determined whether the result of the "Front/Back Registration Verification" meets the minimum quality rank of "misalignment amount of 4 mm or less". If it is determined here that the minimum quality rank is not met, the processing advances to step S806. However, if it is determined that the minimum quality rank is met, the processing advances to step S807, and a notification that the adjustment process is complete is made.

In step S806, functioning as the adjustment control module 546, the CPU of each apparatus executes the adjustment process by referring to the adjustment process in event of failure 1004 in the adjustment execution table 1100 with respect to quality items that do not meet the minimum quality rank in step S804. In the example of the adjustment execution table 1100 in FIG. 11A, if the result of "JapanColorVerification" in step S804 is, for example, "dE 6", the adjustment process in event of failure 1004 is referenced and "JapanColorCalibration" is executed. By executing the "JapanColorCalibration", color fluctuations can be corrected and the quality rank of the production system 120 can be corrected to at least the minimum quality rank. The processing then advances to step S807, and a notification that the adjustment process is complete is made.

In this manner, the quality verification process and the adjustment process in the event of failure are performed by each of the plurality of apparatuses in the production system 120. The time required for each process also varies. Therefore, there are states in which some of the quality verification processes and adjustment processes associated with a single print job are incomplete. These include, for example, a state (timing) in which the execution result of "JapanColorVerification" already meets the minimum quality rank but the execution result of "Front/Back Registration Verification" does not meet the minimum quality rank. In such a state, the adjustment process is incomplete only for the printing apparatus 121. If a print job is started in the print server 122 in this state, the quality requirements for front/back registration cannot be met.

Then, in step S808, functioning as the adjustment control module 546, the CPU 301 determines whether the quality verification process and the adjustment process in the event of failure for all apparatuses denoted in the adjustment execution table 1100 are complete, and performs processing for standing by for the execution of the print job until the stated processes are complete. After the quality verification process and the adjustment process in the event of failure are complete for all the apparatuses, the processing advances to step S809, and the print job is executed.

As described thus far, according to the first embodiment, quality requirements for each of print jobs can be interpreted, and a quality verification process and an adjustment process can be executed at appropriate timings in conjunction with the execution of the print job. This makes it possible to meet the quality requirements of each print job. When the quality verification process and an adjustment process in the event of failure, performed to achieve the quality requirements, are performed by a plurality of apparatuses, those processes can be performed by appropriate apparatuses.

In the first embodiment, the adjustment process execution devices are denoted only in the adjustment execution table 1100 illustrated in FIG. 11A, and not in the adjustment table 1000 illustrated in FIG. 10A. An advantage of such processing is that the workflow management server 100 can be made independent from the printing system, and the workflow management server 100 need not communicate with the plurality of individual apparatuses. Because printing systems include a wide variety of apparatuses, and the communication methods and specifications used when communicating with the apparatuses can differ, the software processing of the workflow management server 100 can be simplified by having the server independent from the printing system.

On the contrary, the adjustment control module 546 determines the execution device, denotes the execution device in the adjustment execution table 1100, and notifies the adjustment table management module 526 of the workflow management server 100 of the name of the execution device. The adjustment table management module 526 may then add the execution device the adjustment table 1000 illustrated in FIG. 10A. In this case, the adjustment process execution device can also be known in the workflow management server 100.

Furthermore, a configuration may also be used in which when instructing the adjustment processes to be executed, the workflow management server 100 directly instructs each apparatus in the printing system to perform the execution. In this case, the workflow management server 100 communicates with the individual apparatuses, which is advantageous in that the workflow management server 100 can know whether or not each apparatus performs an adjustment process and the details of the process. With this configuration, for example, when only the printing apparatus 121 is caused to execute a print job that requires an adjustment process, the workflow management server 100 instructs the printing apparatus 121 to execute the adjustment process. This makes it easy to perform processing such as instructing the print server 122 to perform only RIP processing on the image data while waiting for the adjustment process to end. Then, once the adjustment process in the printing apparatus 121 ends, instructing the print job to be executed by the print server 122, which has already started the RIP process, makes it possible to reduce the overall job processing time. According to this configuration, the adjustment processes can be selected and executed in accordance with the presence or absence of adjustment processes and the details of the adjustment processes provided for each apparatus in the production system 120.

Second Embodiment

In the foregoing first embodiment, each time the quality verification process to be executed by the production system 120 and the threshold thereof is determined, the adjustment table management module 526 of the workflow management server 100 generates new identification information, and registers the identification information and the quality verification process, in step S704. On the other hand, once the initial association of the PRX parameters and the quality verification process in the production system 120 is determined, that association can be used from the next time onward, and thus the PRX-adjustment process correspondence table 1110 is thought to be updated infrequently. However, even if the quality verification process 1002, the threshold 1003, and the adjustment process in event of failure 1004 are the same, a plurality of quality verification processes in which only the identification information 1001 is different will be generated. In this case, the resources of the workflow management server 100 and the production system 120 may be pressed. Also, when an administrator, operator, or the like views the adjustment table 1000 or the adjustment execution table 1100 in the workflow management server 100 or the production system 120, there will be a plurality of items for the same process, which worsens the visibility.

Accordingly, in a second embodiment, when the same quality verification process has already been registered, the registration of the quality verification process is skipped. Note that the system configuration, the hardware configuration of each apparatus, and so on according to the second embodiment are the same as those described in the above first embodiment, and will therefore not be described.

Figure 12:
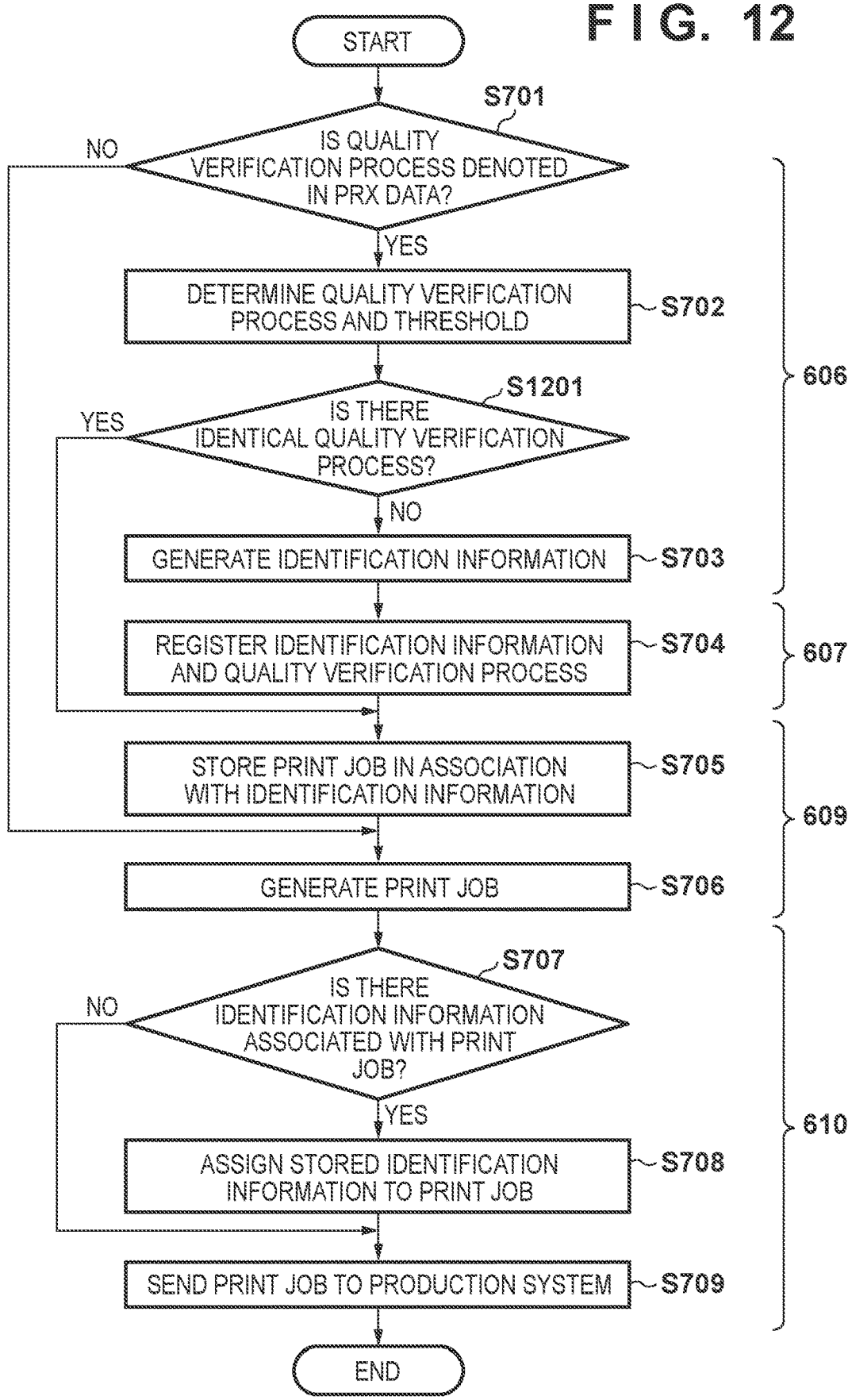
FIG. 12 is a flowchart for describing control processing performed by a workflow management server according to a second embodiment of the present invention.

FIG. 12 is a flowchart for describing control processing performed by the workflow management server 100 according to the second embodiment of the present invention. This flowchart is called after the workflow management server 100 determines the production system at reference numeral 605 in FIG. 6A. Note that the programs that execute these processes are deployed in the RAM 203, and the processes described in this flowchart are executed by the CPU 201 executing the deployed programs. The reference numerals 606, 607, 609, and 610 in FIG. 12 indicate processes corresponding to the sequence charts in FIGS. 6A and 6B. Note that in FIG. 12, processes that are the same as those described earlier with reference to FIG. 7 are given the same reference numerals, and will not be described.

In step S1201, functioning as the adjustment process registration module 527, the CPU 201 determines whether or not a quality verification process identical to the quality verification process determined in step S702 is present in the adjustment table 1000. When it is determined that the quality verification process 1002, the threshold 1003, and the adjustment process in event of failure 1004 are already present in the adjustment table 1000, the processing advances to step S705 without creating new identification information, and the print job is stored in association with the discovered identification information. On the other hand, when it is determined that the quality verification process 1002, the threshold 1003, and the adjustment process in event of failure 1004 are not present in the adjustment table 1000, the processing advances to step S703, and new identification information is generated for the quality verification process determined in step S702.

According to this second embodiment, if the same quality verification process is already registered, the registration of that quality verification process can be skipped so as not to press the resources of the workflow management server 100 and the production system 120.

Third Embodiment

In the foregoing first embodiment, the capability table 1300 illustrated in FIG. 13 is used only by the adjustment control module 546 of the production system 120, and is not referenced by the workflow management server 100. In other words, which apparatus is provided with which adjustment process is managed only by the adjustment control module 546 of the production system 120. Accordingly, when determining the PRX-adjustment process correspondence table 1110 illustrated in FIG. 11B, the workflow management server 100 does not reference the capability table 1300.

As opposed to this, a third embodiment will describe an example in which the workflow management server 100 refers to the capability table 1300, which indicates adjustment capabilities of each apparatus, when determining the PRX-adjustment process correspondence table 1110. As an example, this embodiment will describe a case where a loaded job is printed once by the printing system, but it is later discovered that the quality requirements have not been met and it is necessary to reprint the job. Such reprinting can occur in commercial printing services. For example, after starting the execution of a print job, the adjustment states of devices may change as a result of printing a large number of pages, and the quality requirements may not be met due to the accuracy of the front/back registration alignment, changes in the print color, and so on. In such a case, it is common practice to first re-determine and implement the details of the adjustment process for each apparatus using the same production system, and then execute the print job again.

In the third embodiment, this process will be called "recovery printing". Because recovery printing leads to losses for the printing company, it is desirable that the printing system include software processes that ensure recovery printing can be avoided whenever possible.

Using a more effective and highly-accurate adjustment method can be given as one example of a method for avoiding such recovery printing. However, more effective and accurate adjustment method often requires work on the part of the end user, and the adjustment processes often take a long time. In other words, as long as the same quality requirements can be met, selecting an adjustment process that can be performed automatically rather than an adjustment process that cannot be performed automatically saves both human resources and time resources for the printing company.

In light of such circumstances, in the third embodiment, adjustment processes that can be executed automatically are performed when no recovery printing has occurred, and when a recovery process has occurred, the adjustment processes are determined also including adjustment processes which cannot be executed automatically as options. At this time, the workflow management server 100 refers to the capability table 1300, which indicates adjustment capabilities of each apparatus, when determining the PRX-adjustment process correspondence table 1110, as described at the beginning of the third embodiment. Note that the system configuration, the hardware configuration of each apparatus, and so on according to the third embodiment are the same as those described in the above first embodiment, and will therefore not be described.

When determining the quality verification process at reference numeral 606 in FIG. 6A, the workflow management server 100 references the capability table included in the production system 120. The capability table is exactly the same as the capability table 1300 described in the first embodiment with reference to FIG. 13. Here, when no recovery printing has occurred, i.e., when an order for a printed product is being processed for the first time, the workflow management server 100 selects adjustment processes for which the auto-execution flag 1302 is "Yes" in the capability table 1300. As a result, the adjustment table 1000 is determined as illustrated in FIG. 10A, for example. If no recovery printing has occurred, the processing thereafter is the same as in the first embodiment.

The flow of recovery printing will be described next with reference to the sequence charts in FIGS. 6A and 6B. Reference numerals 601 to 612 are exactly the same as in the first embodiment and will therefore not be described. After the print job has been executed at reference numeral 612, the sequence moves to reference numeral 613, and the production system 120 inspects the printed product. In the production system 120, the inspection apparatus 124 corresponds to this, and an inspection reference value is included in the job ticket described in the first embodiment. For example, the threshold determined by the workflow management server 100 in the first embodiment is denoted in the job ticket, such as the case of "misalignment amount of 4 mm or less". The inspection apparatus 124 inspects whether or not the printed product meets the threshold using the various types of sensors included in the apparatuses. The sequence then moves to reference numeral 614, where the production system 120 notifies the workflow management server 100 of a result of the inspection performed by the inspection apparatus 124. For example, if the inspection result passes, such as the case of "misalignment amount inspection result 3 mm", the ordered job is completed.

On the other hand, if the inspection result fails, such as the case of "misalignment amount inspection result 5 mm", the workflow management server 100 returns to the process of reference numeral 606. In this case, the quality requirements cannot be met with the quality verification process determined earlier, and thus the quality verification process is re-determined. Here, the workflow management server 100 determines the adjustment table 1000 including, as candidates, adjustment processes for which the auto-execution flag 1302 in the capability table 1300 is "No". In the above example, the inspection result for front/back registration fails, and it is therefore necessary to re-determine the adjustment process pertaining to front/back registration. Accordingly, the workflow management server 100 reselects the adjustment process pertaining to the front/back registration from the capability table 1300 included in the production system 120.

Here, as illustrated in FIG. 10A, in the Adjustment Set A, the front/back registration full auto adjustment for which the auto-execution flag 1302 in FIG. 13 is "Yes" is selected, and the inspection result fails. Accordingly, with respect to the front/back registration in the Adjustment Set A, front/back registration manual adjustment, which corresponds to "No" for the auto-execution flag 1302 in FIG. 13, is selected. As a result, the adjustment table 1000 is updated as illustrated in FIG. 10B. In FIG. 10B, the adjustment process in event of failure 1004 in line 1005 is updated from "front/back registration full auto adjustment" in FIG. 10A to "front/back registration manual adjustment". The processing thereafter is the same as in the first embodiment.

In other words, the adjustment process for which the identification information is "Adjustment Set A" is updated in both the adjustment table 1000 and the adjustment execution table 1100. The production system 120 then executes the front/back registration manual adjustment in step S806. The auto-execution flag 1302 is "No" for this adjustment process, which results in work on the part of the end user, but the adjustment process is a highly-accurate process and the post-recovery printing inspection result is therefore expected to improve.

In the third embodiment, as illustrated in FIG. 13, there is one process for which the auto-execution flag 1302 is "Yes" and one process for which the flag is "No" for the same type of quality verification process. However, there may be two or more processes for which the automatic execution flag 1302 is the same. In this case, it is more desirable that a priority order based on the accuracy, time required, and the like of each adjustment process be denoted in the capability table 1300 so that the workflow management server 100 can refer to that priority order when selecting an adjustment process. This priority order is generally provided as a default setting value for each apparatus indicating an apparatus name 1301, included in device settings that can be edited by the end user, and so on. This ends the descriptions of the third embodiment.

According to the third embodiment, when determining the PRX-adjustment process correspondence table, the workflow management server can refer to the capability table indicating the adjustment capabilities of each apparatus included in the production system 120. The third embodiment describes processing for determining the adjustment process during recovery printing by referring to the auto-execution flag. According to the third embodiment, when no recovery printing has occurred, the workload on the end user can be reduced by using an adjustment process that can be executed automatically by the production system 120. When recovery printing has occurred, the adjustment processes can be selected including adjustment processes performed by the end user, and thus the inspection result can be expected to improve following the adjustment.

Fourth Embodiment

A fourth embodiment will describe an example in which when a color adjustment process is executed, it is determined whether or not work will be required for subsequent print jobs, i.e., adjustments that are actually necessary for each print job can be selectively performed. Note that the system configuration, the hardware configuration of each apparatus, and so on according to the fourth embodiment are the same as those described in the above first embodiment, and will therefore not be described.

FIG. 14 is a diagram for describing the software configuration of the production system 120 according to the fourth embodiment. Note that the software configuration of the order receiving system server 110 and the software configuration of the workflow management server 100 are the same as in the foregoing embodiments, and will therefore not be described. Also, in FIG. 14, areas that are the same as in FIG. 5C, described earlier, are given the same reference numerals.

The print control module 541 executes print control using the information received from the workflow management server 100 (PDF data and JDF data). The print control module 541 also has an adjustment function for adjusting the print quality, and executes the adjustment function in response to a control instruction received from the workflow management server 100, the print server 122, or the production operator terminal 125. The print control module 541 includes the measurement control module 5411, a PRX interpretation module 5412, and an image forming control module 5413. The measurement control module 5411 executes measurement control using the measuring unit 322 in response to a control instruction received from the workflow management server 100, the print server 122, or an operator terminal 125. The PRX interpretation module 5412 analyzes the PRX data received from the order receiving system server 110 and specifies print quality requirements and some of required pre-pressing processes. The image forming control module 5413 converts the received information into image data, feeds paper, and causes the converted image data to be transferred/fixed onto the paper.

Figure 15B:
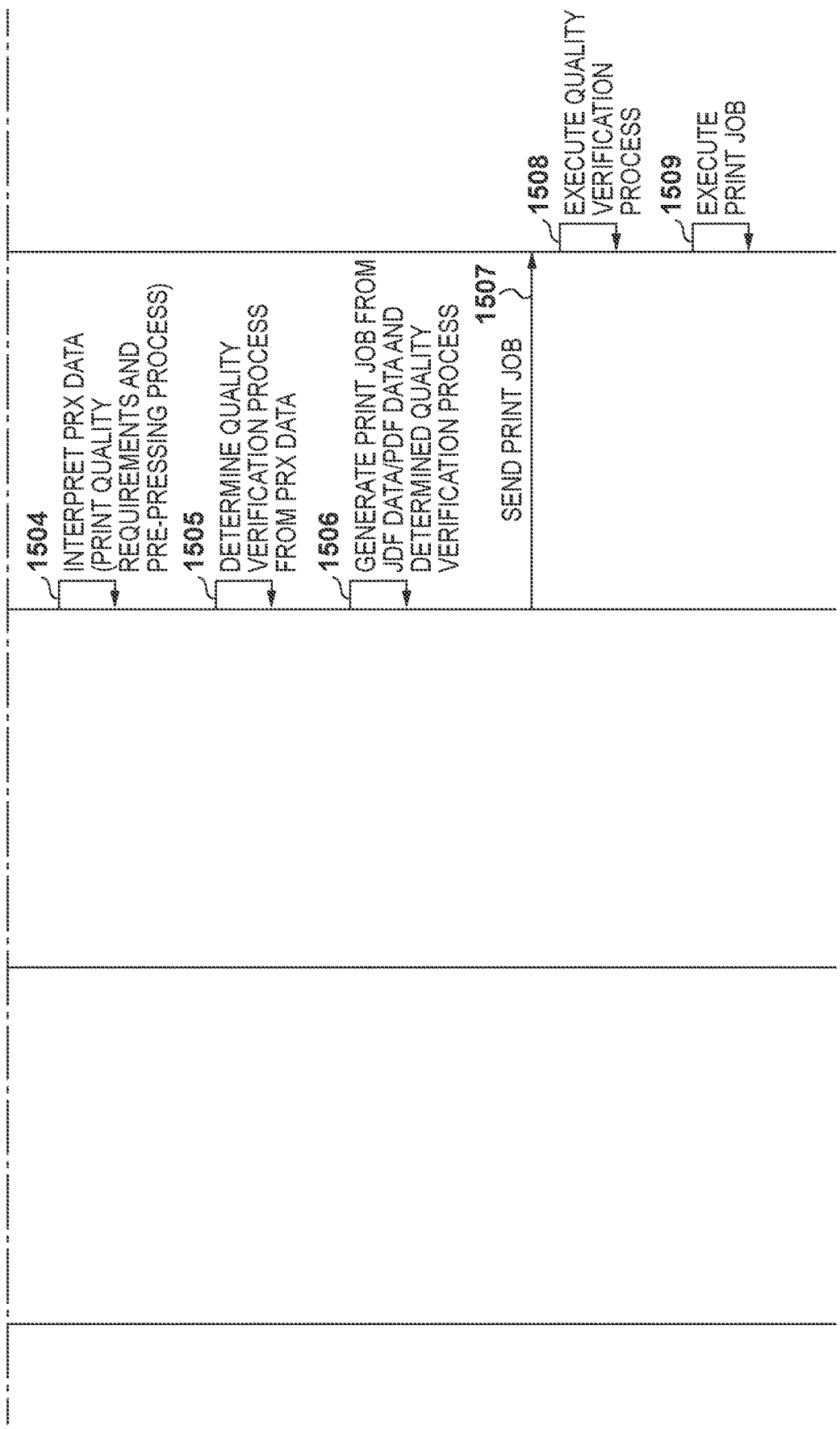

FIGS. 15A and 15B are sequence charts for describing a flow of processing in the printing system according to the fourth embodiment. In FIG. 15A, reference numerals 601 to 603 are the same as those described above in the first embodiment with reference to FIG. 6A. However, FIGS. 15A and 15B assume PRX data such as that illustrated in FIGS. 18A and 18B. Here, the PRX data is created on the basis of requirements for quality, such as "QualitySpecification". "QualityGoals" includes fields that contain quality specifications and evaluation standards, such as color, registration, barcode, and the like. "Color" is constituted by "ColorScore", which indicates a color score calculation method, a score standard, and the like, "ColorParameter", which indicates detailed color information, and so on. "Registration" indicates a registration score calculation method, a score standard, and the like. "ScoringInfo" indicates information of a formula specified by a buyer for specifying a print quality score, grade, or the like. "MinimumAcceptableRank" indicates the minimum acceptable quality rank. Although the fourth embodiment describes a configuration that uses some of the "QualityGoals", the configuration is not limited thereto, and the configuration may be such that other fields of the PRX data are used.

Color fluctuation inspection by the print control module 541 in FIG. 5C is an example of first "QualityGoals". The print control module 541 includes the measurement control module 5411, and can monitor color fluctuation in the production system 120 during production. JapanColor is an example of a print color standard. The production system 120 which meets this standard can guarantee that the quality of printed material will meet or exceed a certain level. In the fourth embodiment, color fluctuation inspection is performed by confirming that each job meets an equivalent of the JapanColor standard. The color fluctuation is inspected using an average value of a color difference ΔE00 (CIE DE2000) between a colorimetric value of printed material produced by the production system 120 and a JapanColor prescribed value. An example of the "Color" parameter description in this case will be described below. A score calculation formula "JapanColor dE (CIE DE2000)" is denoted in "ComplianceGoal". The minimum acceptable quality rank and the target quality rank are denoted in "ScoringInfo". The minimum acceptable quality rank is denoted in "MinimumAcceptableRank". In the example illustrated here, "5" is defined as the minimum quality rank. The target quality rank is denoted in "DesiredRank". In the example illustrated in FIGS. 18A and 18B, "6" is defined as the target quality rank. The quality rank in the PRX data, of the score calculated using the score formula, is denoted in "ColorScoringScale". In the quality rank in the PRX data, a higher number indicates a higher quality. In the example illustrated in FIGS. 18A and 18B, a case where a calculation result of dE (CIE DE2000) is "2 or less" is defined as rank "7". A case where the calculation result is "greater than 2 and 3 or less" is defined as rank "6". A case where the calculation result is "greater than 3 and 5 or less" is defined as rank "5". A CxF (Color eXchange Format) identifier or the like, which provides the details of the target color value and the like for finding a color difference from a colorimetric result, is denoted in "Color parameter".

Front/back registration misalignment inspection by the print control module 541 is an example of second "QualityGoals". The print control module 541 includes the measurement control module 5411, and can monitor front/back registration misalignment fluctuation in the production system 120 during production. An example of the "Registration" parameter description in this case will be described below. "ScoringInfo", "MinimumAcceptableRank", and "DesiredRank" have the same meaning as in the description of "Color". In the example illustrated in FIGS. 18A and 18B, "6" is defined as the minimum quality rank level, and "7" is defined as the target quality rank. The quality rank in the PRX data, of the score calculated using the score formula, is denoted in "ColorScoringScale". In the quality rank in the PRX data, a higher number indicates a higher quality. In the example illustrated in FIGS. 18A and 18B, a case where the amount of misalignment in the front/back registration is "1 mm or less" is defined as rank "8". A case where the amount of misalignment is "greater than 1 mm and 2 mm or less" is defined as rank "7". A case where the amount of misalignment is "greater than 2 mm and 4 mm or less" is defined as rank "6". The descriptions will assume that the PRX data expressing the quality standards described thus far is held by the PRX generation module 503 as fixed reference values.

At reference numeral 602 in FIG. 15A, the PRX generation module 503 of the order receiving system server 110 generates PRX data from the received product type. In the fourth embodiment, the PRX generation module 503 determines the MinimumAcceptableRank on the basis of the product type. For example, with the product type of "photobook", the "MinimumAcceptableRank" of "Color" is set to "5" and the "MinimumAcceptableRank" of "Registration" is set to "6". By doing so, each module that receives the PRX data can interpret the print quality requirements and perform processing according to the quality requirements. Next, at reference numeral 603, the data management module 504 of the order receiving system server 110 sends the PDF data and product type ordered by the end user and the PRX data generated by the PRX generation module 503 to the data management module 504 of the workflow management server 100.

Next, at reference numeral 1501, on the basis of the product type received at reference numeral 603, the process management module 522 of the workflow management server 100 determines the production system 120 that will actually perform the production from among a plurality of production systems connected to the workflow management server 100. For example, in the case of a photobook, after the printing and binding is performed by the production system 120, the edges aside from the bound edge are cut. In the case of photobooks subject to perfect binding, it is necessary for the size of the sheet for the front cover to be twice as large as the sheet for the body. Therefore, in the case of a photobook where A5 is specified as the finished size and glossy paper as the paper type for the body, it is necessary to take into account the cutting after printing and printing onto A4-size paper for the front cover. At this time, the production system 120 that can handle printing onto glossy paper having a size of A4 or larger is selected by the process management module 522. In addition, there are cases where a hard cover is set as the front cover of the photobook, which therefore cannot be printed by the production system 120 selected as described earlier. In that case, the PDF data can be divided into the front cover and the body, and a job for the front cover and a job for the body can be printed by a plurality of production systems 120. It is assumed that printing capabilities of the production system 120 under the management of the workflow management server 100 is held by the data management module 525, and the process management module 522 can obtain the printing capabilities from the data management module 525 as necessary.

In the fourth embodiment, the production system is determined from the perspective of what paper can be used and whether or not the quality requirements can be met, but the configuration is not limited thereto. For example, the configuration may be such that the production system is determined according to the number of sheets (number of copies) output in the print job and the productivity of the production system.

At reference numeral 1502, the process management module 522 of the workflow management server 100 generates a print job including print data, JDF data, and the like on the basis of the various types of data received at reference numeral 603. This print job is a print job to be sent to the production system, including print data such as PDF data, a job ticket such as JDF data, and PRX data.

Next, at reference numeral 1503, the process management module 522 of the workflow management server 100 sends the print job to the production system 120. The print job, which includes the PRX data, is received by the print server 122.

Next, at reference numeral 1504, the PRX interpretation module 5412 of the production system 120 determines the details of the print quality requirements and pre-pressing process on the basis of the PRX data received by the data management module 544. Print quality requirements indicating "perform ΔE00 inspection using print control module 541; minimum quality rank is ΔE00 of 5 or less" are analyzed on the basis of the "Color" information in FIGS. 18A and 18B. Additionally, print quality requirements indicating "perform front/back registration misalignment inspection using print control module 541; minimum quality rank is misalignment amount of 4 mm or less" are analyzed on the basis of the "Registration" information. Furthermore, the PRX interpretation module 5412 determines whether or not the pre-pressing process is required in accordance with the print quality requirements. In order to implement the aforementioned print quality requirements of "perform ΔE00 inspection using print control module 541; minimum quality rank is ΔE00 of 5 or less", it is necessary for the production system 120 to print a designated chart and measure the color of the chart.

In the fourth embodiment, patches are inserted at an edge of a sheet, and color fluctuation inspection is performed by measuring the colors of the patches using the measurement control module 5411 provided in the production system 120. Specifically, a process of embedding a JapanColor certification chart (e.g., 54 patches) in the PDF data is necessary. Therefore, the PRX interpretation module 5412 retains the details of this patch embedding process as an additional process that is required when executing the pre-pressing process. Although the fourth embodiment describes a case where the process of inserting patches is necessary as an example, the configuration is not limited thereto, and may be such that a patch chart in which only patches are arranged is generated and the colors are measured. In this case, the configuration need not be such that the processing is additionally executed when the pre-pressing process is executed, and may instead involve the color management module 545 in the production system 120 generating a patch chart and reading the patches. At this time, the PRX interpretation module 5412 stores the details of instructions to the print control module 541 so that the instructions can be issued to the print control module 541 to have the patch chart generated and read on the production system 120.

At reference numeral 1505, the PRX interpretation module 5412 of the production system 120 determines the quality verification process and the identification information on the basis of the PRX data. A method of determining the quality verification process and the identification information will be described later with reference to the flowchart in FIG. 16. The quality verification process and identification information are managed in a quality verification process table, illustrated in FIG. 19A.

FIG. 19A is a diagram illustrating the quality verification process table according to the fourth embodiment.

Identification information 1901 is information generated to be unique in the quality verification process table so that the information can be distinguished on a job-by-job basis. A job name for performing the adjustment process set (job 1 adjustment set) is used as an example of the identification information. The parts indicating quality verification process 1002 to adjustment process in event of failure 1004 are the same as in the embodiments described earlier.

In the example of "job 1 adjustment set" indicated by reference numeral 2105 in FIG. 19A, if "dE5 or less" is not met in "JapanColorVerification", "automatic tone correction" is executed. Additionally, if the "Front/Back Registration Verification" does not meet the "misalignment amount of 4 mm or less", "front/back registration full auto adjustment" is executed.

At reference numeral 1506, the print control module 541 generates a print job to be sent to the printing apparatus 121, on the basis of the various types of data received by the data management module 544 from the workflow management server 100, and the details of the quality verification process determined at reference numeral 1505. A print data editing process is an example of the process performed by the print control module 541. Although the print data is based on data received from the data management module 544, there are cases where the print data should be edited, depending on the details of the quality verification process which has been determined. For example, it may be necessary to place patches in a margin of the paper and measure the colors while printing the print data. In this manner, the print control module 541 generates the print job to be sent to the printing apparatus 121 on the basis of the details of the quality verification process. This process will be described in detail below, and with reference to later drawings.

At reference numeral 1507, the print control module 541 sends the print job generated at reference numeral 1506 to the printing apparatus 121. The processes of the subsequent reference numerals 1508 and 1509 will be described in detail with reference to the flowchart in FIG. 17, which describes the processing of the printing apparatus 121.

At reference numeral 1509, the image forming control module 5413 of the print control module 541 of the production system 120 executes printing on the basis of the received print job. Here, printing onto paper, post-processing, and the like are executed according to the received print data, JDF data, and the like. Because there are cases where the printing process and the quality verification process are executed simultaneously and in parallel, the execution order of reference numerals 1508 and 1509 is not necessarily determined as one set order. This completes the descriptions with reference to FIGS. 15A and 15B.

Figure 16:
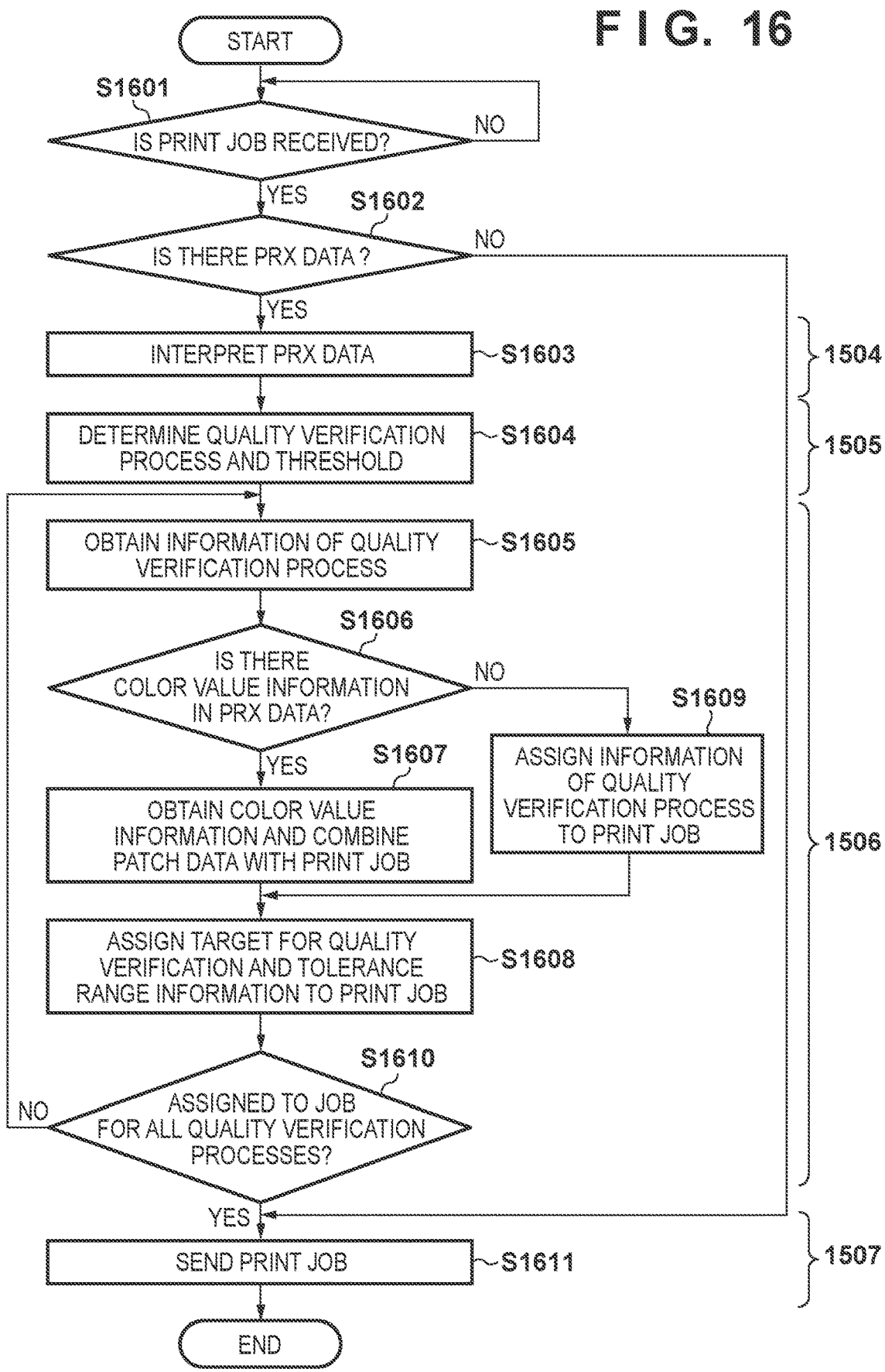
FIG. 16 is a flowchart for describing control processing performed by a print server according to the fourth embodiment.

FIG. 16 is a flowchart for describing control processing performed by the print server 122 according to the fourth embodiment. This flowchart is called after the workflow management server 100 has determined the production system. Note that the programs that execute these processes are deployed in the RAM 303, for example, and the processes indicated in this flowchart are executed by the CPU 301 executing the control programs. The reference numerals 1504 to 1507 in FIG. 16 indicate processes corresponding to the sequence chart in FIG. 15B.

First, in step S1601, functioning as the print control module 541, the CPU 301 determines whether or not a print job has been received. The processing advances to step S1602 when it is determined that a print job has been received. In step S1602, functioning as the print control module 541, the CPU 301 determines whether or not PRX data is assigned to the received print job. If the job is determined to include PRX data, the sequence moves to step S1603, whereas if the job is determined not to include PRX data, the processing advances to step S1611 and a normal printing process is performed.

In step S1603, functioning as the PRX interpretation module 5412 of the print control module 541, the CPU 301 interprets the PRX data, after which the processing advances to step S1604. In step S1604, functioning as the print control module 541, the CPU 301 obtains the quality verification process denoted in the PRX data, and determines the quality verification process and the threshold thereof. The data management module 544 holds, for example, the PRX-adjustment process correspondence table 1110 illustrated in FIG. 19B as a table to be obtained. Note that in FIG. 19B, the same reference numerals are given to parts that are the same as those shown in the aforementioned FIG. 11B, and descriptions thereof will be omitted.

FIG. 19B differs from the aforementioned FIG. 11B in that "automatic tone correction" is performed when the "JapanColorVerification" quality does not exceed the threshold (minimum quality rank).

The descriptions will return to the process of step S1604. The print control module 541 verifies a result of analyzing the PRX data illustrated in FIGS. 18A and 18B against the PRX-adjustment process correspondence table 1110 illustrated in FIG. 19B. It can be seen that "ComplianceGoal" includes "JapanColor dE (CIE DE2000)" and "FrontAndBackRegistration". Therefore, "JapanColorVerification" is executed in the production system 120, and if the threshold is not met, "automatic tone correction" is executed. "Front/Back Registration Verification" is also executed, and if the threshold is not met, "front/back registration full auto correction" is executed.

In the PRX data illustrated in FIGS. 18A and 18B, the "MinimumAcceptableRank" of "JapanColor dE (CIE DE2000)" is "5". Based on a parameter value of "ParameterScore Rank="5"", the rank "5" is a quality rank in which dE is "greater than 3 and 5 or less". The threshold value can therefore be determined as "dE 5 or less". In the same manner, the threshold for "FrontAndBackRegistration" can be determined to be "misalignment amount of 4 mm or less". To summarize the determined information, the production system 120 executes "JapanColorVerification", and if the threshold of "dE 5 or less" is not met, executes "automatic tone correction". "Front/Back Registration Verification" is also executed, and if the threshold of "misalignment amount of 4 mm or less" is not met, "front/back registration full auto correction" is executed. This information is held in association with job information as a quality verification process table illustrated in FIG. 19A.

The processing then advances to step S1605, where functioning as the print control module 541, the CPU 301 obtains the PRX data of one of the plurality of quality verification processes in the quality verification process table determined in step S1604, after which the processing advances to step S1606. In step S1606, functioning as the print control module 541, the CPU 301 determines whether or not there is color value information in the PRX data obtained in step S1605. Here, if there is color value information, it is determined that it is not necessary to provide patches, and the processing advances to step S1607, whereas if there is no color value information, it is determined that it is necessary to provide patches, and the processing advances to step S1609. For example, in the PRX data illustrated in FIGS. 18A and 18B, "JapanColor dE (CIE DE2000)" and "FrontAndBackRegistration" are present as the "ComplianceGoal". Of these, it can be seen that in "JapanColor dE (CIE DE2000)", two "ColorParameters" are present, and furthermore, "PatchA" and "PatchB" are present as "ParameterNames". In each "ColorParameter", an identifier of the CxFObject is set in "CxFReferenceObjectIdLink". This CxFObject is written in "CxfReferenceData", and the color value for each CxFObject is written in a specific format. In this example, each of the "L", "a", and "b" values of "ColorCIELab", expressed in the Lab color space, are denoted as "ColorValues". It is determined to be necessary to provide patches when this information is denoted in the PRX data. On the other hand, for "FrontAndBackRegistration," there are no descriptions connected to patch information, and it is therefore determined that providing patches is unnecessary.

In step S1607, functioning as the print control module 541, the CPU 301 obtains the color value information from the information of the PRX data analyzed in step S1603. The CPU 301 then generates patch data through conversion to the device output color space as necessary, and combines the print job with a reading instruction and the patch data, after which the processing advances to step S1608. For example, in the PRX data illustrated in the aforementioned FIGS. 18A and 18B, when "ComplianceGoal" is "JapanColor dE (CIE DE2000)", PatchA corresponds to 17.64167 for "L", 1.076669 for "a", and 0.3338588 for "b". The patch data is generated by converting these Lab space color values into the CMYK color space, which is the color space of the device, and a chart is generated by combining patch data having a format such as that illustrated in FIG. 20 with the print job.

Figure 20:
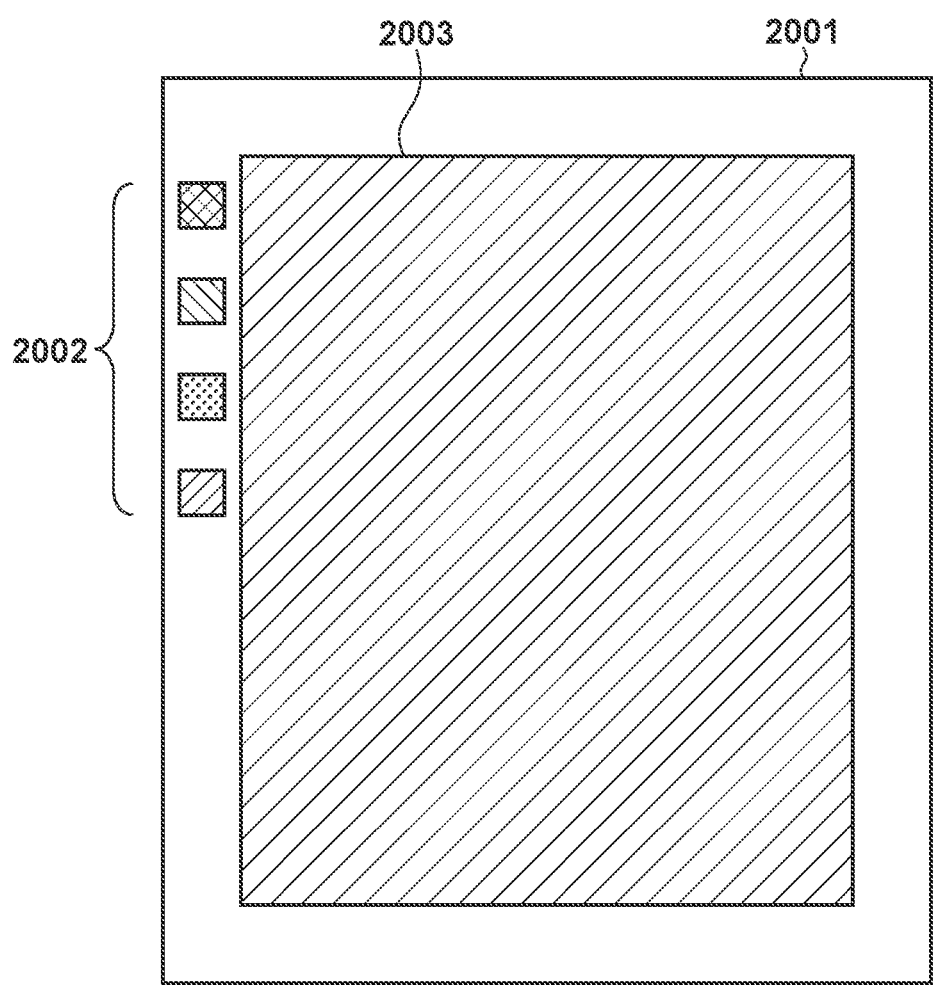
FIG. 20 is a diagram illustrating an example of a chart in which patch data and a print job are combined, according to the fourth embodiment.

FIG. 20 is a diagram illustrating an example of a chart in which patch data and a print job are combined.

An image 2003, obtained by converting print data received in the PDF data/JDF data format, is formed on a sheet 2001. Patches 2002 are arranged in a margin part of the sheet 2001. Although the patches 2002 are arranged in a margin part of the print data in the fourth embodiment, the configuration is not limited thereto. A chart page in which only the patches are arranged may be generated, and the chart page in which the patches are arranged may be inserted as the first page of the print data.

In step S1608, functioning as the print control module 541, the CPU 301 assigns a target of the quality verification process combined in the job, and a tolerance range thereof, to the print job. Specifically, taking "JapanColor dE (CIE DE2000)" in the PRX data in FIGS. 18A and 18B as an example, the values of "L", "a", and "b" serve as the target values. As the threshold, because "MinimumAcceptableRank" is "5", the threshold corresponds to a parameter value of "ParameterScore Rank='5'", and dE meeting a quality rank of "greater than 3 and 5 or less". Accordingly, information that a color difference tolerance range is 5 or less is assigned to the print job, and the processing then advances to step S1610.

On the other hand, when there is no color information in the PRX data, the processing advances to step S1609, where the CPU 301 assigns an instruction to execute the quality verification process to the print job in accordance with the information of the quality verification process obtained in step S1605. Specifically, taking "FrontAndBackRegistration" in the PRX data illustrated in FIGS. 18A and 18B as an example, an instruction to execute "Front/Back Registration Verification" is assigned to the job, and the processing then advances to step S1608.

In step S1610, functioning as the print control module 541, the CPU 301 determines whether or not an instruction to execute the quality verification process has been assigned to the print job, for each quality verification process in the quality verification process table determined in step S1604. If it is determined that an instruction to execute has been assigned to all the quality verification processes, the processing advances to step S1611, whereas if there is a quality verification process which has not been assigned to a print job, the processing returns to step S1605. In step S1611, functioning as the print control module 541, the CPU 301 sends the generated print job to the printing apparatus 121, and the processing then ends.

Figure 17:
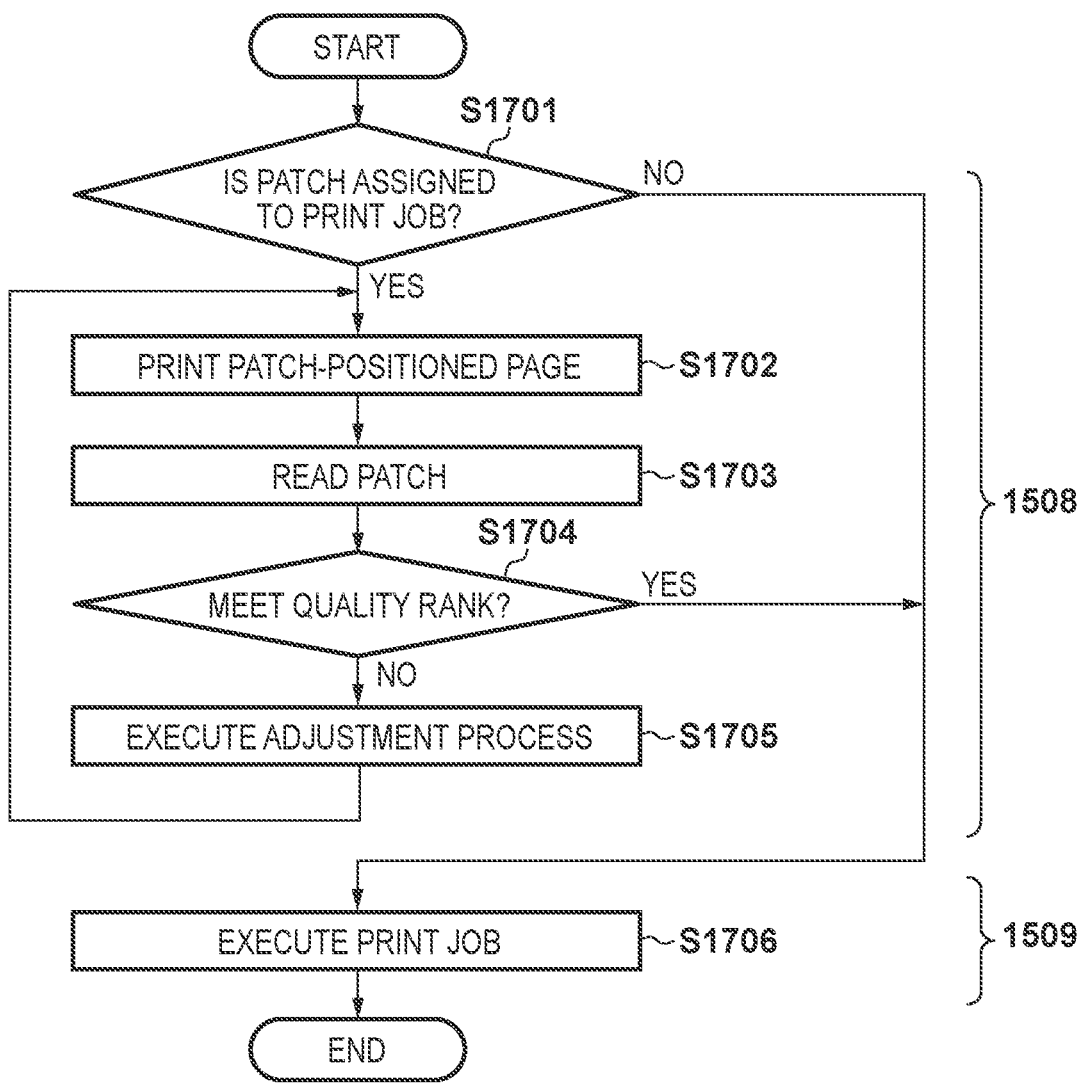
FIG. 17 is a flowchart for describing control processing by a printing apparatus in the production system according to the fourth embodiment.

FIG. 17 is a flowchart for describing control processing by the printing apparatus 121 in the production system 120 according to the fourth embodiment. Note that the programs that execute these processes are deployed in the RAM of the printing apparatus 121, for example, and the processes indicated in this flowchart are executed by the CPU of the printing apparatus 121 executing the control programs. The reference numerals 1508 and 1509 in FIG. 17 indicate processes corresponding to the sequence chart in FIG. 15B.

In step S1701, functioning as the image forming control module 5413 in the print control module 541, the CPU of the printing apparatus determines whether or not an instruction to execute the quality verification process (patch data) is assigned to the print job received from the print server 122. The processing advances to step S1702 when an instruction to execute the quality verification process (patch data) is assigned. On the other hand, when an instruction to execute the quality verification process is not assigned, the processing advances to step S1706, and the print job is executed. In step S1702, functioning as the image forming control module 5413 in the print control module 541, the CPU prints an image of a patch-included page, such as that illustrated in FIG. 20, on the basis of the instruction to execute the quality verification process assigned to the print job, after which the processing advances to step S1703.

In step S1703, functioning as the measurement control module 5411 of the print control module 541, the CPU reads the patches arranged on the patch-included page printed in step S1702. Parameters for performing quality verification are then calculated from the information of the quality verification process assigned to the print job, after which the processing advances to step S1704. In step S1704, functioning as the measurement control module 5411, the CPU obtains the quality rank found for that job from the information of the quality verification process included in the print job. This is then compared to the parameter values for performing the quality verification, calculated in step S1703. When it is determined that the quality rank required for that job is met, the processing advances to step S1706, whereas when it is determined that the quality rank is not met, the processing advances to step S1705. For example, assuming a case where "Front/Back Registration Verification" is performed as the quality verification process in the job 1 adjustment set illustrated in FIG. 19A, the quality rank required for that job is "misalignment amount of 4 mm or less". At this time, patches having a specific shape are arranged in a default position on the front and rear sides as the patches for performing the quality verification, generated in step S1702. Furthermore, in step S1703, the front/back misalignment is calculated from the position of the patches having the specific shape, which have been read, and that misalignment is compared with "4 mm", which is the threshold for determining the quality rank. When the misalignment amount is 4 mm or less, the processing advances to step S1706, whereas when the misalignment amount is greater than 4 mm, the processing advances to step S1705.

In step S1705, functioning as the measurement control module 5411, the CPU refers to the information of the quality verification process assigned to the job for an adjustment process necessary when the quality verification has failed, notifies the adjustment control module 546 of that adjustment process, and causes the adjustment process to be executed, after which the processing returns to step S1702. In terms of the above example, the quality verification process in FIG. 19A is "Front/Back Registration Verification" and "front/back registration full auto adjustment" is the adjustment process necessary in the event of a failure, and thus front/back registration full auto adjustment is executed.

In step S1706, functioning as the image forming control module 5413, the CPU starts the printing process from a page in the print job aside from the patch-included page. Although the fourth embodiment assumes that the patch-included page and the pages for actual printing are separate, the configuration is not limited thereto, and may be such that the patches are arranged in a margin or the like of a page for actual printing. In this case, it is preferable to perform control so that when the quality rank is not met, the adjustment process is inserted partway through the print job.

Additionally, in the fourth embodiment, control is performed so that the actual printing cannot be executed unless the quality rank is met, but the configuration is not limited thereto, and may be such that the printing process is stopped when the quality rank is not met even after executing a specific adjustment process. In this case, control may be performed to alert the operator that the quality required by the job will not be met even if the adjustment process is performed, or control may be performed to cancel the print job. By employing such a configuration, the quality rank of the production system 120 can be adjusted to meet or exceed the minimum quality rank required by the end user.

As described thus far, according to the fourth embodiment, quality requirements for each of print jobs can be interpreted, and a quality verification process and an adjustment process can be executed at appropriate timings in conjunction with the execution of the print job, which makes it possible to meet the quality requirements required for each print job.

FIFTH EMBODIMENT

A fifth embodiment will be described next. Note that the system configuration, the hardware configuration of each apparatus, and so on according to the fifth embodiment are the same as those described in the above first embodiment, and will therefore not be described. Additionally, the software configuration of the production system 120 according to the fifth embodiment is the same as that described in the foregoing fourth embodiment with reference to FIG. 14.

FIGS. 21A and 21B are sequence charts for describing a flow of processing in the printing system according to the fifth embodiment. In FIG. 21A, reference numerals 601 to 603 and 1501 to 1503 are the same as those described above in the first embodiment with reference to FIG. 6A and in the fourth embodiment with reference to FIGS. 15A and 15B.

FIG. 24 is a diagram illustrating an example of PRX data that corrects print color fluctuation, according to the fifth embodiment.

The production system 120 which has this correction function can maintain a set level of quality for printed materials. In the fifth embodiment, color fluctuation inspection is performed by performing AutoAdjustGradiation on a job-by-job basis. The color fluctuation is inspected using an average value of color differences ΔE00 (CIE DE2000) between a colorimetric value of printed material produced by the production system 120 and an AutoAdjustGradiation control value held by the printing apparatus 121. An example of the "Color" parameter description in this case will be described below. "AutoAdjustGradiation" is denoted in "ComplianceGoal". The minimum acceptable quality rank and the target quality rank are denoted in "ScoringInfo". The minimum acceptable quality rank is denoted in "MinimumAcceptableRank". In the example illustrated in FIG. 24, "5" is defined as the minimum quality rank. The target quality rank is denoted in "DesiredRank". In the example illustrated in FIG. 24, "6" is defined as the target quality rank. The quality rank in the PRX data, of the score calculated using a score formula (not shown), is denoted in "ColorScoringScale". In the quality rank in the PRX data, a higher number indicates a higher quality. In the example illustrated in FIG. 24, a case where a calculation result of AutoAdjustGradiation is "2 or less" is defined as rank "7". A case where the calculation result is "greater than 2 and 3 or less" is defined as rank "6". A case where the calculation result is "greater than 3 and 5 or less" is defined as rank "5". The descriptions will assume that the PRX data expressing the execution of print color fluctuation correction described thus far is held by the PRX generation module 503 of the order receiving system server 110 as a fixed control value. The PRX generation module 503 generates PRX data from the product type received at reference numeral 602. In the fifth embodiment, the PRX generation module 503 determines the MinimumAcceptableRank on the basis of the product type. For example, with the product type of "photobook", the "MinimumAcceptableRank" of "Color" is set to "5" and the "MinimumAcceptableRank" of "Registration" is set to "6". By doing so, each module that receives the PRX data can interpret the print quality requirements and perform processing according to the quality requirements. Then, at reference numeral 603, the data management module 504 of the order receiving system server 110 sends the PDF data and product type ordered by the end user and the PRX data generated by the PRX generation module 503 to the data management module 504 of the workflow management server 100.

Next, at reference numeral 1501, on the basis of the product type received at reference numeral 603, the process management module 522 of the workflow management server 100 determines the production system 120 that will actually perform the production from among a plurality of production systems connected to the workflow management server 100. Here, for example, a hard cover is set as the front cover of the photobook, which therefore cannot be printed by the production system 120 selected as described earlier. In that case, the PDF data can be divided into the front cover and the body, and a job for the front cover and a job for the body can be printed by a plurality of production systems 120. It is assumed that printing capabilities of the production systems 120 under the management of the workflow management server 100 are held by the data management module 525, and the process management module 522 can obtain the printing capabilities from the data management module 525 as necessary. In the fifth embodiment, the production system to be used is determined from the perspective of what paper can be used and whether or not the quality requirements can be met, but the present invention is not limited thereto. For example, the configuration may be such that the production system to be used is determined according to the number of sheets (number of copies) output in the print job and the productivity of the production system.

At reference numeral 1502, the process management module 522 of the workflow management server 100 generates a print job including print data, JDF data, and the like on the basis of the various types of data received at reference numeral 603. This print job is a print job to be sent to the production system 120, including print data such as PDF data, a job ticket such as JDF data, and PRX data. Next, at reference numeral 1503, the process management module 522 of the workflow management server 100 sends the print job to the production system 120. This print job, which includes the PRX data, is received by the data management module 544 of the production system 120.

At reference numeral 2101, the PRX interpretation module 5412 of the production system 120 determines the details of the print quality requirements and pre-pressing process on the basis of the PRX data received by the data management module 544. Print quality requirements indicating "perform ΔE00 inspection of AutoAdjustGradiation using print control module 541; minimum quality rank is ΔE00 of 3 to 5 or less" are obtained on the basis of the "Color" information in FIG. 24. Furthermore, the PRX interpretation module 5412 determines whether or not the pre-pressing process is required in accordance with the print quality requirements. In order to implement the aforementioned print quality requirements of "perform ΔE00 inspection using print control module 541; minimum quality rank is ΔE00 of 3 to 5 or less", it is necessary for the production system 120 to print a designated chart and measure the color of the chart. According to the quality requirements of the PRX data illustrated in FIG. 24, the color fluctuation inspection is performed by generating a patch chart for arranging tone correction control values provided in the printing apparatus 121 as patches, and then measuring the patches using the measurement control module 5411 provided in the production system 120. Specifically, it is necessary to receive an instruction for gradation correction from the print server 122 aside from the PDF data and perform the process of printing a tone correction patch chart. Therefore, the PRX interpretation module 5412 retains the details of this patch generation process in a quality verification process adjustment table, which will be described later with reference to FIG. 26A, as an additional process that is required when executing the pre-pressing process. The quality verification requirements of the PRX data illustrated in FIG. 24 are based on color fluctuation inspection using the control values held in the printing apparatus 121.

FIGS. 25A and 25B are diagrams illustrating an example of PRX data that corrects print color fluctuation of a spot color, according to the fifth embodiment.

In this example, color fluctuation inspection is performed by performing "SpotColorVerification" on a job-by-job basis. The color fluctuation is inspected using a color difference ΔE00 (CIE DE2000) between a colorimetric value of printed material produced by the production system 120 and a SpotColorVerification control value held by the color management module 545. In the fifth embodiment, the control value of the spot color is assumed to be managed in advance by the color management module 545 of the production system 120. At this time, the PRX interpretation module 5412 stores the details of instructions to the print control module 541 so that the instructions can be issued to the print control module 541 to have the patch chart generated and read on the print server 122 side.

The fifth embodiment describes a configuration in which a patch chart in which only patches are arranged is generated and measured, separately from the print job. The configuration is not limited thereto, however, and the patches may be inserted at the edge of the sheet, and the patches may be measured by a measurement control module provided within the production system 120.

At reference numeral 2102, the PRX interpretation module 5412 of the production system 120 determines the quality verification process and the identification information on the basis of the PRX data. A method of determining the quality verification process and the identification information will be described later with reference to the flowchart in FIG. 22. The quality verification process and the identification information are managed as results of interpreting the PRX data, as illustrated in FIG. 26A. This interpretation result will be described with reference to FIG. 26A. Identification information 2601 is information generated to be unique in the PRX data interpretation result so that the information can be distinguished on a job-by-job basis. As an example of the identification information, the job names for the quality verification processes (job 1, job 2) are used. Although not illustrated, when executing a plurality of quality verification processes, an adjustment name for the set of adjustment processes may be added.

Parameter value 2602 indicates a name of a parameter value in the PRX data to be executed by the production system 120. Quality verification process 2603 indicates the name of the quality verification process performed by the production system 120. In the example in FIG. 26A, "AutoAdjustGradiation" is written in the PRX data in "job 1", which indicates that "ToneVerification" is to be executed using the PRX-adjustment process correspondence table, described below with reference to FIG. 26D. Threshold 2604 indicates an allowable amount (a threshold) and a result of the quality verification process executed in accordance with the quality verification process 2603. In the example of "job 1" in FIG. 26A, "ToneVerification" indicates that "dE 5 or less" is an allowable amount. Adjustment process in event of failure 2605 indicates the name of an adjustment process executed by the production system 120 when a result of performing the quality verification process denoted in quality verification process 2603 does not meet the threshold 2604. In the example of "job 1" in FIG. 26A, if "ToneVerification" does not meet "dE 5 or less", the "ToneVerification" process is put into a pending state, and "ToneCalibration" is executed. The interpretation result of the quality verification requirements of the PRX data in FIG. 24 is described here as "job 1" as an example, and similarly, the interpretation result of the quality verification requirements of the PRX data in FIGS. 25A and 25B is indicated as "job 2" in FIGS. 26A to 26C and 26E.

At reference numeral 2103, the print control module 541 generates a quality verification process to be sent to the printing apparatus 121 as a job, on the basis of the various types of data received by the data management module 544 from the workflow management server 100, and the details of the quality verification process determined at reference numeral 2102. This job is a quality verification job different from a print job for printing a printed product, received from the workflow management server 100. A quality verification process involving the printing and measurement of colorimetric patches by the printing apparatus 121, in which the print server 122 prepares colorimetric patch images and sends the colorimetric patch images to the printing apparatus 121, can be given as an example of a case in which jobs are to be created individually in this manner. The details of the jobs and processes to be created will be described in detail later with reference to the drawings.

Next, at reference numeral 2104, the print control module 541 sends the quality verification job generated at reference numeral 2103 to the printing apparatus 121.

At reference numeral 2106, the print control module 541 generates a print job for actual printing, on the basis of the various types of data received by the data management module 544 from the workflow management server 100, and the details of the quality verification process determined at reference numeral 2102. This print job is a job that is printed by the printing apparatus 121 in order to obtain the printed product which has been ordered. A feature of the fifth embodiment is that the quality verification job for performing the quality verification process and the print job for obtaining the printed product are sent to the printing apparatus 121 as different jobs, as indicated by reference numerals 2104 and 2107. At this time, the printing apparatus 121 executes the quality verification job according to the quality verification job at reference numeral 2105, and if the result does not meet the required quality verification process threshold, the adjustment process is executed. Accordingly, for a print job that is sent thereafter, the printing apparatus 121 will be able to generate printed materials in accordance with those print jobs.

At reference numeral 2107, the print control module 541 sends the print job generated at reference numeral 2106 to the printing apparatus 121. The subsequent reference numerals 2105 and 2108 will be described using a flowchart for the printing apparatus 121, illustrated in FIG. 23, after describing a sequence of the workflow management server 100 and the production system 120 with reference to FIGS. 21A and 21B.

At reference numeral 2105, the adjustment control module 546 of the production system 120 determines the quality verification process to be executed on the basis of the received quality verification job. The adjustment control module 546 then executes the determined quality verification process and sends a result of the quality verification process to the print server 122. As a result, the print server 122 generates a print job at reference numeral 2106. At reference numeral 2108, the image forming control module 5413 of the production system 120 executes printing on the basis of the received print job. Here, printing onto paper, post-processing, and the like are executed according to the received print data, JDF data, and the like. The execution of the quality verification job at reference numeral 2105 is performed by the printing apparatus 121, and the print job generation and sending at reference numerals 2106 and 2107 is performed by the print server 122. Because the processes are performed by different apparatuses, the order in which reference numeral 2105, and reference numerals 2106 and 2107, are executed is not necessarily determined as one single order. This completes the descriptions with reference to FIGS. 21A and 21B.

Figure 22:
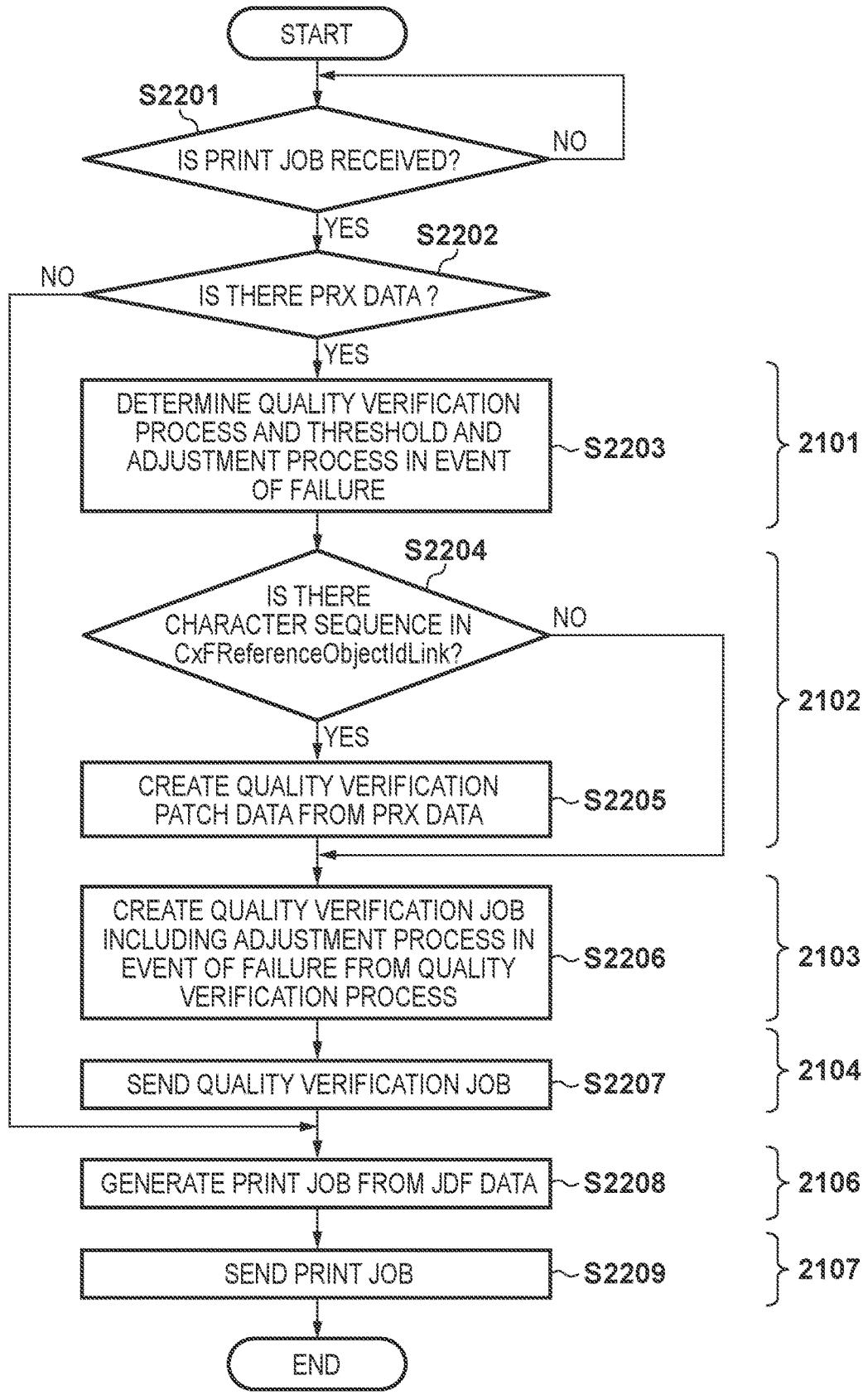
FIG. 22 is a flowchart for describing control processing performed by a print server according to the fifth embodiment.

FIG. 22 is a flowchart for describing control processing performed by the print server 122 according to the fifth embodiment. This flowchart is called when the print server 122 receives an order for a print job and interprets the PRX data. Note that the programs that execute these processes are deployed in the RAM 303, for example, and the processes indicated in this flowchart are executed by the CPU 301 executing the control programs. The reference numerals 2101 to 2104, 2106, and 2107 in FIG. 22 indicate processes corresponding to the sequence chart in FIG. 21B.

In step S2201, functioning as the data management module 544, the CPU 301 determines whether a print job has been received. If the CPU 301 has not received a print job, the determination as to whether a job has been received is repeated. Here, if a print job has been received, the processing advances to step S2202. In step S2202, functioning as the PRX interpretation module 5412, the CPU 301 determines whether there is PRX data in the print job. If it is determined that there is PRX data, the processing advances to step S2203. In step S2203, the CPU 301 determines the quality verification process, the threshold thereof, and the adjustment process in the event of failure. Here, the CPU 301 functioning as the PRX interpretation module 5412 holds the PRX-adjustment process correspondence table illustrated in FIG. 26D in order to determine the quality verification process.

In the PRX-adjustment process correspondence table illustrated in FIG. 26D, PRX parameters indicate parameters (elements) included in the PRX data which is interpreted at reference numeral 2101. Parameter value indicates a value denoted in the PRX parameters. Although only "ComplianceGoal" is denoted in FIG. 26D as the PRX parameters, any parameter may be used as long as it is compliant with PRX data. Quality verification process indicates the name of the quality verification executed by the production system 120 when the value of PRX parameter is the parameter value. Adjustment process in the event of failure indicates the name of the adjustment to be executed when the production system 120 executes the quality verification process and the result of the execution does not exceed the threshold (the minimum quality rank). A process of determining the quality requirements of the PRX data illustrated in FIG. 24 using this PRX-adjustment process correspondence table (indicated by 2620 in line 5 in FIG. 26D) will be described here.

When "ComplianceGoal" of the PRX data is "AutoAdjustGradiation", the production system 120 performs "ToneVerification" as the quality verification process. If the quality of "ToneVerification" does not exceed the threshold (minimum quality rank), "ToneCalibration" is performed. The PRX-adjustment process correspondence table is a table that is referenced within the production system 120, and the quality verification processes of "ToneVerification" and "ColorVerification" will be described later when describing processing performed by the printing apparatus 121, illustrated in FIG. 23.

The descriptions will return to the processing illustrated in FIG. 22. The data management module 544 verifies the PRX data interpretation result illustrated in FIG. 26A against the PRX-adjustment process correspondence table illustrated in FIG. 26D. The data management module 544 determines the adjustment process in the event of failure by comparing the parameter value in the PRX data interpretation result of the print job with the PRX-adjustment process correspondence table. Furthermore, the data management module 544 denotes the details of the PRX-adjustment process correspondence table (the quality verification process and the adjustment process in the event of failure) in the PRX data interpretation result. Once the data management module 544 has denoted the quality verification process and the adjustment process in the event of failure, the processing advances to step S2204. On the other hand, the processing advances to step S2208 when there is no PRX data.

In step S2204, functioning as the data management module 544, the CPU 301 determines whether or not information of patches, to be executed by the printing apparatus 121 of the production system 120, is assigned to the PRX data, on the basis of the PRX data interpretation result. In the PRX data illustrated in FIGS. 25A and 25B, an ID name used to refer to the patch information is denoted in "CxFReferenceObjectIdLink" of "ColorParameter". This value is used to refer to the data value (Lab, RGB, etc.) of the patches described in the "ObjectCollection" of the "CxFReferenceData" described in the second half of the PRX data. In FIGS. 25A and 25B, the PRX data has an ID name of "CxF001", and the data management module 544 denotes "CxF001" in "patch Y/N" 2606 of the PRX data interpretation result in FIG. 26A.

Accordingly, if in step S2204, "CxFReferenceObjectIdLink" is present and the ID name is also present, i.e., there is a value in "patch Y/N" 2606 of the PRX data interpretation result, the processing advances to step S2205. In step S2205, functioning as the data management module 544, the CPU 301 creates quality verification patch data on the basis of that patch information.

In the fifth embodiment, assuming the PRX data illustrated in FIGS. 25A and 25B, the color management module 545 of the print server 122 creates the patch data to be printed by the production system 120, on the basis of the patch information. Although the patches are printed as a quality verification job so as to be printed onto a different sheet from the print job in the fifth embodiment, the patches may be printed in a peripheral part of the print data of the print job, i.e., at a cutting location. If there is no value in "patch Y/N" 2606, i.e., in the case of the PRX data illustrated in FIG. 24, it is determined that the quality adjustment means and patch data (control values) of the printing apparatus 121 are to be used, and the processing advances to step S2206. In step S2206, functioning as the print control module 541, the CPU 301 creates the quality verification job on the basis of the result of interpreting the PRX data included in the print job.

FIGS. 26B and 26C are diagrams illustrating an example of a job management table that manages jobs, held by the data management module 544 of the production system 120 according to the fifth embodiment.

FIG. 26B illustrates the table when a print job is submitted from the workflow management server 100, and FIG. 26C illustrates the table when a quality verification job has been added by the print control module 541.

The data management module 544 saves a print job submitted to the production system 120 from the workflow management server 100 in this job management table. In step S2206, the CPU 301 functioning as the print control module 541 creates a quality verification job on the basis of the result of the interpretation of the PRX data by the PRX interpretation module 5412, adds an identifier of the print job, and stores the quality verification job in front of the corresponding print job in the job management table.

In the fifth embodiment, the production system 120 includes the print server 122 and the printing apparatus 121, and the quality verification job is submitted to the printing apparatus 121 using a proprietary protocol. The quality verification job is constituted by the names of the quality verification processes denoted in the PRX-adjustment process correspondence table illustrated in FIG. 26D. As parameters, the quality verification job includes information such as the adjustment process in the event of failure and the threshold thereof, paper size, paper type, and number of pages, and the like, and is submitted from the print server 122 to the printing apparatus 121 as a job.

In the case of the print job "job 1" having the PRX data illustrated in FIG. 24, "AutoAdjustGradiation" is set as parameter value 2602 in "ComplianceGoal" of PRX data. When the "ToneVerification" job is submitted and the threshold 2604 is "dE 5 or less", "ToneCalibration" is executed. The print control module 541 sets A4-sized plain paper for the print job "job 1" as a quality control job, and creates a job that executes the tone correction process provided in the printing apparatus 121. The printing apparatus 121 also has a proprietary function for correcting the color tone shifts in the printing apparatus, streaking in the printed surface, and so on from the print server 122. The print server 122 creates a quality verification job having a setting of "verify color tone shift and perform correction process when threshold is "dE 5 or less"".

"ToneVerification" is a job in which the image forming control module 5413 of the printing apparatus 121 prints patches having a constant density on the entire surface of A4-size paper on the basis of the paper size, paper type, and number of pages. The image forming control module 5413 that has received this quality verification job prints patches of a constant density using the print paper size and paper type in the parameters. Then, the measurement control module 5411 measures dE at a predetermined measurement location of the printed surface to determine if dE is within the threshold. If the submitted quality verification job is assigned an adjustment process in the event of failure, the adjustment control module 546 performs the tone correction. Operations performed by the printing apparatus 121 will be described later with reference to the flowchart in FIG. 23.

The print control module 541 adds a job name of "print job name"+"verification job" to the quality verification job and stores the job in the job management table illustrated in FIG. 26C. In the case of the print job having the PRX data illustrated in FIGS. 25A and 25B, the quality verification patch data (CxF001) is printed, and color verification is performed. When the threshold is "dE 3 or less", a quality verification job having a setting of "perform color correction process" is generated and stored in the job management table of FIG. 26C.

Next, the processing advances to step S2207, where functioning as the data management module 544, the CPU 301 sends the quality verification job from the print server 122 to the printing apparatus 121 on the basis of the job management table illustrated in FIGS. 26B and 26C. Then, in step S2208, functioning as the print control module 541, the CPU 301 generates a print job to be printed by the printing apparatus 121, including the print data, JDF data, and the like created at reference numeral 1502 in FIG. 21A. Then, in step S2209, functioning as the data management module 544, the CPU 301 sends the print job to the printing apparatus 121 of the production system 120 determined at reference numeral 1501.

Figure 23:
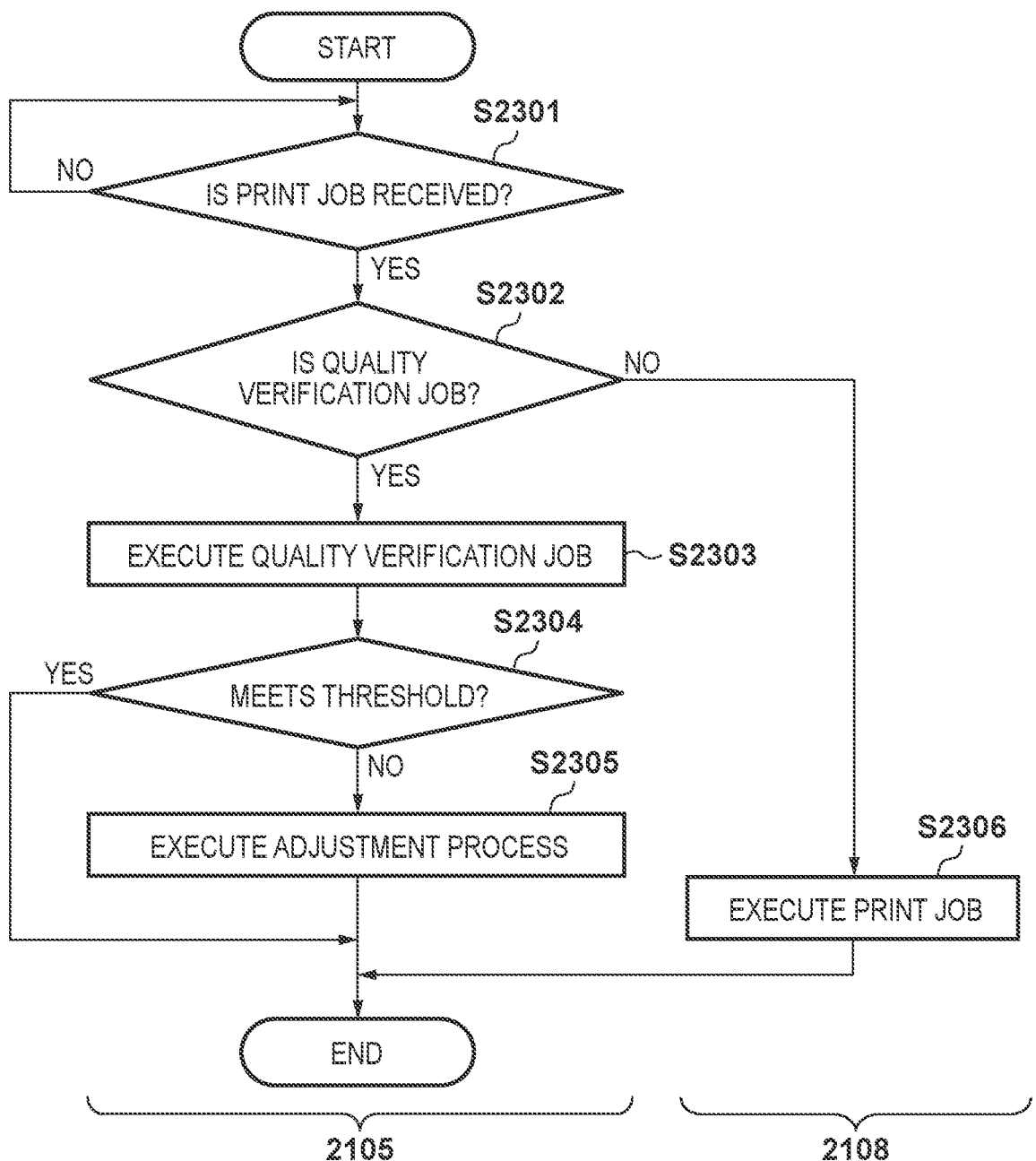
FIG. 23 is a flowchart for describing control processing of a printing apparatus in a production system according to the fifth embodiment.

FIG. 23 is a flowchart for describing control processing by the printing apparatus 121 in the production system 120 according to the fifth embodiment. This flowchart is called after the print server 122 has sent the job to the printing apparatus 121. Note that the programs that execute these processes are deployed in the RAM (not shown) of the printing apparatus 121, for example, and the processes described in this flowchart are executed by the CPU (not shown) of the printing apparatus 121 executing the control programs. The reference numerals 2105 and 2108 in FIG. 23 indicate processes corresponding to the sequence chart in FIG. 21B.

In step S2301, functioning as the data management module 544, the CPU determines whether a job has been received. Here, if a job has not been received, the determination as to whether a job has been received is repeated, and once a job is received, the processing advances to step S2302. In step S2302, functioning as the adjustment control module 546, the CPU determines whether or not the job received from the print server 122 is a quality verification job. The processing advances to step S2303 when it is determined that the job is a quality verification job. On the other hand, when it is determined that the job is a print job rather than the quality verification job, the processing advances to step S2306 and the print job is executed.

In step S2303, functioning as the adjustment control module 546, the CPU determines the quality verification process to be executed by checking the adjustment execution table illustrated in FIG. 26E on the basis of the quality verification process, the threshold thereof, and the adjustment process in the event of failure assigned to the quality verification job.

FIG. 26E is a diagram illustrating an example of the adjustment execution table according to the fifth embodiment.

The adjustment execution table is managed by the data management module 544. Job name indicates the name of the job executed at reference numerals 2105 and 2108 in FIG. 21B. Quality verification process indicates the quality verification process, the adjustment process in the event of failure, and so on performed in each job. Threshold indicates the threshold (minimum value) in the quality verification job, used when measuring color fluctuation. Job settings indicates settings of the job, such as paper size, paper type, the number of pages, and the like that each job uses. Print job identifier indicates the name of the print job related to the job.

Assuming a print job of "job 1" and a quality verification job of "job 1 verification job" has been received from the print server 122, the adjustment control module 546 refers to line 2630 in the adjustment execution table illustrated in FIG. 26E, and executes the "job 1 verification job" before executing "job 1".

The processing then advances to step S2303, where functioning as the adjustment control module 546, the CPU executes the determined quality verification process. The quality verification process may be one or more processes, executed in the order indicated in the adjustment execution table of FIG. 26E. Because "ToneVerification" is written in the example of the "job 1 verification job" in this adjustment execution table in FIG. 26E, the adjustment control module 546 executes tone correction using the control values of the printing apparatus 121.

The processing then advances to step S2304, where functioning as the adjustment control module 546, the CPU determines whether or not a result of the quality verification process executed in step S2303 meets the minimum quality rank (threshold). In the example of "job 1 verification job" in the adjustment execution table in FIG. 26E, it is determined whether or not the result of "ToneVerification" meets the minimum quality rank "dE 5 or less". When the minimum quality rank is not met, the processing advances to step S2305, whereas when the minimum quality rank is met, this process ends.

In step S2305, functioning as the adjustment control module 546, the CPU executes the adjustment process by referring to the adjustment process in event of failure in the adjustment execution table illustrated in FIG. 26E with respect to quality items determined not to meet the minimum quality rank in step S2304. In the example of this adjustment execution table in FIG. 26E, if the result of "ToneVerification" in step S2304 is, for example, "dE=6", the adjustment process in event of failure is referenced and "ToneCalibration" is executed. By executing the "ToneCalibration", the color tone can be corrected and the quality rank of the production system 120 can be corrected to at least the minimum quality rank.

As described thus far, according to the fifth embodiment, quality requirements for each of print jobs can be interpreted, and a quality verification process and an adjustment process can be executed at appropriate timings in conjunction with the execution of the print job, which makes it possible to meet the quality requirements required for each print job.

Sixth Embodiment

In the fifth embodiment, PRX data is assigned when the production system 120 interprets a print job submitted by the workflow management server 100. Then, when it is necessary to generate a quality verification job (a job for printing patches), the quality verification job is generated separately from the print job, and the print job is executed after the quality verification job has been submitted to the printing apparatus. At this time, the quality verification job includes the threshold and the adjustment process in the event of failure as parameters. As such, when the threshold is exceeded and the job fails even after the production system 120 executes the adjustment process of the quality verification job, the print job is executed.

As opposed to this, in the sixth embodiment, the quality verification job and an adjustment job for executing the adjustment process in the event of failure are submitted to the printing apparatus 121 separately. By adding an identifier of the print job to the quality verification job, the production system 120 does not print the print job when the quality verification job has failed, and instead puts the quality verification job and the print job into pending states. Furthermore, the print server 122 is notified of an error. By doing so, the quality verification process and the adjustment process can be executed at appropriate timings when an interrupt process from the print server 122 is required for the purpose of adjustment, and the quality requirements for each print job can therefore be met. Note that the system configuration, the hardware configuration of each apparatus, and so on according to the sixth embodiment are the same as those described in the above first and fifth embodiments, and will therefore not be described.

Figure 27A:
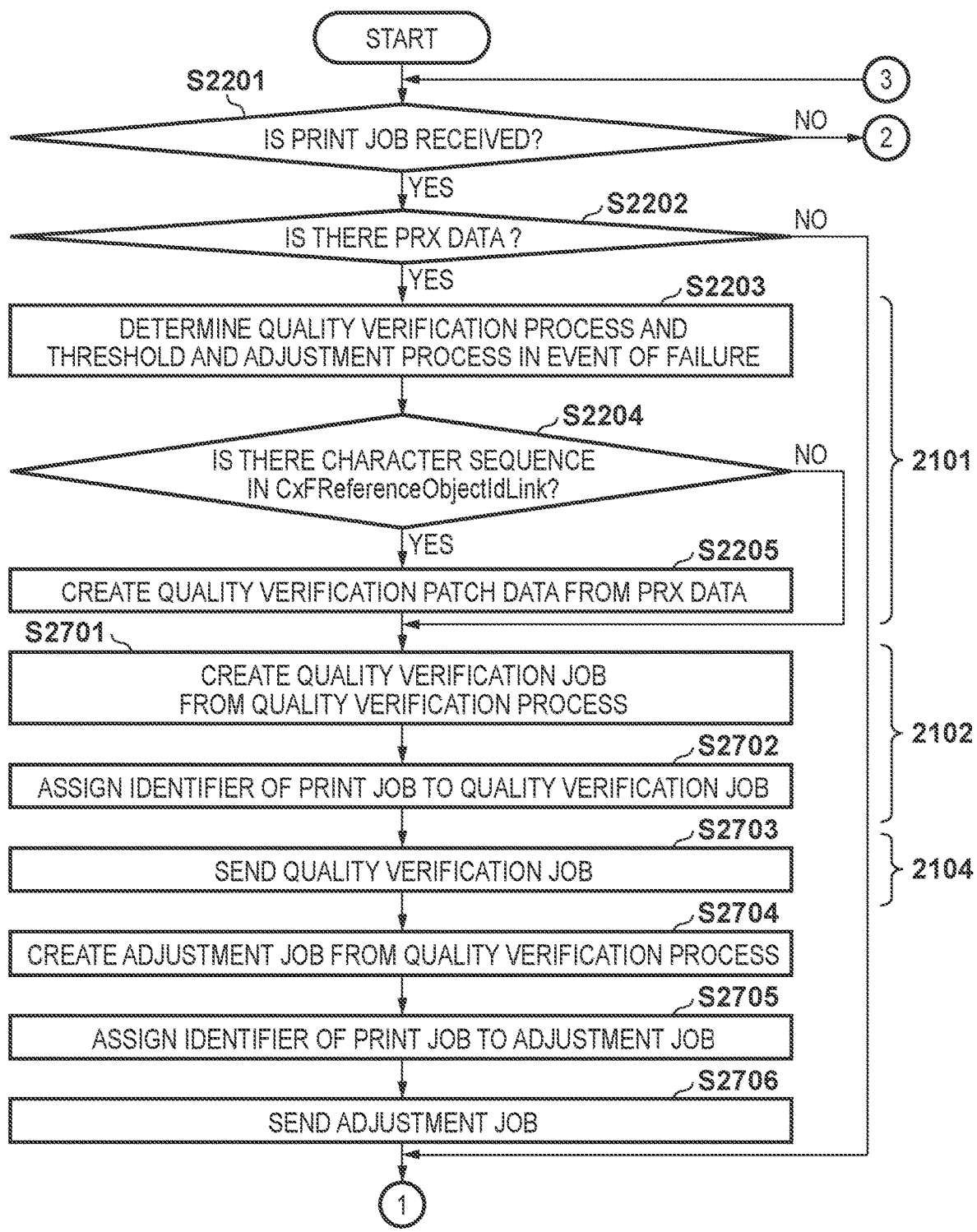
FIGS. 27A and 27B are flowcharts for describing control processing performed by a print server according to a sixth embodiment.
Figure 27B:
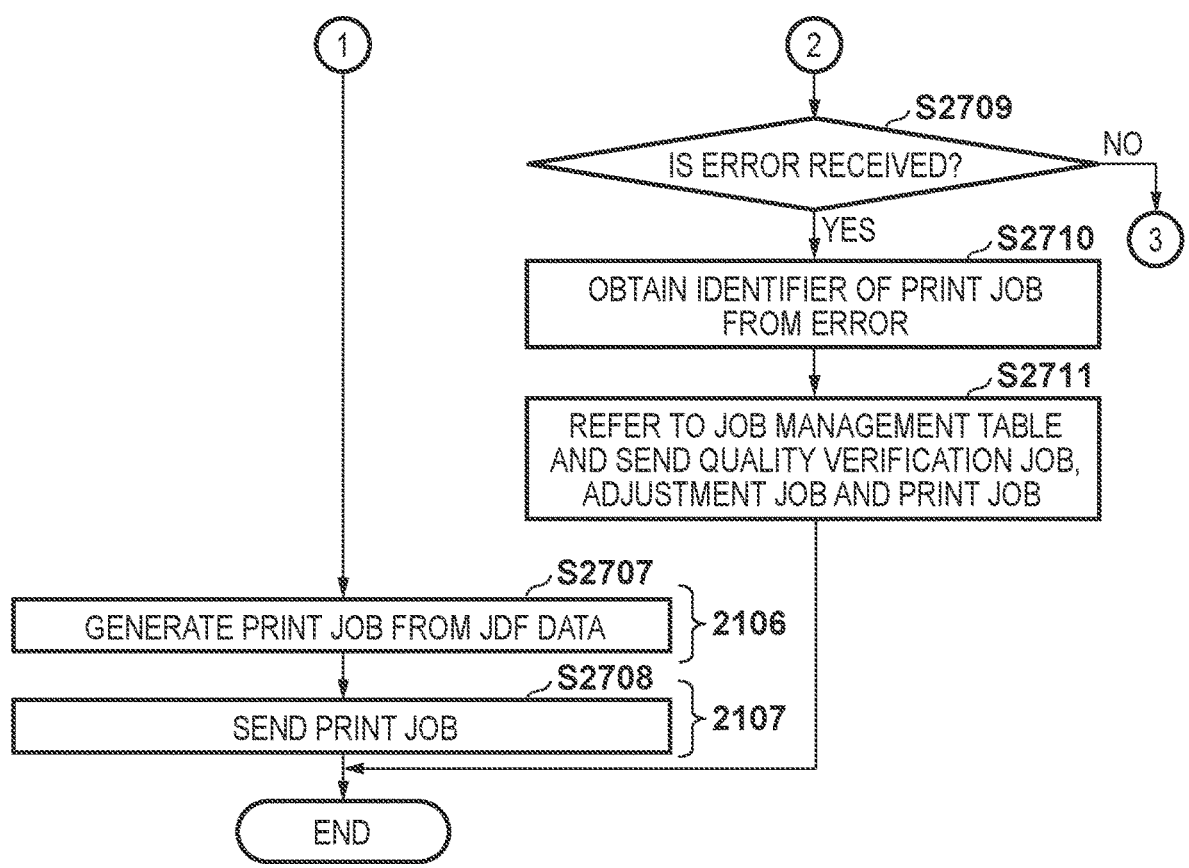

FIGS. 27A and 27B are flowcharts for describing control processing performed by the print server 122 according to the sixth embodiment. This flowchart is called when the print server 122 receives a print job and interprets the PRX data. Note that the programs that execute these processes are deployed in the RAM 303, for example, and the processes indicated in this flowchart are executed by the CPU 301 executing the control programs. The reference numerals 2101, 2102, 2104, 2106, and 2107 in FIGS. 27A and 27B indicate processes corresponding to the sequence chart in FIG. 21B. The processing of steps S2201 to S2205 are the same as in FIG. 22 and will therefore not be described.

In step S2701, functioning as the print control module 541, the CPU 301 creates the quality verification job on the basis of the result of interpreting the PRX data included in the print job.

FIG. 29A is a diagram for describing an example of a job management table that manages jobs, held by the data management module 544 of the production system 120 according to the sixth embodiment.

The data management module 544 saves a print job submitted to the production system 120 from the workflow management server 100 in this job management table. In step S2701, the print control module 541 creates a quality verification job on the basis of the result of the interpretation of the PRX data by the PRX interpretation module 5412, and stores the quality verification job in front of the corresponding print job in the job management table. In the sixth embodiment, the production system 120 includes the print server 122 and the printing apparatus 121, and the quality verification job is submitted to the printing apparatus 121 using a proprietary protocol.

The quality verification job includes the names of the quality verification processes denoted in the PRX-adjustment process correspondence table illustrated in FIG. 26D. The quality verification job includes information such as the threshold, the paper size, the paper type, the number of pages, and so on as parameters. The processing then advances to step S2702, where functioning as the print control module 541, the CPU 301 assigns a print job identifier to the quality verification job created in step S2701. In step S2703, functioning as the data management module 544, the CPU 301 sends the quality verification job from the print server 122 to the printing apparatus 121 on the basis of the job management table illustrated in FIG. 29A.

Furthermore, in the sixth embodiment, in step S2704, the print control module 541 creates an adjustment job, separate from the quality verification job, on the basis of the details of the adjustment process in the event of failure. For example, in the case of the print job "job 1" having the PRX data illustrated in FIG. 24, "AutoAdjustGradiation" is set as a parameter value in "ComplianceGoal" of PRX data. Based on this, the print control module 541 creates the "job 1 verification job" having "ToneVerification" from the PRX-adjustment process correspondence table illustrated in FIG. 26D, and submits that job to the printing apparatus 121 as a quality verification job.

At the same time, the print control module 541 prepares a "job 1 adjustment job" having a next process of "ToneCalibration" for a situation where the threshold is "dE 5 or less". At this time, the print control module 541 creates an adjustment job having settings of a paper size of A4 and plain paper, as per the print job "job 1". This adjustment job includes a tone correction process (ToneCalibration) provided in the printing apparatus 121. This adjustment job has the identifier of the print job as a parameter. If the adjustment job to which an adjustment process in the event of failure is assigned has been submitted, the adjustment control module 546 performs the tone correction. Operations performed by the printing apparatus 121 will be described later with reference to the flow in FIG. 28.

The print control module 541 adds a job name of "print job name"+"verification job" to the quality verification job and stores the job in the job management table illustrated in FIG. 29A. Additionally, the adjustment job is assigned a job name of "print job name"+"adjustment job" and stored in the job management table illustrated in FIG. 29A. The case of a print job having the PRX data illustrated in FIG. 9 is the same as that in the fifth embodiment and will therefore not be described here.

The processing then advances to step S2705, where functioning as the print control module 541, the CPU 301 adds a print job identifier to the adjustment job. The processing then advances to step S2706, where functioning as the data management module 544, the CPU 301 sends the adjustment job from the print server 122 to the printing apparatus 121 on the basis of the job management table illustrated in FIG. 29A. The processing then advances to step S2707, where functioning as the print control module 541, the CPU 301 generates a print job to be printed by the printing apparatus 121, from the print job "job 1" including the print data, JDF data, and the like, created at reference numeral 1502 in FIG. 15A. Then, the processing advances to step S2708, where functioning as the data management module 544, the CPU 301 sends the print job to the printing apparatus 121 of the production system 120 determined at reference numeral 1501 in FIG. 15A.

Although this will be described later with reference to step S2806 of FIG. 28, an error is provided by the printing apparatus 121 when it is necessary to interrupt the print server 122 while the printing apparatus 121 is processing the adjustment job. An error made in this manner is received by the data management module 544 in step S2709. The processing advances to step S2710 once the error is received. In step S2710, functioning as the print control module 541, the CPU 301 obtains a print job identifier included in the error. The processing then advances to step S2711, where the print control module 541 refers to the job management table illustrated in FIG. 29A (described earlier) on the basis of the print job identifier communicated along with the error. The print control module 541 then sends the quality verification job, the adjustment job, and the print job corresponding to the print job identifier, and the processing ends.

Figure 28:
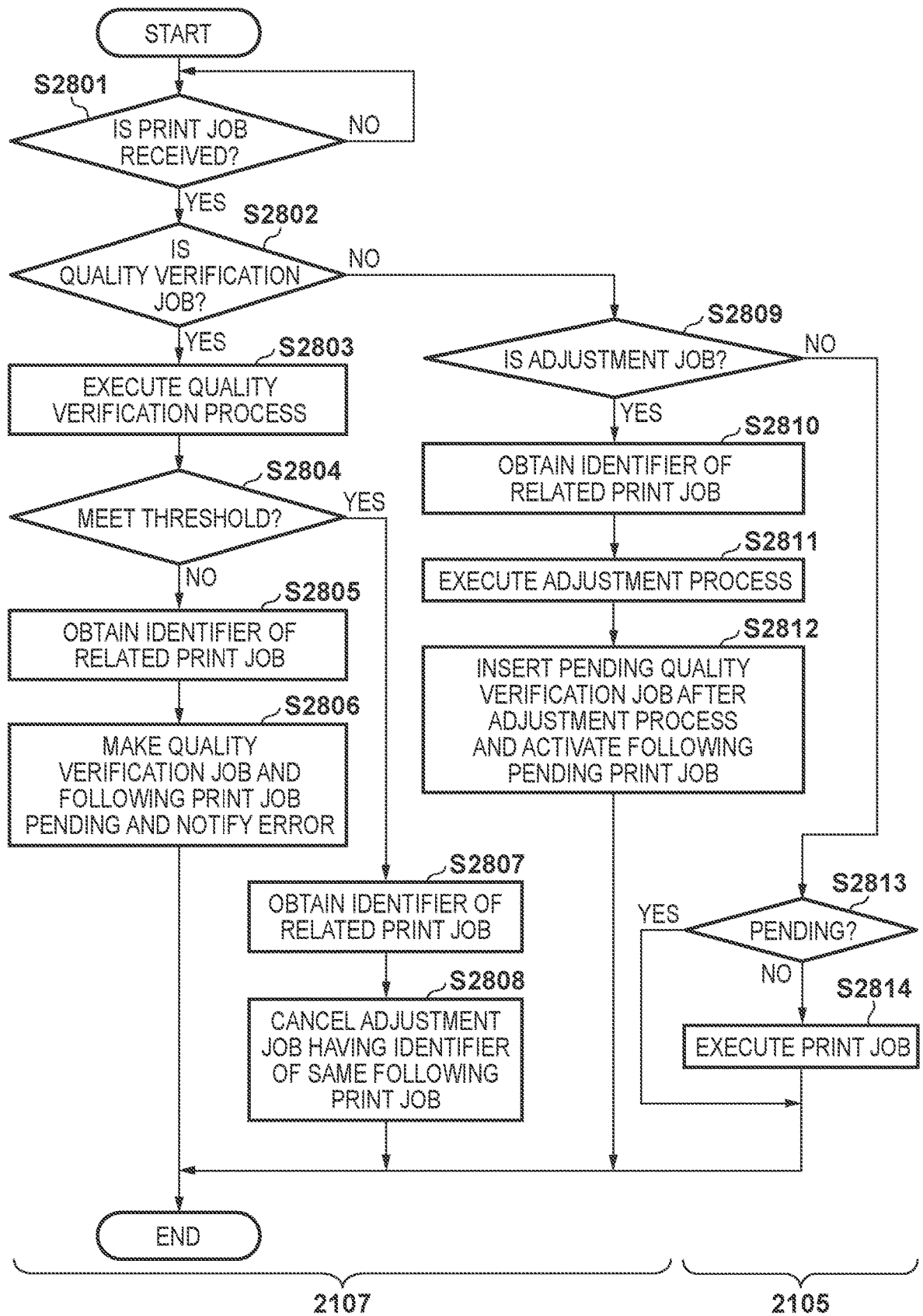
FIG. 28 is a flowchart for describing control processing of a printing apparatus in a production system according to the sixth embodiment.

FIG. 28 is a flowchart for describing control processing by the printing apparatus 121 in the production system 120 according to the sixth embodiment. This flowchart is called after the print server 122 has sent the print job to the printing apparatus 121. Note that the programs that execute these processes are deployed in the RAM (not shown) of the printing apparatus 121, for example, and the processes indicated in this flowchart are executed by the CPU (not shown) of the printing apparatus 121 executing the control programs. Reference numerals 2107 and 2105 in FIG. 28 indicate processes corresponding to the sequence chart in FIG. 21B.

In step S2801, functioning as the data management module 544, the CPU determines whether a job has been received. Here, if a job has not been received, the determination as to whether a job has been received is repeated, and once a job is received, the processing advances to step S2802. In step S2802, functioning as the adjustment control module 546, the CPU determines whether or the job received from the print server 122 is a quality verification job or not (i.e., is an adjustment job or a print job). If the job is a quality verification job, the processing advances to step S2803, and if not, the processing advances to step S2809.

In step S2803, functioning as the adjustment control module 546, the CPU executes the quality verification process. This quality verification process is executed according to the order in the adjustment execution table (FIG. 29B) received by the data management module 544.

FIG. 29B is a diagram illustrating an example of the adjustment execution table according to the sixth embodiment. This adjustment execution table is a table that consolidates the jobs held by the printing apparatus 121, and is managed by the data management module 544. One or more quality verification processes may be executed. This adjustment execution table indicates an example of a case of a print job having the PRX data illustrated in FIG. 24. Next, in step S2803, functioning as the adjustment control module 546, the CPU checks the adjustment execution table, and determines the quality verification process to be executed on the basis of the quality verification process assigned to a verification job in line 1, and the threshold thereof.

Assume here that the data management module 544 has received a print job of "job 1", a quality verification job of "job 1 verification job", and an adjustment job of "job 1 adjustment job" from the print server 122. In this case, the adjustment control module 546 refers to the verification job in line 1 of the adjustment execution table, and executes the "job 1 verification job" before executing the print job of "job 1". Because "ToneVerification" is denoted in the example of the "job 1 verification job" in this adjustment execution table in FIG. 29B, the adjustment control module 546 executes the tone correction provided in the printing apparatus 121.

The processing then advances to step S2804, where functioning as the adjustment control module 546, the CPU determines whether or not a result of the quality verification process executed in step S2803 meets the minimum quality rank (threshold). In the example of "job 1 verification job" in the adjustment execution table in FIG. 29B, the adjustment control module 546 determines whether or not the result of "ToneVerification" meets the minimum quality rank "dE 5 or less". If it is determined here that the minimum quality rank is not met, the processing advances to step S2805. In step S2805, the adjustment control module 546 obtains the related print job identifier. Here, the adjustment control module 546 finds the related print job identifier by referring to the print job identifier in the adjustment execution table. The processing then advances to step S2806, where functioning as the adjustment control module 546, the CPU puts the quality verification job and the following print job into a pending state in a pending table (not shown) using the print job identifier, and makes an error notification.

When the print server 122 prepares colorimetric patch data and sends the colorimetric patch data to the printing apparatus 121, the print server 122 or the workflow management server 100 is notified of the error. At this time, in the case where an interrupt from the print server 122 is required for the adjustment process, all jobs related to that print job may be canceled. This case is a case in which, for example, the printing apparatus 121 of the production system 120 does not have the colorimetric patch data for executing the adjustment job, and colorimetric patch data is submitted from the print server 122. The pending quality verification job, which will be described later with reference to step S2812, is loaded when executing the adjustment job and inserted immediately after the adjustment job.

On the other hand, if it is determined in step S2804 that the minimum quality rank is met, the processing then advances to step S2807. In step S2807, functioning as the image forming control module 5413, the CPU obtains the print job identifier related to the quality verification job. The processing then advances to step S2808, where the image forming control module 5413 cancels the adjustment job having the same print job identifier that follows in the job management table illustrated in FIG. 29A. Through this, in the sixth embodiment, it is possible to avoid executing subsequent adjustment jobs when the quality verification job meets the quality requirements.

On the other hand, when the adjustment control module 546 determines in step S2802 that the job is not a quality verification job, the processing advances to step S2809. In step S2809, functioning as the adjustment control module 546, the CPU determines whether the job being processed is an adjustment job. If the job is determined to be an adjustment job, the processing advances to step S2810, and if not, the processing advances to step S2813. In step S2810, functioning as the adjustment control module 546, the CPU obtains the print job identifier of the adjustment job being processed. The processing then advances to step S2811, where functioning as the adjustment control module 546, CPU executes the adjustment process for the quality item that does not meet the minimum quality rank in step S2804. At this time, the adjustment control module 546 verifies the adjustment job in line 2 of the adjustment execution table in FIG. 29B on the basis of the print job identifier. The adjustment process is then executed by referring to the quality verification process for this job 1 adjustment job. In the example of the adjustment execution table in FIG. 29B, if the result of "ToneVerification" in step S2804 is, for example, "dE=6", the quality verification process is referenced and "ToneCalibration" is executed. By executing the "ToneCalibration", the color tone can be corrected and the quality rank of the production system 120 can be corrected to at least the minimum quality rank. The processing then advances to step S2812, where functioning as the adjustment control module 546, the CPU uses the print job identifier of the adjustment job being processed to insert the quality verification job and the print job that are pending in the pending table (not shown) after the adjustment job, and activates the pending print job.

On the other hand, when it is determined in step S2809 that the job to be processed is not an adjustment job, the processing advances to step S2813. In step S2813, functioning as the image forming control module 5413, the CPU confirms whether there is a pending print job to be processed. When there is no pending print job (when the quality verification threshold is met), the processing advances to step S2814. In step S2814, the image forming control module 5413 performs printing on the basis of the job settings specified in the job adjustment execution table. On the other hand, when there is a pending print job (when the quality verification threshold is not met), this processing ends.

As described thus far, according to the sixth embodiment, quality requirements for each of print jobs can be interpreted, and a quality verification process and an adjustment process can be executed at appropriate timings in conjunction with the execution of the print job, which makes it possible to meet the quality requirements required for each print job.

Seventh Embodiment

In the foregoing sixth embodiment, when the production system 120 interprets a print job submitted from the workflow management server 100 and determines that quality requirements are assigned to the PRX data and it is necessary to generate a quality verification job (a job for printing patches), the quality verification job and the adjustment job are generated separately from the print job. The print job is then executed after first submitting the generate quality verification job and adjustment job. At this time, the conditions for starting the print job are not taken into account. Accordingly, when there are a plurality of quality requirements, it is possible that the order of the plurality of quality verification jobs will vary depending on the state of the network, and that the quality verification job will be submitted after the print job when the jobs are received by the data management module 544 of the production system. In such a case, for example, if a print job is executed without executing all of the quality verification jobs, the print job will not be able to meet the quality requirements. Accordingly, in the seventh embodiment, an identifier corresponding to a print start condition is assigned to the print job, which ensures that all quality verification jobs have been executed before printing. Note that the system configuration, the hardware configuration of each apparatus, and so on according to the seventh embodiment are the same as those described in the above first and fifth embodiments, and will therefore not be described.

Figure 30B:
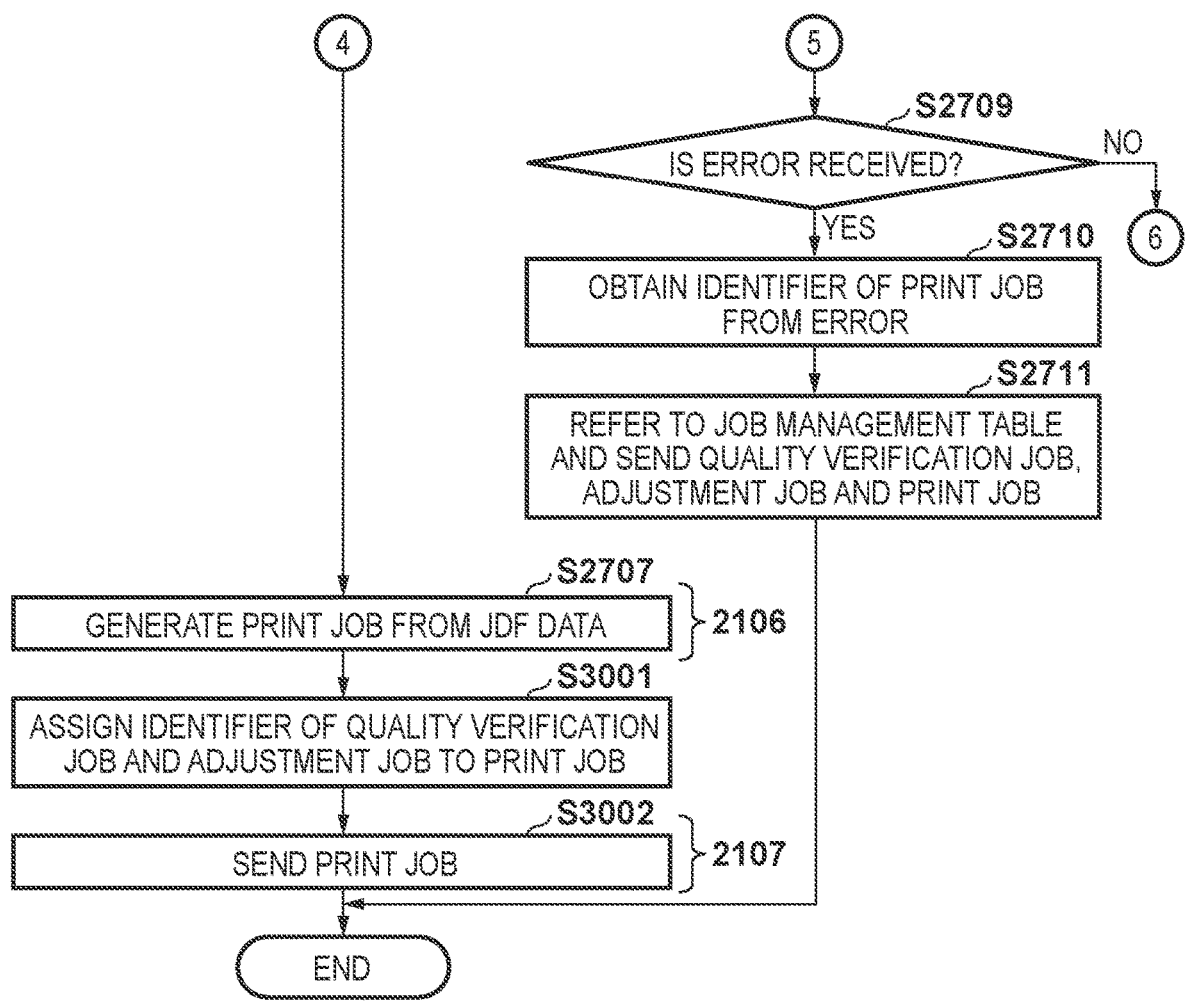

FIGS. 30A and 30B are flowcharts for describing control processing performed by the print server 122 according to the seventh embodiment. This flowchart is called when the print server 122 receives a print job and interprets the PRX data. Note that the programs that execute these processes are deployed in the RAM 203, for example, and the processes indicated in this flowchart are executed by the CPU 301 executing the control programs. The reference numerals 2101, 2103, 2104, 2106, and 2107 in FIGS. 30A and 30B indicate processes corresponding to the sequence chart in FIG. 21B. Steps S2201 to S2205 are the same processes as those described with reference to FIG. 22, and will therefore not be described here. Furthermore, steps S2701 to S2707 and steps S2709 to S2711 are the same processes as those described with reference to FIGS. 27A and 27B, and will therefore not be described here.

In step S3001, functioning as the print control module 541, the CPU 301 registers an identifier of the quality verification job created in step S2707 and an identifier of the adjustment job created in step S2704 in "quality verification job identifier" in the job management table illustrated in FIG. 32A. When there are a plurality of quality verification jobs, the print control module 541 assigns identifiers (names, in the seventh embodiment) for all of the quality verification jobs. The processing then advances to step S3002, where functioning as the data management module 544, the CPU 301 sends the print job to the printing apparatus 121.

Figure 31:
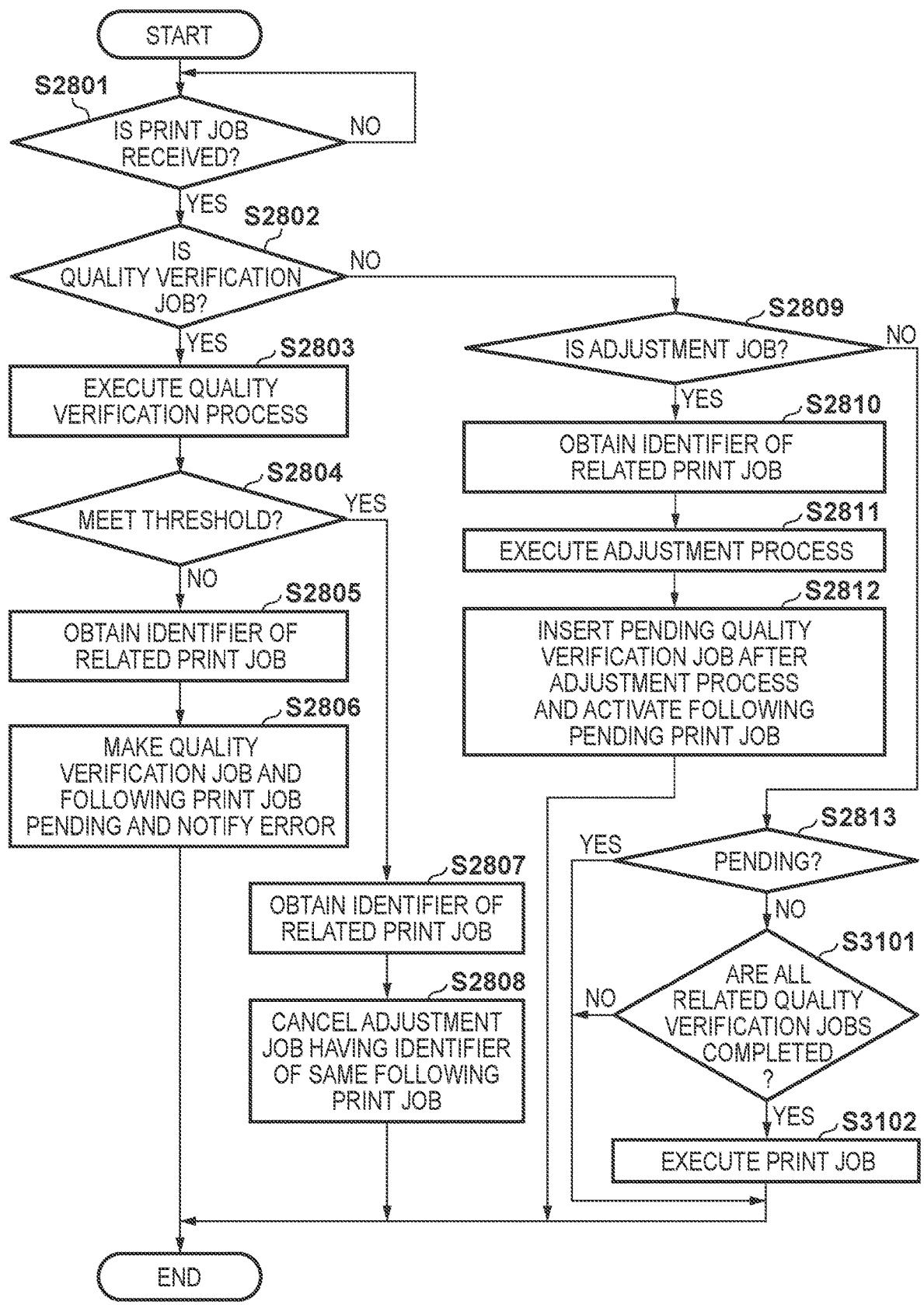
FIG. 31 is a flowchart for describing control processing of a printing apparatus in a production system according to the seventh embodiment.

FIG. 31 is a flowchart for describing control processing by the printing apparatus 121 in the production system 120 according to the seventh embodiment. This flowchart is called after the print server 122 has sent the job to the printing apparatus 121. Note that the programs that execute these processes are deployed in the RAM of the printing apparatus 121, for example, and the processes indicated in this flowchart are executed by the CPU (not shown) of the printing apparatus 121 executing the control programs. Note that steps S2801 to S2813 are the same processes as in the flowchart in FIG. 28, and will therefore not be described.

In step S3101, functioning as the image forming control module 5413, the CPU verifies whether all the quality verification jobs related to the print job determined not to be pending in step S2813 have ended. In the seventh embodiment, the job adjustment execution table is the same as in FIG. 32A, and thus the descriptions will be given with reference to that job management table. In step S3101, the image forming control module 5413 obtains the quality verification job identifier, which is one of the parameters of the print job. Then, in the printing of that print job, the image forming control module 5413 uses the identifier to verify whether all quality verification jobs and adjustment jobs related to the print job have been completed, using the job adjustment execution table. Here, when it is determined that all quality verification jobs have been completed, the processing advances to step S3102, and the print job is executed. On the other hand, when it is determined that all the quality verification jobs have not been completed, the process ends without executing the print job.

As described thus far, according to the seventh embodiment, quality requirements for each of print jobs can be interpreted, and printing based on the print job can be executed after executing all quality verification processes and adjustment processes at appropriate timings in conjunction with the execution of the print job. This makes it possible to meet the quality requirements of each print job.

Eighth Embodiment

An eighth embodiment will be described next. Note that the system configuration, as well as the hardware configurations of the workflow management server 100, the workflow management terminal 101, and the production system 120, according to the eighth embodiment are same as in the foregoing first embodiment. Additionally, the sequence chart illustrating a flow of processing in the printing system according to the eighth embodiment is the same as that illustrated in FIGS. 6A and 6B, described in the first embodiment. Furthermore, the software configurations of the various apparatuses according to the eighth embodiment are the same as those described in the foregoing first embodiment with reference to FIGS. 5A to 5C. As in the first embodiment, the processes indicated by reference numerals 613 and 614 in FIG. 6B are excluded. Further still, the processing by the workflow management server 100 according to the eighth embodiment is the same as in FIG. 7 described earlier, and the PRX data is the same as described with reference to FIG. 9 in the foregoing first embodiment.

FIG. 33 is a flowchart for describing control processing performed by the print server 122 of the production system 120 according to the eighth embodiment of the present invention. This flowchart is called after the workflow management server 100 sends the print job to the production system 120. Note that the programs that execute these processes are deployed in the RAM 303, for example, and the processes indicated in this flowchart are executed by the CPU 301 executing the control programs. The reference numerals 611 and 612 in FIG. 33 indicate processes corresponding to the sequence chart in FIG. 6B. These processes correspond to a flowchart that combines FIGS. 8A and 8B, described in the first embodiment, into a single flowchart.

In step S3301, functioning as the adjustment control module 546, the CPU 301 determines whether or not identification information is assigned to the print job received from the workflow management server 100. If it is determined that identification information is assigned, the processing advances to step S3302. However, if it is determined that identification information is not assigned, the processing advances to step S3306, and the print job is executed. In step S3302, functioning as the adjustment control module 546, the CPU 301 verifies the identification information assigned to the print job against the adjustment execution table illustrated in FIG. 32B, and determines the quality verification process to be executed. When the print job "job 1" and the identification information "Adjustment Set A" have been received from the workflow management server 100, line 3201 of the adjustment execution table in FIG. 32B is referenced, and a determination is made to execute "Adjustment Set A" before executing "job 1".

The processing then advances to step S3303, where functioning as the adjustment control module 546, the CPU 301 executes the quality verification process determined in step S3302. One or more quality verification process may be executed. In the example of "Adjustment Set A" in the adjustment execution table of FIG. 32B, "JapanColorVerification" and "Front/Back Registration Verification" are registered, and thus those two quality verifications are executed. The processing then advances to step S3304, where functioning as the adjustment control module 546, the CPU 301 determines whether or not a result of the quality verification process executed in step S3303 meets the minimum quality rank (threshold).

In the example of "Adjustment Set A" in the adjustment execution table illustrated in FIG. 32B, it is determined whether or not the result of "JapanColorVerification" meets the minimum quality rank "dE 5 or less". Likewise, it is determined whether the result of the "Front/Back Registration Verification" meets the minimum quality rank of "misalignment amount of 4 mm or less". Here, when the minimum quality rank is not met, the processing advances to step S3305, whereas when the minimum quality rank is met, the processing advances to step S3306 and the print job is executed.

In step S3305, functioning as the adjustment control module 546, the CPU 301 executes the adjustment process by referring to the adjustment process in event of failure 1004 in the adjustment execution table 1100 with respect to quality items that do not meet the minimum quality rank in step S3304. In the example of the adjustment execution table illustrated in FIG. 32B, if the result of "JapanColorVerification" in step S3304 is, for example, "dE=6", the adjustment process in the event of failure is referenced and "JapanColorCalibration" is executed. By executing the "JapanColorCalibration", color fluctuations can be corrected and the quality rank of the production system 120 can be corrected to at least the minimum quality rank.

As described thus far, according to the eighth embodiment, quality requirements for each of print jobs can be interpreted, and a quality verification process and an adjustment process can be executed at appropriate timings in conjunction with the execution of the print job. In particular, in the eighth embodiment, adjustment information is sent to the production system as a command rather than a job. This makes it possible to produce printed products which meet the quality requirements of each print job.

Additionally, in the processing performed by the workflow management server 100 according to the eighth embodiment (FIG. 7), it is preferable that the registration of the quality verification process be skipped if the same quality verification process is already registered, as in FIG. 12 described in the second embodiment. This makes it possible to avoid pressing the resources of the workflow management server 100 and the production system 120.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-049938, filed Mar. 19, 2020, which is hereby incorporated by reference herein in its entirety.

What is claimed is:

1. A printing system comprising an order receiving system, an information processing apparatus, and a production system,
   wherein the order receiving system includes a memory containing instructions and a processor that executes the instructions to:
   receive print data,
   generate quality requirement data, and
   transmit the print data and the quality requirement data to the information processing apparatus,
   wherein the information processing apparatus includes a memory containing instructions and a processor that executes the instructions to:
   receive the print data and the quality requirement data;
   interpret the received quality requirement data;
   based on a result of interpreting the received quality requirement data, transmit to the production system a print job for printing the print data and identification information of a quality verification process for verifying, with the production system, whether or not a quality required by the received quality requirement data is satisfied for the print job,
   wherein the production system includes a memory containing instructions and a processor that executes the instructions to:
   receive the transmitted print job and the transmitted identification information;
   execute the quality verification process corresponding to the received identification information,
   determine, after the quality verification process has been executed, whether or not a condition corresponding to the identification information is met,
   execute, when it is determined that the condition is not met, an adjustment process for meeting the condition, and
   execute the print job when the adjustment process has been completed or when it is determined that the condition is met.

2. The printing system according to claim 1,
wherein the adjustment process is an adjustment process corresponding to the identification information.

3. The printing system according to claim 1,
wherein the quality requirement data is PRX(Print Requirement eXchange format) data.

4. The printing system according to claim 1,
wherein the information processing apparatus executes instructions to register the identification information and the quality verification process with the production system.

5. The printing system according to claim 4,
wherein the production system stores information indicating adjustment capabilities of an apparatus included in the production system, and the information processing apparatus executes instructions to decide the production system to be used on the basis of the information.

6. The printing system according to claim 1,
wherein the order receiving system executes instructions to receive the print data and a product type, and wherein the order receiving unit executes instructions to generate the quality requirement data on the basis of the received product type.

7. The printing system according to claim 6,
wherein the order receiving system executes instructions to transmit the print data, the product type, and the quality requirement data to the information processing apparatus, and the information processing apparatus executes instructions to decide the production system to be used on the basis of the product type and the quality requirement data received from the order receiving system.

\* \* \* \* \*